US011342634B2

(12) United States Patent
Fees et al.

(10) Patent No.: US 11,342,634 B2
(45) Date of Patent: *May 24, 2022

(54) CONTACT PLATE INCLUDING AT LEAST ONE BONDING CONNECTOR CONFIGURED TO ESTABLISH ELECTRICAL BONDS TO TERMINALS OF AT LEAST ONE GROUP OF BATTERY CELLS IN A BATTERY MODULE

(71) Applicant: Tiveni MergeCo, Inc., San Mateo, CA (US)

(72) Inventors: Heiner Fees, Bietigheim-Bissingen (DE); Andreas Track, Sachsenheim (DE); Alexander Eichhorn, Eppingen (DE); Ralf Maisch, Abstatt (DE); Jörg Damaske, Freiberg (DE); Martin Eberhard, Woodside, CA (US)

(73) Assignee: TIVENI MERGECO, INC., Redwood City, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 16/682,900

(22) Filed: Nov. 13, 2019

(65) Prior Publication Data

US 2020/0099035 A1    Mar. 26, 2020

Related U.S. Application Data

(63) Continuation of application No. 15/641,815, filed on Jul. 5, 2017, now Pat. No. 10,497,919.
(Continued)

(51) Int. Cl.
*H01M 50/502* (2021.01)
*H01M 50/20* (2021.01)
(Continued)

(52) U.S. Cl.
CPC .......... *H01M 50/502* (2021.01); *B23K 26/21* (2015.10); *B23K 26/26* (2013.01); *B60K 1/00* (2013.01);
(Continued)

(58) Field of Classification Search
CPC .................... H01M 50/502–50/526
See application file for complete search history.

(56) References Cited

U.S. PATENT DOCUMENTS 9,431,644 B1    8/2016  Eberhard
10,497,919 B2 * 12/2019  Fees .................. B60K 1/04
(Continued)

FOREIGN PATENT DOCUMENTS

CN    201054369 Y    4/2008

*Primary Examiner* — Jonathan Crepeau
(74) *Attorney, Agent, or Firm* — Muncy, Geissler, Olds & Lowe, P.C.; Daniel Podhajny

(57) ABSTRACT

Embodiments are directed to contact plates configured to establish electrical bonds between battery cells in a battery module. In a first embodiment, the contact plate includes at least one primary conductive layer including a hole that is aligned with two or more terminals of two or more battery cells in a group of battery cells that are configured to be connected in parallel with each other, and a bonding connector configured to provide direct electrical bonds between the contact plate and the two or more terminals of the two or more battery cells. In a second embodiment, a contact plate includes at least one primary conductive layer and a set of bonding connectors made from at least one material that is selected to match at least one material used for the terminals of the at least one group of battery cells.

16 Claims, 57 Drawing Sheets

Related U.S. Application Data

(60) Provisional application No. 62/438,800, filed on Dec. 23, 2016, provisional application No. 62/431,067, filed on Dec. 7, 2016, provisional application No. 62/422,099, filed on Nov. 15, 2016, provisional application No. 62/422,097, filed on Nov. 15, 2016, provisional application No. 62/422,113, filed on Nov. 15, 2016, provisional application No. 62/414,263, filed on Oct. 28, 2016, provisional application No. 62/414,224, filed on Oct. 28, 2016, provisional application No. 62/408,437, filed on Oct. 14, 2016, provisional application No. 62/408,428, filed on Oct. 14, 2016.

(51) Int. Cl.

| | |
|---|---|
| *H01M 50/543* | (2021.01) |
| *H01M 50/522* | (2021.01) |
| *H01M 50/516* | (2021.01) |
| *H01M 50/545* | (2021.01) |
| *B23K 26/21* | (2014.01) |
| *B60L 50/64* | (2019.01) |
| *B60L 58/21* | (2019.01) |
| *B60K 1/00* | (2006.01) |
| *B60K 1/04* | (2019.01) |
| *B62D 21/15* | (2006.01) |
| *H01M 50/10* | (2021.01) |
| *H01M 50/56* | (2021.01) |
| *H01M 50/116* | (2021.01) |
| *H01M 50/152* | (2021.01) |
| *H01M 50/166* | (2021.01) |
| *H01M 50/528* | (2021.01) |
| *H01M 50/529* | (2021.01) |
| *H01M 50/107* | (2021.01) |
| *H01M 50/171* | (2021.01) |
| *H01M 50/147* | (2021.01) |
| *H01M 10/613* | (2014.01) |
| *H01M 10/625* | (2014.01) |
| *B23K 26/26* | (2014.01) |
| *B23K 101/36* | (2006.01) |
| *H01M 10/643* | (2014.01) |
| *H01M 10/6552* | (2014.01) |
| *B23K 101/38* | (2006.01) |
| *B62D 21/18* | (2006.01) |
| *F16M 1/00* | (2006.01) |
| *H01M 50/572* | (2021.01) |

(52) U.S. Cl.
CPC .............. *B60K 1/04* (2013.01); *B60L 50/64* (2019.02); *B60L 58/21* (2019.02); *B62D 21/152* (2013.01); *B62D 21/155* (2013.01); *H01M 10/613* (2015.04); *H01M 10/625* (2015.04); *H01M 50/10* (2021.01); *H01M 50/107* (2021.01); *H01M 50/116* (2021.01); *H01M 50/147* (2021.01); *H01M 50/152* (2021.01); *H01M 50/166* (2021.01); *H01M 50/171* (2021.01); *H01M 50/20* (2021.01); *H01M 50/516* (2021.01); *H01M 50/522* (2021.01); *H01M 50/528* (2021.01); *H01M 50/529* (2021.01); *H01M 50/543* (2021.01); *H01M 50/545* (2021.01); *H01M 50/56* (2021.01); *B23K 2101/36* (2018.08); *B23K 2101/38* (2018.08); *B60K 2001/001* (2013.01); *B60K 2001/005* (2013.01); *B60K 2001/0438* (2013.01); *B60K 2001/0461* (2013.01); *B60Y 2306/01* (2013.01); *B62D 21/18* (2013.01); *F16M 1/00* (2013.01); *H01M 10/643* (2015.04); *H01M 10/6552* (2015.04); *H01M 50/572* (2021.01); *H01M 2200/103* (2013.01); *H01M 2220/20* (2013.01)

(56) References Cited

U.S. PATENT DOCUMENTS

| | | | |
|---|---|---|---|
| 10,720,626 B2 * | 7/2020 | Harris | H01M 10/486 |
| 2014/0255750 A1 * | 9/2014 | Jan | H01M 50/502 |
| | | | 429/120 |

\* cited by examiner

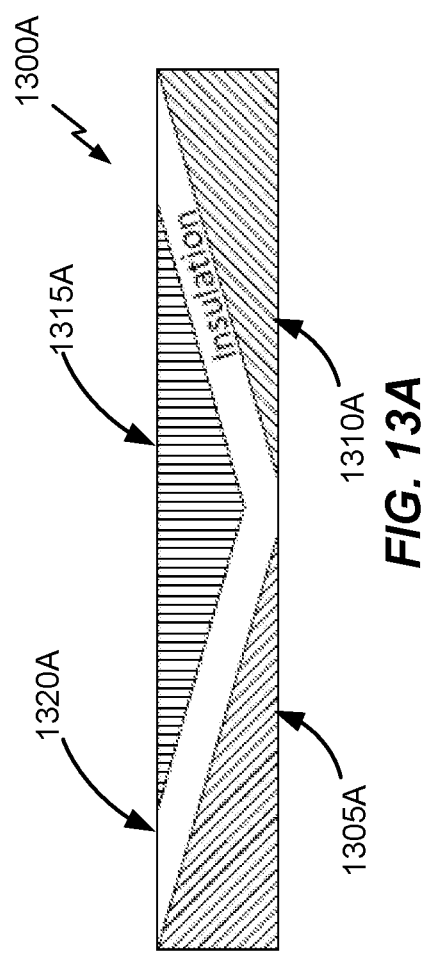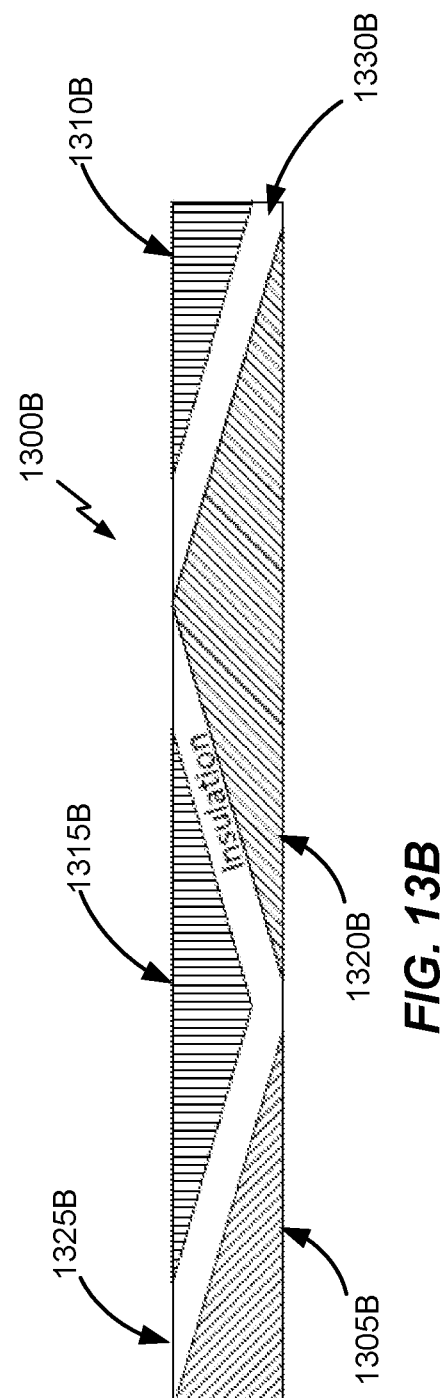

CONTACT PLATE INCLUDING AT LEAST ONE BONDING CONNECTOR CONFIGURED TO ESTABLISH ELECTRICAL BONDS TO TERMINALS OF AT LEAST ONE GROUP OF BATTERY CELLS IN A BATTERY MODULE

CROSS-REFERENCE TO RELATED APPLICATIONS

The present application is a continuation of U.S. patent application Ser. No. 15/641,815, entitled "CONTACT PLATE INCLUDING AT LEAST ONE BONDING CONNECTOR CONFIGURED TO ESTABLISH ELECTRICAL BONDS TO TERMINALS OF AT LEAST ONE GROUP OF BATTERY CELLS IN A BATTERY MODULE", filed Jul. 5, 2017, which in turn claims priority to U.S. Provisional Application No. 62/408,428, entitled "SANDWICH-CONTACTPLATE FOR ELECTRICAL CONNECTION BATTERY CELLS", filed Oct. 14, 2016, and also of U.S. Provisional Application No. 62/431,067, entitled "SANDWICH-CONTACTPLATE FOR ELECTRICAL CONNECTION BATTERY CELLS", filed Dec. 7, 2016, and also of U.S. Provisional Application No. 62/408,437, entitled "CELL DESIGN FOR CYLINDRICAL CELLS", filed Oct. 14, 2016, and also of U.S. Provisional Application No. 62/414,263, entitled "SPECIAL FUSE DESIGN FOR ARC AVOIDANCE", filed Oct. 28, 2016, and also of U.S. Provisional Application No. 62/422,097, entitled "DESIGN OF ELECTRICAL CONTACT ON CELL RIM TO OPTIMIZE BUSBAR CROSS-SECTION", filed Nov. 15, 2016, and also of U.S. Provisional Application No. 62/438,800, entitled "DESIGN OF ELECTRICAL CONTACT ON CELL RIM TO OPTIMIZE BUSBAR CROSS-SECTION", filed Dec. 23, 2016, and also of U.S. Provisional Application No. 62/414,224, entitled "CONTACT PLATE FOR OPTIMIZED CURRENT DENSITY", filed Oct. 28, 2016, and also of U.S. Provisional Application No. 62/422,099, entitled "INTEGRATED PLUG CONTACT IN CONTACT PLATE OF CELL MODULE", filed Nov. 15, 2016, and also of U.S. Provisional Application No. 62/422,113, entitled "COOLING SYSTEM FOR BATTERY PACKS WITH HEATPIPES", filed Nov. 15, 2016, each of which is by the same inventors as the subject application, assigned to the assignee hereof and hereby expressly incorporated by reference herein in its entirety.

BACKGROUND

1. Field of the Disclosure

Embodiments relate to a contact plate including at least one bonding connector configured to establish electrical bonds to terminals of at least one group of battery cells in a battery module.

2. Description of the Related Art

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected to a battery junction box (BJB) via busbars, which distribute electric power to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

SUMMARY

An embodiment is directed to a contact plate configured to establish electrical bonds between battery cells in a battery module, including at least one primary conductive layer including a hole that is aligned with two or more terminals of two or more battery cells in a group of battery cells that are configured to be connected in parallel with each other, and a bonding connector configured to provide direct electrical bonds between the contact plate and the two or more terminals of the two or more battery cells.

Another embodiment is directed to a contact plate configured to establish electrical bonds between battery cells in a battery module, including at least one primary conductive layer, and a set of bonding connectors that are configured to provide direct electrical bonds between the contact plate and terminals of at least one group of battery cells, wherein the set of bonding connectors is made from at least one material that is selected to match at least one material used for the terminals of the at least one group of battery cells.

BRIEF DESCRIPTION OF THE DRAWINGS

A more complete appreciation of embodiments of the disclosure will be readily obtained as the same becomes better understood by reference to the following detailed description when considered in connection with the accompanying drawings, which are presented solely for illustration and not limitation of the disclosure, and in which:

FIG. 13A illustrates a side-perspective of a hybrid contact plate arrangement for a battery module in accordance with an embodiment of the disclosure.

FIG. 13B illustrates a side-perspective of a hybrid contact plate arrangement for a battery module in accordance with another embodiment of the disclosure.

DETAILED DESCRIPTION

Embodiments of the disclosure are provided in the following description and related drawings. Alternate embodiments may be devised without departing from the scope of the disclosure. Additionally, well-known elements of the disclosure will not be described in detail or will be omitted so as not to obscure the relevant details of the disclosure.

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected to a battery junction box (BJB) via busbars, which distribute electric power to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

Embodiments of the disclosure relate to various configurations of battery modules that may be deployed as part of an energy storage system. In an example, while not illustrated expressly, multiple battery modules in accordance with any of the embodiments described herein may be deployed with respect to an energy storage system (e.g., chained in series to provide higher voltage to the energy storage system, connected in parallel to provide higher current to the energy storage system, or a combination thereof).

Figure 1:
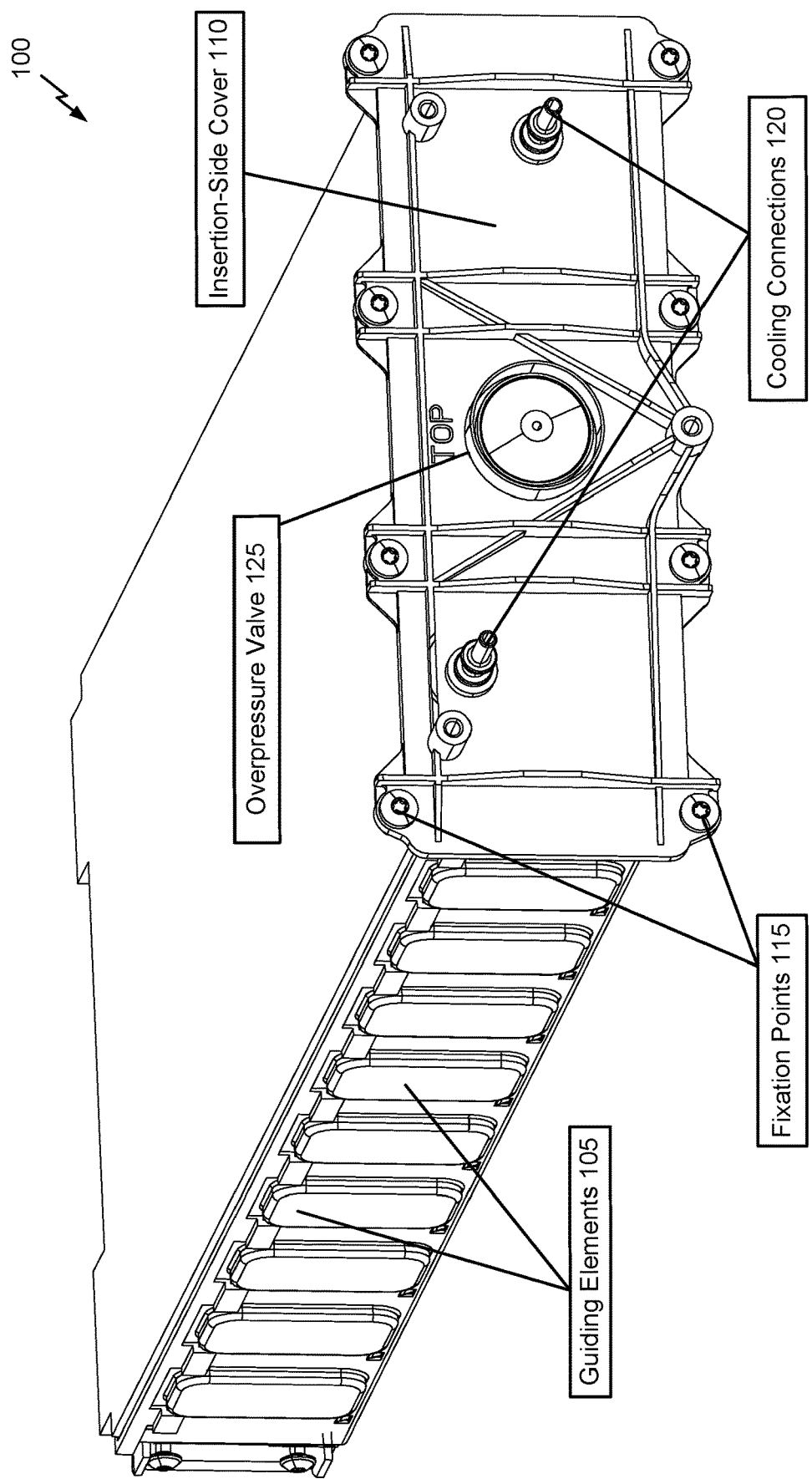
FIGS. 1-2 illustrate a front-perspective and a back-perspective, respectively, of an exterior framing of a battery module in accordance with an embodiment of the disclosure.
Figure 2:
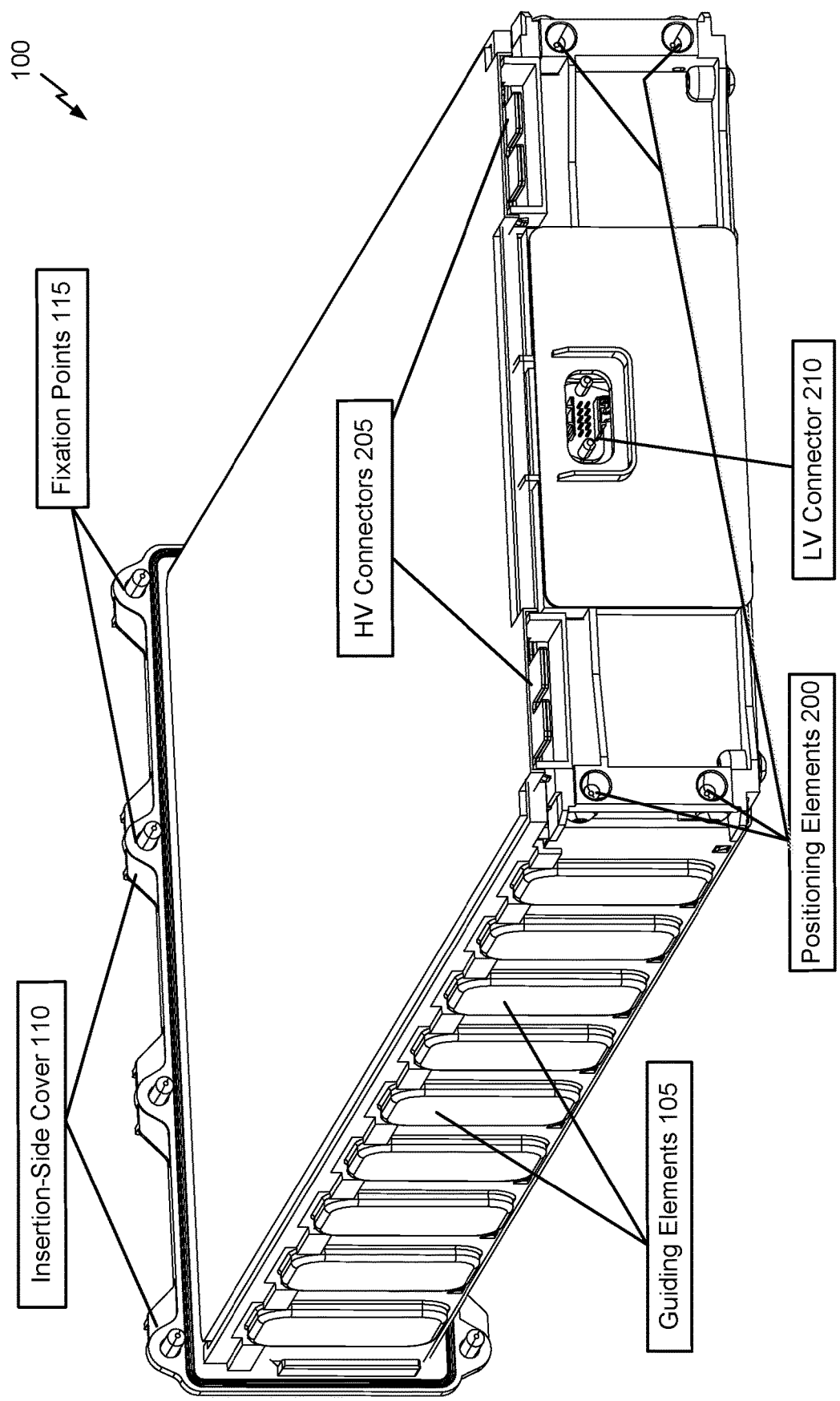

FIGS. 1-2 illustrate a front-perspective and a back-perspective, respectively, of an exterior framing of a battery module 100 in accordance with an embodiment of the disclosure. In the example of FIGS. 1-2, the battery module 100 is configured for insertion into a battery module compartment. For example, each side of the battery module 100 includes guiding elements 105 to facilitate insertion into (and/or removal out of) the battery module compartment. In a further example, the guiding elements 105 are configured to fit into grooves inside the battery module compartment to facilitate insertion and/or removal of the battery module 100. An insertion-side cover 110 (or endplate) is integrated into the battery module 100. Upon insertion, the insertion-side cover 110 may be attached or affixed to the battery module compartment (e.g., via fixation points 115, such as bolt-holes, etc.) to seal the battery module 100 inside the battery module compartment. While the insertion-side cover 110 is depicted in FIGS. 1-2 as integrated into the battery module 100, the insertion-side cover 110 may alternatively be independent (or separate) from the battery module 100, with the battery module 100 first being inserted into the battery module compartment, after which the insertion-side cover 110 is attached.

Referring to FIGS. 1-2, the insertion-side cover 110 includes fixation points 115, a set of cooling connections 120, and an overpressure valve 125. In an example, the fixation points 115 may be bolt-holes through which bolts may be inserted, and the set of cooling connections 120 may include input and output cooling tube connectors (e.g., through which coolant fluid is pumped into the battery module 100 for cooling one or more cooling plates). The overpressure valve 125 may be configured to open when pressure inside of the battery module 100 exceeds a threshold (e.g., to avoid an explosion or overpressure by degassing in case of a thermal run away of a battery cell in the battery module 100).

Referring to FIG. 2, the battery module 100 further includes a set of fixation and positioning elements 200 (e.g., to position and secure the battery module 100 in the battery module compartment while inserted), a set of HV connectors 205 (e.g., to connect the battery module 100 to corresponding HV connectors in the battery module compartment), and an LV connector 210 (e.g., to connect internal sensors of the battery module 100 to the BJB (not illustrated) via a corresponding LV connector in the battery module compartment). Accordingly, the battery module 100 is configured such that, upon insertion into the battery module compartment, the fixation and positioning elements 200, the HV connectors 205 and the LV connector 210 are each secured and connected (e.g., plugged into) corresponding connectors in the battery module compartment.

To provide some context, it will be appreciated that many of the "exterior" components described above with respect to FIGS. 1-2 are specific to particular battery module compartment configurations (e.g., configurations where the battery module 100 is configured to be inserted into a battery module compartment and sealed, with both HV connectors 205 being arranged on the same side of the battery module for establishing an HV electrical connection to an energy storage system). By contrast, many of the embodiments described below relate to "internal" component configurations to facilitate various electrical functionality (e.g., although some overlap between the interior and exterior components may occur, such as the HV connectors 205 corresponding to a section of a multi-layer contact plate that protrudes outside the battery module 100, which will be described below in more detail). In this case, the various exterior components depicted in FIGS. 1-2 may not be specifically required to support these electrical functions facilitated by the internal battery module configurations described herein. Accordingly, the battery module 100 and associated components described with respect to FIGS. 1-2 should be interpreted as one exemplary exterior framing implementation for a battery module, whereas the various internal component configurations may alternatively be directed to other types of exterior framing (e.g., battery modules without guiding elements 105, battery modules that do not include an integrated insertion-side cover such as insertion-side cover 110, battery modules that position the HV connectors 205 on different sides from each other, and so on).

As noted above, battery modules, such as the battery module 100 of FIGS. 1-2, include a set of battery cells. Each battery cell has a respective cell-type (e.g., cylindrical, prismatic, pouch, etc.). One example of a cylindrical battery cell is an 18650 cell. In 18650 cells, positive and negative terminal contacts are typically made of nickel-plated steel.

For busbars that connect battery cells to each other within the battery module 100, a good electrical conductor, such as aluminum (Al) or copper (Cu), may be used. However, joining steel at the positive and negative terminal contacts of a battery cell with the busbar is difficult. A common technology for this connection is wire bonding, where a thin Al bonding wire is connected (e.g., via ultrasonic welding) between the battery cell and the busbar. Due to the thin diameter of the Al bonding wire, there is a large power loss during operation. Battery cells may thereby be deployed in conjunction with a cooling system to cool the battery cells. Cooling systems generally consume a high amount of electrical power. For example, some conventional cooling systems for cylindrical battery cell configurations that include positive/negative cell terminals at opposite ends attempt to cool the cylindrical battery cells radially, which is inefficient (and thereby very power consuming) because cylindrical battery cells generally conduct more heat axially rather than radially. In other words, conventional cooling mechanisms attempt to cool the sides of the cylindrical battery cells (e.g., or by applying indirect cooling to the cylindrical battery cells over the insulated busbars or contact plates), instead of attempting to directly and axially cool the cylindrical battery cells, because directly and axially cooling the cylindrical battery cells will interfere with cell terminal connections in conventional configurations.

In an embodiment, one of the HV connectors 205 may correspond to a negative (or minus) terminal of the battery module 100, and the other HV connector 205 may correspond to a positive (or plus) terminal of the battery module 100. Inside the battery module 100, the set of battery cells may be arranged into a plurality of parallel groups, or "P groups". Each of the P groups may include a plurality of battery cells connected in parallel with each other (e.g., to increase current), while the P groups are connected in series with each other (e.g., to increase voltage). The negative terminal of the first series-connected P group is coupled to the negative terminal (or HV connector 205) of the battery module 100, while the positive terminal of the last series-connected P group is connected to the positive terminal (or HV connector 205) of the battery module 100. An example arrangement of P Groups within the battery module 300 is described below with respect to FIG. 3.

Figure 3:
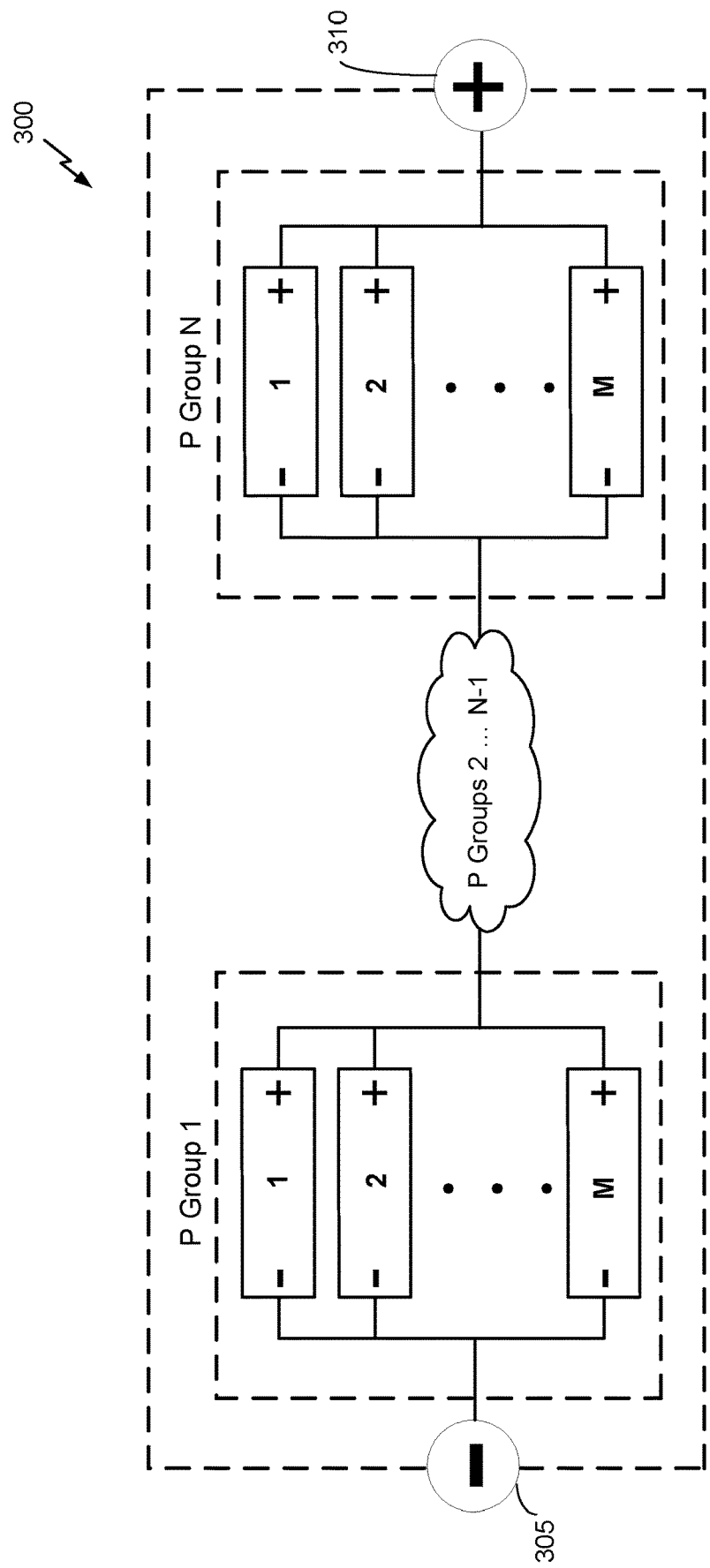
FIG. 3 illustrates a high-level electrical diagram of an exemplary battery module that shows P groups 1 . . . N connected in series in accordance with an embodiment of the disclosure.

FIG. 3 illustrates a high-level electrical diagram of a battery module 300 that shows P groups 1 . . . N connected in series in accordance with an embodiment of the disclosure. In an example, N may be an integer greater than or equal to 2 (e.g., if N=2, then the intervening P groups denoted as P groups 2 . . . N−1 in FIG. 3 may be omitted). Each P group includes battery cells 1 . . . M connected in parallel. The negative terminal of the first series-connected P group (or P group 1) is coupled to a negative terminal 305 of the battery module 300, while the positive terminal of the last series-connected P group (or P group N) is connected to a positive terminal 310 of the battery module 300. The negative and positive terminals 305 and 310 may each be connected to an HV connector, such as one of the HV connectors 205 described above with respect to FIGS. 1-2. As used herein, battery modules may be characterized by the number of P groups connected in series included therein. In particular, a battery module with 2 series-connected P groups is referred to as a "2S" system, a battery module with 3 series-connected P groups is referred to as a "3S" system, and so on. Examples of battery module P group arrangements below are provided with respect to 2S (e.g., N=2), 3S (e.g., N=3) and 4S (e.g., N=4) systems for the sake of clarity, although it will be appreciated that embodiments of the disclosure may be directed to a battery module with any number of series-connected P groups in other embodiments, or even to a battery module with a single P group.

Figure 4:
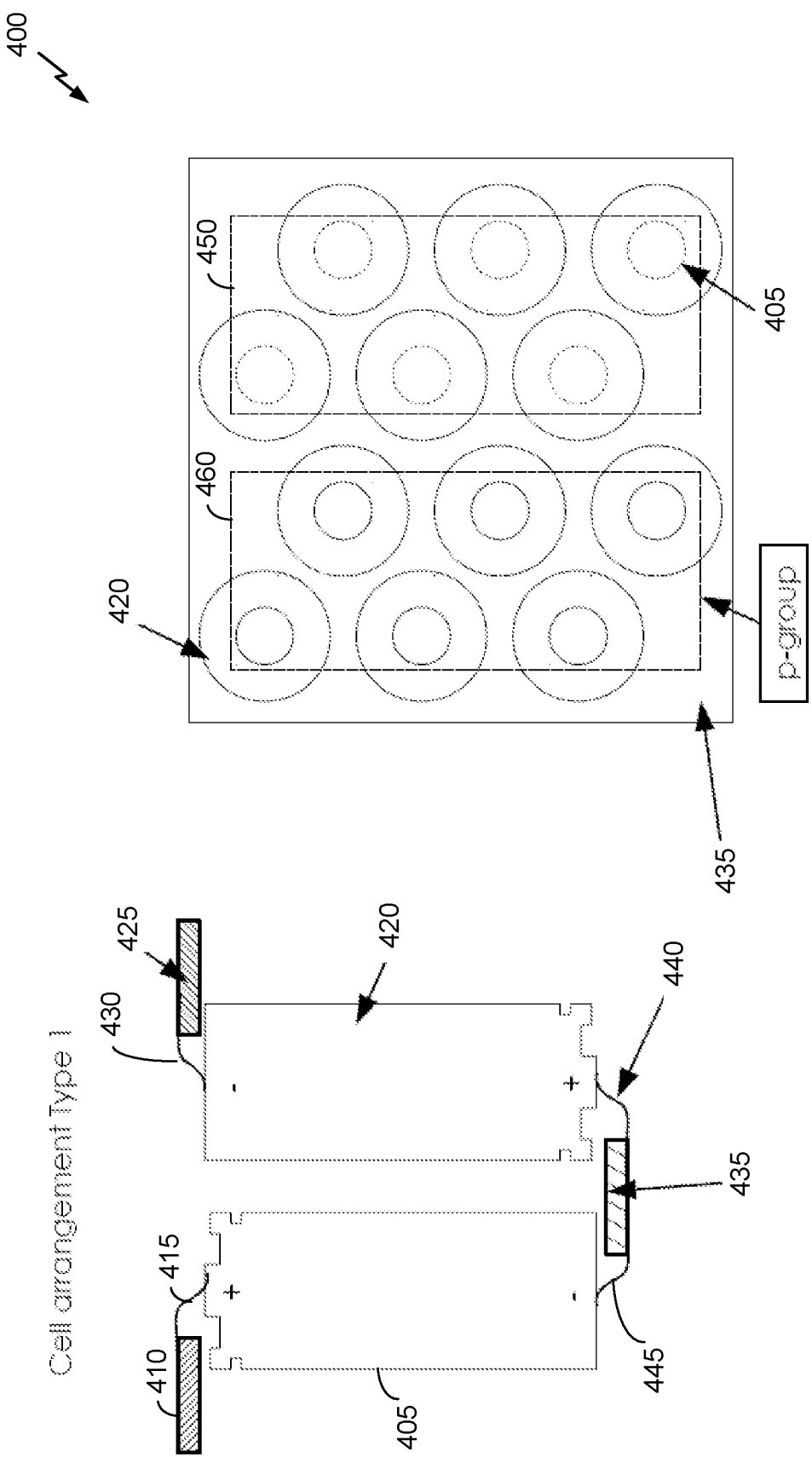
FIG. 4 illustrates a side-perspective and a top-perspective of a conventional "Type 1" cylindrical battery cell arrangement.

FIG. 4 illustrates a side-perspective and a top-perspective of a conventional "Type 1" cylindrical battery cell arrangement 400. Referring to the side-perspective of the "Type 1" cylindrical battery cell arrangement 400 in FIG. 4, a top-facing positive terminal of a battery cell 405 is connected to a contact plate 410 via a bonding wire 415, and a top-facing negative terminal of a battery cell 420 is connected to a contact plate 425 via a bonding wire 430. The battery cells 405 and 420 belong to adjacent P groups and are connected in series via a bottom-facing positive terminal of the second battery cell 420 being connected to a contact plate 435 with a bonding wire 440, and a bottom-facing negative terminal of the battery cell 405 being connected to the contact plate 435 via a bonding wire 445. While not shown specifically in FIG. 4, the contact plate 425 may be connected in series to the positive terminal of another P group or alternatively to a negative terminal for the battery module. Likewise, while not shown specifically in FIG. 4, the contact plate 410 may be connected in series to the negative terminal of another P group or alternatively to a positive terminal for the battery module.

Referring now to the top-perspective of the "Type 1" cylindrical battery cell arrangement 400 in FIG. 4, P groups are configured with a first terminal orientation whereby battery cells are arranged with top-facing negative terminals and bottom-facing positive terminals (e.g., such as battery cell 420) or with a second terminal configuration whereby battery cells are arranged with top-facing positive terminals and bottom-facing negative terminals (e.g., such as battery cell 405). A first P group 460 is shown with the first terminal orientation, while a second P group 450 is shown with the second terminal orientation. If the "Type 1" cylindrical battery cell arrangement 400 includes no other P groups, it will be appreciated that the "Type 1" cylindrical battery cell arrangement 400 represents an example of a 2S system. As will be appreciated, each series-connected P group swaps terminal orientations relative to its adjacent P group(s), which makes assembly complex and difficult.

Figure 5:
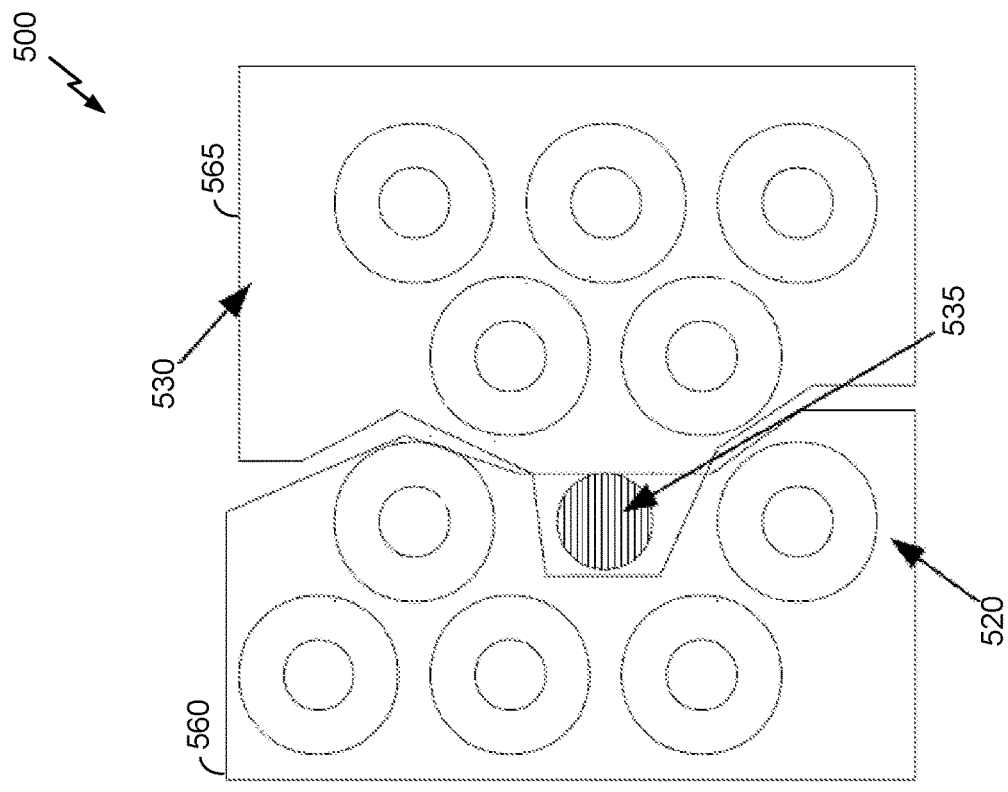
FIG. 5 illustrates a side-perspective and a top-perspective of a conventional "Type 2" cylindrical battery cell arrangement.
Figure 5:
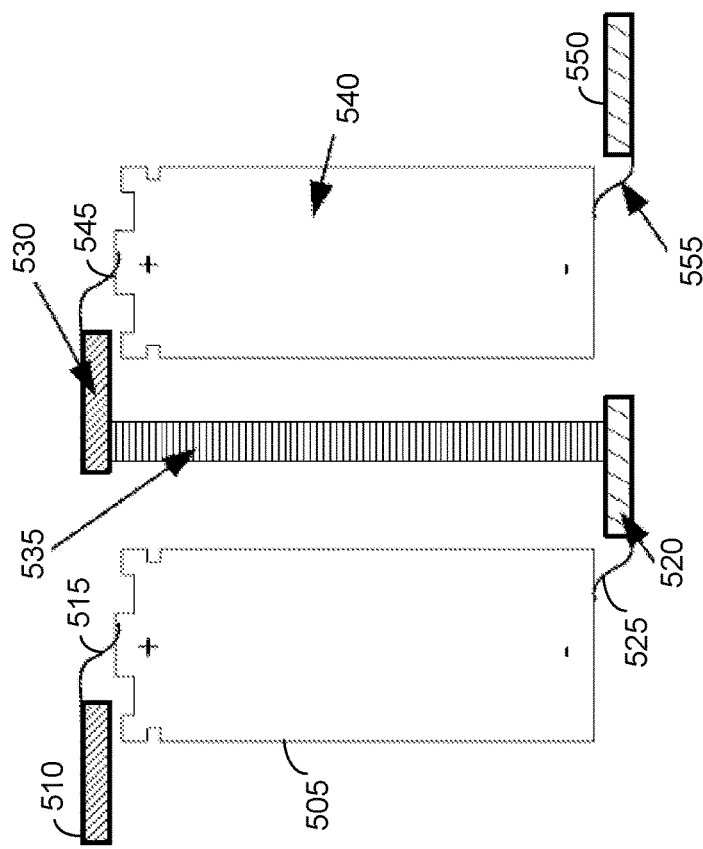

FIG. 5 illustrates a side-perspective and a top-perspective of a conventional "Type 2" cylindrical battery cell arrangement 500. Referring to the side-perspective of the "Type 2" cylindrical battery cell arrangement 500 in FIG. 5, a top-facing positive terminal of a battery cell 505 is connected to a contact plate 510 via a bonding wire 515, and a bottom-facing negative terminal of the battery cell 505 is connected to a contact plate 520 via a bonding wire 525. The negative contact plate 520 is located near the bottom of the battery cell 505, and is connected to a contact plate 530 near the top of the battery cell 505 via a connector 535. The positive contact plate 530 is connected to a top-facing positive terminal of a battery cell 540 via a bonding wire 545. A bottom-facing negative terminal of the battery cell 540 is connected to a contact plate 550 via a bonding wire 555. Accordingly, the battery cells 505 and 540 belong to adjacent P groups and are connected in series via the connector 535. While not shown specifically in FIG. 5, the contact plate 550 may be connected in series to the positive terminal of another P group or alternatively to a negative terminal for the battery module. Likewise, while not shown specifically in FIG. 5, the contact plate 510 may be connected in series to the negative terminal of another P group or alternatively to a positive terminal for the battery module.

Referring now to the top-perspective of the "Type 2" cylindrical battery cell arrangement 500 in FIG. 5, in contrast to FIG. 4, each P group is configured with the same terminal orientation (e.g., top-facing positive terminal and bottom-facing negative terminal). A first P group 560 (e.g., including battery cell 505) is connected to a second P group 565 (e.g., including battery cell 540) via the connector 535. If the "Type 2" cylindrical battery cell arrangement 500 includes no other P groups, it will be appreciated that the "Type 2" cylindrical battery cell arrangement 500 represents an example of a 2S system. As will be appreciated, the "Type 2" cylindrical battery cell arrangement 500 does not require the terminal orientation switching between adjacent P groups as in the "Type 1" cylindrical battery cell arrangement 400. However, the "Type 2" cylindrical battery cell arrangement 500 requires a separate connector (e.g., connector 535) between each adjacent P group. The current flow is routed through these connectors (e.g., connector 535), which increases the current density and resistance inside a respective battery module. Moreover, the required space for the connector 535 decreases maximum cell capacity in the battery module.

Referring to FIGS. 4-5, the "Type 1" cylindrical battery cell arrangement 400 in FIG. 4 and the "Type 2" cylindrical battery cell arrangement 500 in FIG. 5 both require a "turnover" of the battery cells during assembly of the battery module. This is required because cell terminal connections are made on both sides (i.e., top and bottom) of the battery cells. So, with respect to FIG. 4 as an example, assume that battery cells 405 and 420 may be installed into a battery module housing such that the "bottom" of the battery cells 405 and 420 (as depicted in FIG. 4) are exposed. At this point, a technician may weld (or otherwise fuse) bonding wires 440 and 445 to the contact plate 435. At this point, the technician cannot reach the cell terminals at the "top" of the battery cells 405 and 420 (as depicted in FIG. 4), and thereby turns over (or flips) the battery module housing. Once turned over, the technician welds (or otherwise fuses) the bonding wires 415 and 430 to the contact plates 410 and 425, respectively. As will be appreciated, this "turnover" requirement slows down the bonding process, and can also be difficult simply due to the battery modules being relatively heavy. In an example, the "turnover" problem can be avoided in certain embodiments of the disclosure which are described below in more detail due to both positive/negative cell terminals being arranged on the same end of the battery cells.

Moreover, referring to FIGS. 4-5, the bonding connectors used in the "Type 1" cylindrical battery cell arrangement 400 in FIG. 4 and the "Type 2" cylindrical battery cell arrangement 500 in FIG. 5 may be conventionally implemented as round wires that are fused via an ultrasonic welding process. By contrast, in certain embodiments of the disclosure, a laser-welding process may be used to form bonding connectors in a manner that is faster than the conventional ultrasonic-based bonding process described above with respect to FIGS. 4-5. For laser welding, materials with the same or similar melting point may be used for a reliable connection and/or to increase welding speed. For example, if the positive and/or negative terminals of a particular battery cell are made from steel (e.g., Hilumin), the bonding connector between the busbar (e.g., a multi-layer contact plate, as described below in more detail) may be made from steel (e.g., Hilumin) or some other material that is compatible with the welding process. However, even though laser welding may be slowed somewhat if the bonding connectors are made from different materials with differential electrical properties, such implementations are still possible and are encompassed by various embodiments of the disclosure (e.g., laser welding Al to steel, Al to Cu, Cu to steel, etc.). Also, in some embodiments of the disclosure, the bonding connectors are implemented as flat metal bands (or "ribbons") instead of round wires as in FIGS. 4-5. As noted above, in some embodiments, the bonding connectors may either be mechanically connected to, or integrated within, the contact plate in order to form the cell terminal connections between battery cell terminals and the contact plate. Laser welding of bonding connectors (or contact tabs) is discussed in more detail below with respect to FIGS. 16A-16L.

Embodiments of the disclosure are thereby directed to multi-layer contact plates which each include at least one primary conductive layer and a cell terminal connection layer. Generally, during operation, most of the current passing through the multi-layer contact plate is carried via the at least one primary conductive layer (e.g., Al or Cu), with the cell terminal connection layer configured to form bonding connectors that are configured to connect (e.g., via welding, etc.) to cell terminals of battery cells in one or more P groups. Each cell terminal connection layer is an integrated part of its respective multi-layer contact plate before the multi-layer contact plates are installed into the hybrid contact plate arrangement (e.g., in contrast to some type of wire or welding material that is simply connected to single-layer contact plates to form cell connections during battery module assembly).

In an example, multiple primary conductive layers may be used to "sandwich" the cell terminal connection layer (e.g., the cell terminal connection layer sits in-between top and bottom primary conductive layers). Alternatively, a two-layer contact plate may be used, with the cell terminal connection layer being secured to a single conductive layer without the "sandwich" structure (e.g., the cell terminal connection layer, such as some type of foil, is cladded (pressed) firmly against the thicker primary conductive layer to form a good contact area and thereby decrease transition resistance of current flowing between the cell terminal connection layer and the primary conductive layer).

In a further example, the at least one primary conductive layer and the cell terminal connection layer may be made from either the same or different materials. In one example, the at least one primary conductive layer may be made from Al or Cu, while the cell terminal connection layer is made from less-conductive steel to match the steel used for the battery cell terminals (e.g., as in most cylindrical battery cells, such as 18650 cells). In another example, if battery cell terminals use Al or Cu (e.g., for pouch cells and/or prismatic cells), the at least one primary conductive layer may be made from Al or Cu. Even if configured with the same (or similar) material, the at least one primary conductive layer and the cell terminal connection layer may include structural differences, as will be explained below in more detail (e.g., the at least one primary conductive layer may be made from relatively thick block(s) of Al or Cu, while the cell terminal connection layer is made from a thinner layer of Al or Cu, such as foil, which is secured to and/or sandwiched between the conductive layer(s)).

In an example related to the "sandwich" configuration for the multi-layer contact plate, each multi-layer contact plate may include top and bottom conductive layers made from a first material (e.g., Al or Cu) with a first conductivity, with the cell terminal connection layer being sandwiched between the top and bottom conductive layers and made from the same or different material (e.g., Al, Cu or steel). In an example where the cell terminal connection layer is made from a second material (e.g., steel) with a second conductivity (e.g., lower than the first conductivity), the second material may match (or be compatible with) the material of the positive and/or negative terminals of the battery cells. For example, in 18650 cells, the terminals may be a cold-rolled, nickel-plated steel sheet. For this material, the bonding connector in each terminal's contact area may be made from a comparable material which facilitates the welding process. However, it is also possible to weld disparate materials together, so the cell terminal connection layer need not match the material of the cell terminals in certain embodiments.

In a further example, the cell terminal connection layer may optionally be at least partially removed in areas that are not directly aligned with and/or in close proximity to the contact areas where the cell terminal connection layer is used to form the bonding connectors. Removing the cell terminal connection layer in these areas may help to reduce weight and/or increase the overall conductivity of the multi-layer contact plate. For example, the primary conductive layers may be more conductive than the cell terminal connection layer, in which case extra material for the cell terminal connection layer that is not needed to form the bonding connectors may increase transition resistance between the respective layers and reduce the overall conductivity of the multi-layer contact plate. So, while referred to as a cell terminal connection "layer", it will be appreciated that different sections of the cell terminal connection layer may actually be separate pieces that are not in direct contact with each other due to the optional material removal.

As will be described below, multi-layer contact plates may be arranged as part of a "hybrid" contact plate arrangement. The hybrid contact plate arrangement may include a plurality of single-layer and/or multi-layer contact plates which are each separated from one or more adjacent contact plates with an insulation layer. In the case of a hybrid contact plate arrangement with multi-layer contact plates, the insulation layer is made from a different material (e.g., plastic) than either the at least one primary conductive layer and/or the cell terminal connection layer, which is one reason why this arrangement of multi-layer contact plates is referred to herein as a "hybrid" contact plate arrangement. However, hybrid contact plate arrangements may alternatively comprise single-layer contact plates, and do not expressly require the multi-layer contact plates described herein. Moreover, the hybrid contact plate arrangement is positioned on one side (e.g., top or bottom) of the respective battery cells. So, while the embodiments described below depict the hybrid contact plate arrangement being positioned on one side of the respective battery cells, this is primarily for convenience of explanation and the embodiments of the disclosure are not limited to this configuration.

Figure 6:
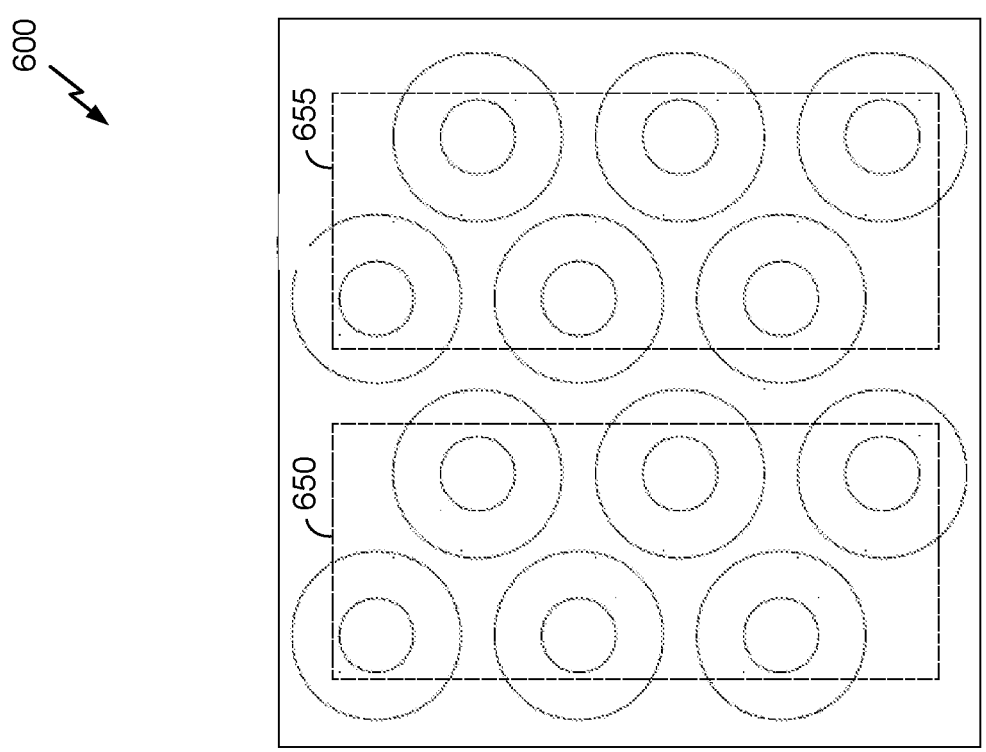
FIG. 6 illustrates a side-perspective and a top-perspective of a "Type 1" cylindrical battery cell arrangement in accordance with an embodiment of the disclosure.
Figure 6:
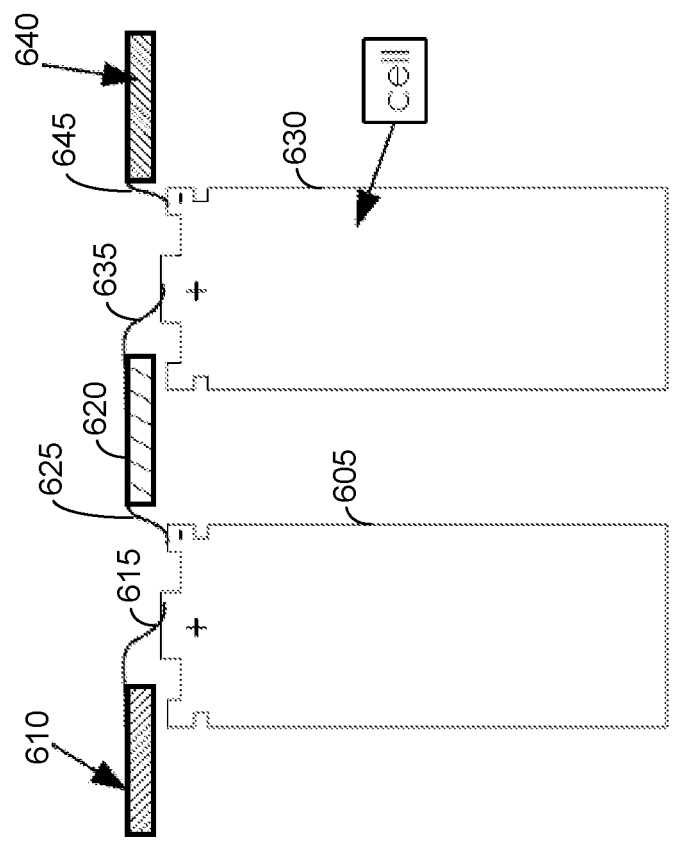

FIG. 6 illustrates a side-perspective and a top-perspective of a "Type 1" cylindrical battery cell arrangement 600 in accordance with an embodiment of the disclosure. In particular, the "Type 1" cylindrical battery cell arrangement 600 that incorporates multi-layer contact plates, which will be described in more detail below.

Referring to the side-perspective of the "Type 1" cylindrical battery cell arrangement 600 in FIG. 6, each battery cell is implemented as a cylindrical "can" that includes both a top-facing positive terminal and a top-facing negative terminal, without any bottom-facing terminals. In certain embodiments which will be described in more detail below, the top-facing positive terminal occupies an "inner" top-facing section of the battery cell (or cell "head"), while the top-facing negative terminal occupies an "outer" top-facing section of the battery cell along the cell periphery (or cell "rim"). As used herein, "top-facing" is relative to how the battery cells are oriented upon insertion into a respective battery housing of a battery module in certain embodiments of the disclosure. However, in other embodiments (e.g., where the multi-layer contact plates are arranged on the "bottom" of the battery module beneath the battery cells), the positive and negative terminals may both be "bottom-facing". Accordingly, in general, while the positive and negative terminals are configured on the same "end" of the battery cells, this end need not be the top-facing end of the battery cells in all embodiments.

Referring to FIG. 6, a top-facing positive terminal of a battery cell 605 is connected to a first multi-layer contact plate 610 via a bonding connector 615 (e.g., which may implemented as a thin filament or ribbon, and may be made out of steel, for example), and a top-facing negative terminal of the battery cell 605 is connected to a second multi-layer contact plate 620 via a bonding connector 625 (e.g., a bonding ribbon). A top-facing positive terminal of a battery cell 630 is connected to the second multi-layer contact plate 620 via a bonding connector 635 (e.g., a bonding ribbon), and a top-facing negative terminal of the battery cell 630 is connected to a third multi-layer contact plate 640 via a bonding connector 645 (e.g., a bonding ribbon). In FIG. 6, the battery cells 605 and 630 belong to adjacent P groups and are connected in series via the second multi-layer contact plate 620.

As will be described below in more detail, the multi-layer contact plates 610, 620 and 640 may each be formed with at least one primary conductive layer (e.g., Al or Cu) that sandwiches and/or is attached to a cell terminal connection layer (e.g., a thin sheet of Al, Cu or steel such as Hilumin), with the bonding connectors 615, 625, 635 and 645 being formed from the respective cell terminal connection layers. Alternatively, the contact plates 610, 620 and 640 may be implemented as single-layer contact plates (e.g., Al or Cu), with the bonding connectors 615, 625, 635 and 645 being added during assembly of the hybrid contact plate arrangement.

Referring now to the top-perspective of the "Type 1" cylindrical battery cell arrangement 600 in FIG. 6, each P group is configured with the same terminal orientations, and each battery cell includes both a top-facing positive terminal and a top-facing negative terminal. A first P group 650 (e.g., including battery cell 605 or 630) is connected to a second P group 655 (e.g., including battery cell 605 or 630) in series via the second multi-layer contact plate 620. If the "Type 1" cylindrical battery cell arrangement 600 includes no other P groups, it will be appreciated that the "Type 1" cylindrical battery cell arrangement 600 represents an example of a 2S system, with the third multi-layer contact plate 640 configured as a negative terminal (or negative pole contact plate, such as 305 in FIG. 3) for the battery module (e.g., which is either part of or coupled to one of the HV connectors, such as 205 in FIG. 2), and the first multi-layer contact plate 610 configured as a positive terminal (or positive pole contact plate, such as 310 in FIG. 3) for the battery module (e.g., which is either part of or coupled to one of the HV connectors 205). However, as noted above, the number of P groups is scalable, such that the third multi-layer contact plate 640 may be connected to the positive terminal of another P group to form another in-series connection. Likewise, while not shown specifically in FIG. 6, the first multi-layer contact plate 610 may be connected in series to the negative terminal of another P group.

As will be appreciated, because the multi-layer contact plates 610, 620 and 640 are each arranged on the same side (e.g., on top) of the P groups, the multi-layer contact plates 610, 620 and 640 can be arranged together, along with one or more intervening insulation layers, as a hybrid contact plate arrangement. It will be appreciated that a hybrid contact plate arrangement comprising multiple contact plates on the same side of the battery cells to facilitate series connections between P groups is not possible in the "Type 1" cylindrical battery cell arrangement 400 because the contact plates 410/425 are on a different side of the battery cells 405 and 420 compared to contact plate 435. Likewise, it will be further appreciated that a hybrid contact plate arrangement comprising multiple contact plates on the same side of the battery cells to facilitate series connections between P groups is not possible in the "Type 2" cylindrical battery cell arrangement 500 because the contact plates 510/530 are on a different side of the battery cells 405 and 420 compared to the contact plate 520. While many of the embodiments described below relate to multi-layer contact plates, it will be appreciated that hybrid contact plate arrangements on one side of the battery cells in a battery module to facilitate in-series connections of P groups can be implemented either with multi-layer contact plates or with single-layer contact plates (e.g., solid contact plates comprising Al or Cu without an integrated cell terminal connection layer). For single-layer contact plates, the bonding connectors may be added when welding the single-layer contact plate to corresponding cell terminals because the cell terminal connection layer is not integrated within the single-layer contact plate (e.g., the bonding connectors may be welded to both the single-layer contact plate and cell terminals during the same welding procedure, because the bonding connectors are not components of the single-layer contact plate).

Moreover, while the multi-layer contact plates 610, 620 and 640 are each arranged on the same side of the P groups as part of the hybrid contact plate arrangement in FIG. 6, it will be appreciated that the multi-layer contact plates 610, 620 and 640 may also be implemented in legacy battery cell arrangements, such as the "Type 1" cylindrical battery cell arrangement 400 of FIG. 4 or the "Type 2" cylindrical battery cell arrangement 500 of FIG. 5. Accordingly, the multi-layer contact plates 610, 620 and 640 are not required to be implemented in the hybrid contact plate arrangement.

As will be appreciated, configuring each battery cell with the same orientation (e.g., with both a top-facing positive terminal and a top-facing negative terminal) as in FIG. 6 reduces assembly costs and complexity. Also, in an example, current conducted over each multi-layer contact plate can use the whole width of the respective multi-layer contact plate (e.g., the at least one primary conductive layer, as well as the cell terminal connection layer) even though only the cell terminal connection layer is used to form the respective bonding connectors to the battery cell terminals. Moreover, the problem of high current density over the connector 535 in the "Type 2" cylindrical battery cell arrangement 500 of FIG. 5 is mitigated in the embodiment of FIG. 6.

Figure 7A:
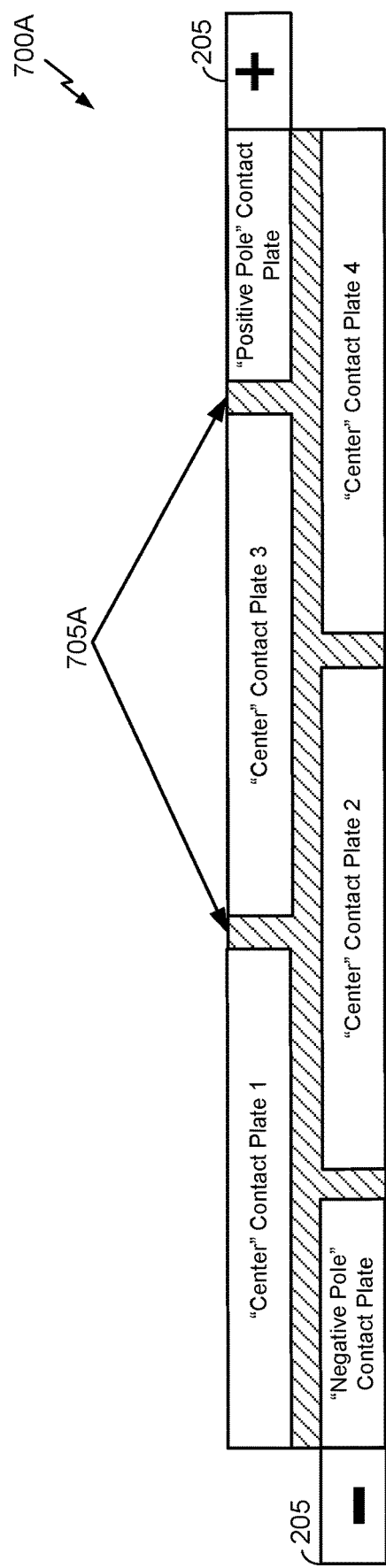
FIG. 7A illustrates a hybrid contact plate arrangement in accordance with an embodiment of the disclosure.

FIG. 7A illustrates a hybrid contact plate arrangement 700A in accordance with an embodiment of the disclosure. Referring to FIG. 7A, a "negative" HV connector 205 is connected to a "negative pole" contact plate, and a "positive" HV connector 205 is connected to a "positive pole" contact plate (e.g., the respective HV connectors may be integrated as part of the associated contact plates or simply coupled to the associated contact plates). Also included as part of the hybrid contact plate arrangement 700A are "center" contact plates 1-4. It will be appreciated that the hybrid contact plate arrangement 700A is configured for a 5S system configuration (e.g., to connect 5 P groups in series, or N=5). Each contact plate is separated from each other contact plate in the hybrid contact plate arrangement 700A by an insulation layer 705A, which is one reason why the hybrid contact plate arrangement 700A may be characterized as a "hybrid" arrangement.

Figure 7B:
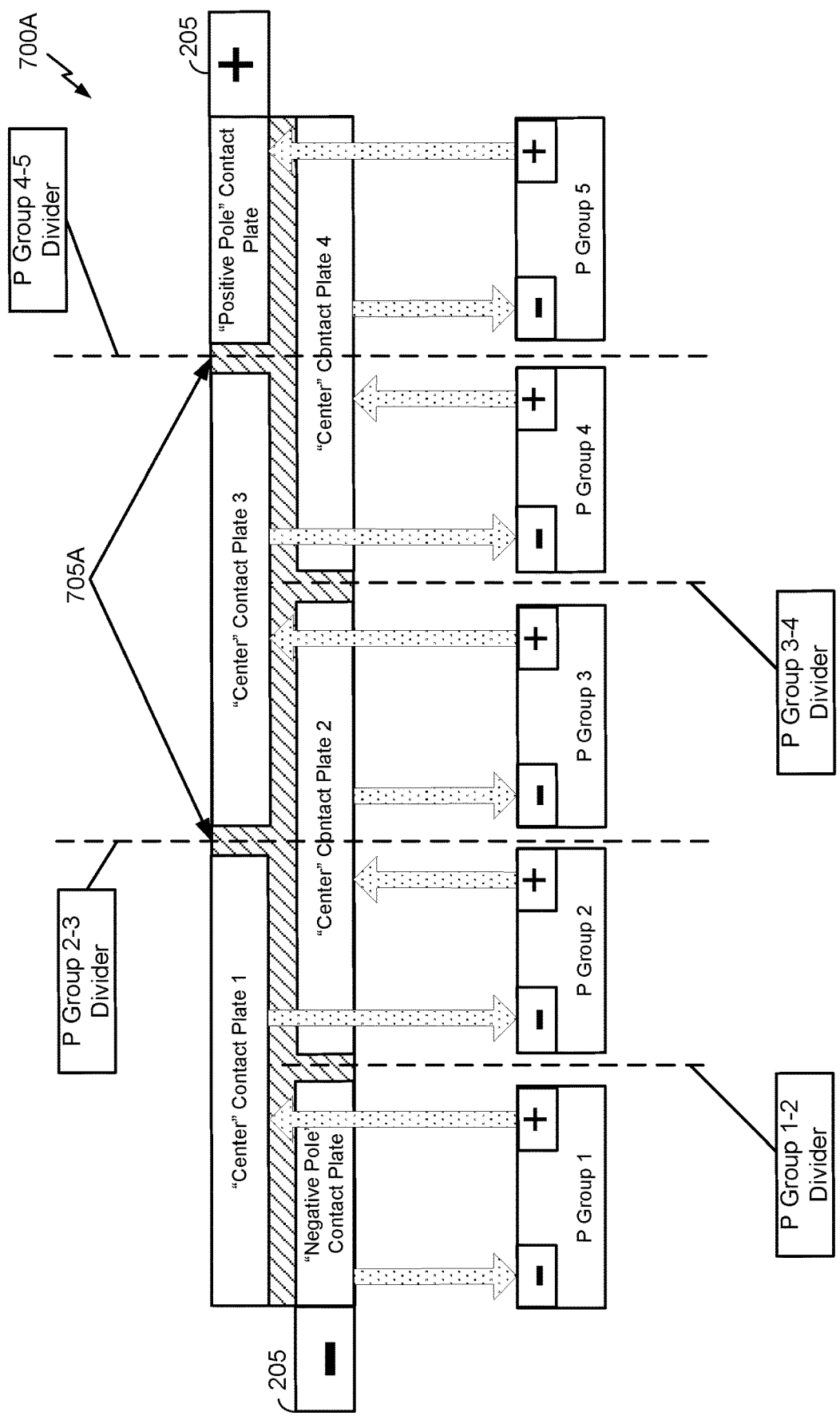
FIG. 7B illustrates the hybrid contact plate arrangement of FIG. 7A being arranged on top of P groups 1-5 in accordance with an embodiment of the disclosure.

FIG. 7B illustrates the hybrid contact plate arrangement 700A being arranged on top of P groups 1-5 in accordance with an embodiment of the disclosure. The dotted arrows in FIG. 7B convey the flow of current between P groups 1-5 and the respective contact plates. This flow of current may be facilitated via bonding connectors between individual battery cell terminals in the respective P groups 1-5 and corresponding contact plates, which are described in more detail below. Also marked in FIG. 7B are dividers between "adjacent" P groups (e.g., P groups 1-2, P groups 2-3, P groups 3-4 and P groups 4-5. In an example, the dividers may be sections of the hybrid contact plate arrangement 700A occupied by the insulation layer 705A.

In a further example, the dividers between the respective P groups may be aligned with dividers between adjacent contact plates on the same "level" of an alternating semi-stacked layout of the contact plates within the hybrid contact plate arrangement 700A. For example, the "negative pole" contact plate and "center" contact plates 2, 4 are on a lower level of the hybrid contact plate arrangement 700A, and the "center" contact plates 1, 3 and "positive pole" contact plate are on an upper level of the hybrid contact plate arrangement 700A (e.g., in other embodiments, the level arrangements can be swapped and/or otherwise modified to accommodate higher or lower numbers of P groups, such that the "negative pole" contact plate is on the upper level, etc.). So, on the lower level, the "negative pole" contact plate is adjacent to "center" contact plate 2, and "center" contact plate 2 is adjacent to "center" contact plate 4. On the upper level, "center" contact plate 1 is adjacent to "center" contact plate 3, and "center" contact plate 3 is adjacent to the "positive pole" contact plate. Accordingly, the P group 1-2 divider corresponds to a divider between the "negative pole" contact plate and the "center" contact plate 2, and so on.

Moreover, as will be discussed in more detail below, "center" contact plates may include contact areas (or holes) where bonding connectors are fused with battery cell terminals of battery cells in respective P groups. These contact areas may be clustered together so that one side of a "center" contact plate includes all the contact areas for establishing electrical connections to a first P group, and another side of the "center" contact plate includes all the contact areas for establishing electrical connections to a second P group. In certain embodiments, the various P group dividers shown in FIG. 7B may also be aligned with an area of the "center" contact plate between the clustered P group-specific contact area. So, the battery cells in the P groups may be clustered in the battery module, and the contact areas that align with these battery cells may be likewise clustered in the "center" contact plates of the hybrid contact plate arrangement 700A. It will be appreciated that the contact areas in the "positive pole" contact plate and "negative pole" contact plate are each configured for connection to the same P group, such that P group-based clustering of contact areas is implicit.

Figure 8A:
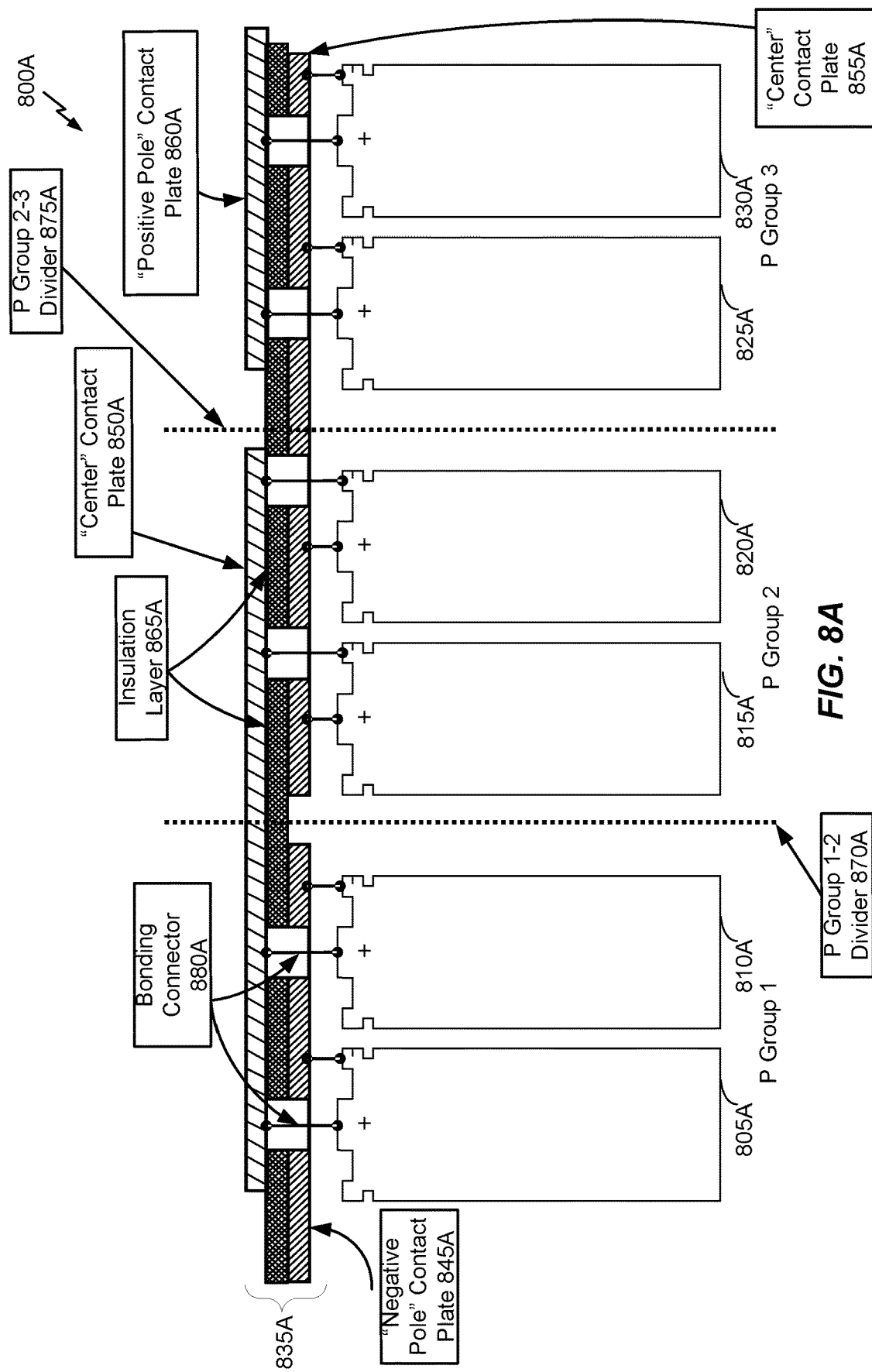
FIG. 8A illustrates a side-perspective of a "Type 1" cylindrical battery cell arrangement in accordance with another embodiment of the disclosure.
Figure 8B:
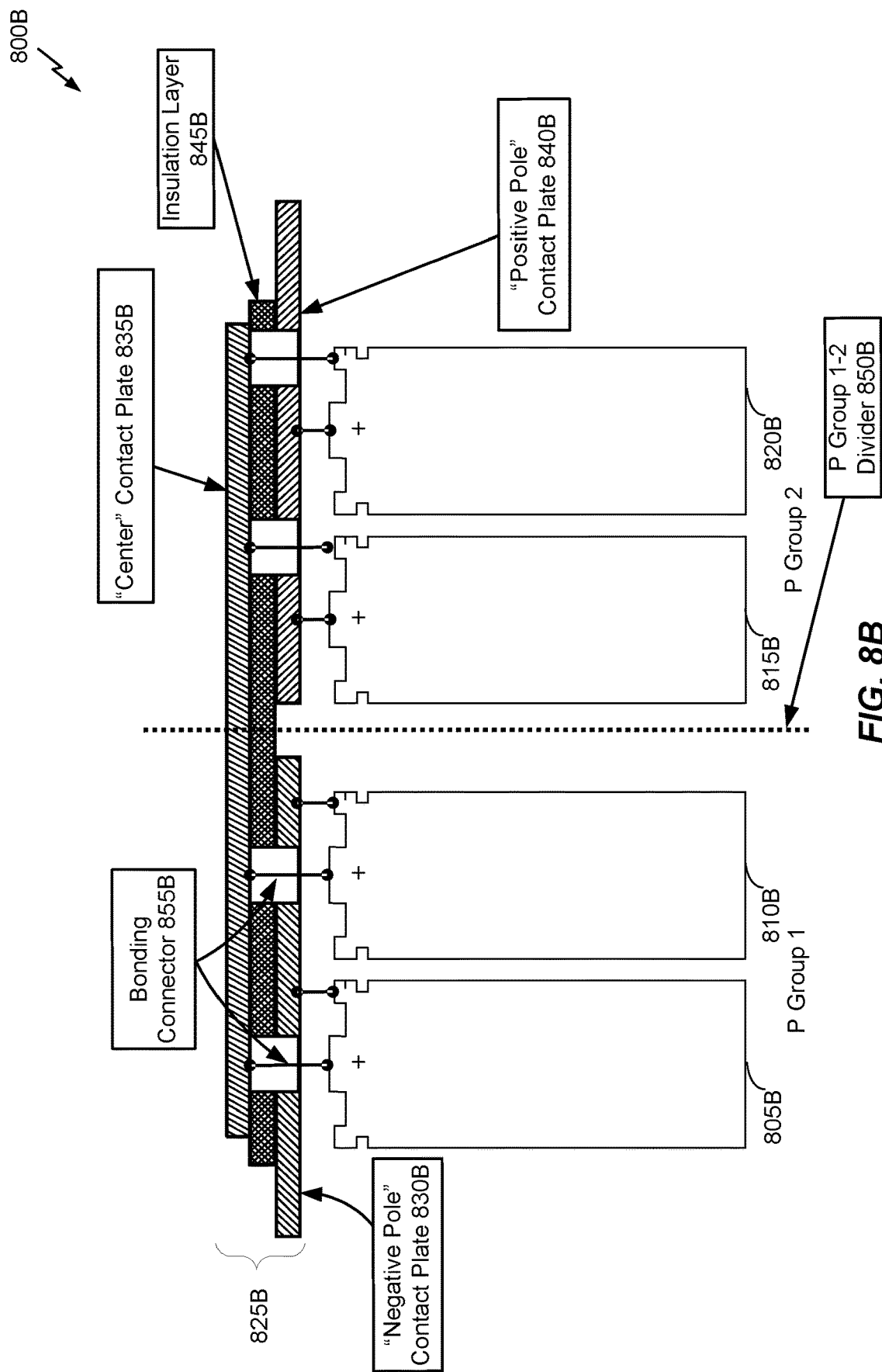
FIG. 8B illustrates a side-perspective of a "Type 1" cylindrical battery cell arrangement in accordance with another embodiment of the disclosure.

Below, FIGS. 8A-8B illustrate implementations that are somewhat similar to the hybrid contact plate arrangement 700A depicted in FIGS. 7A-7B, although FIGS. 8A-8B relate to examples involving different number of P groups and depict additional detail with respect to the electrical inter-connections between individual batteries of the P groups and corresponding contact plates.

FIG. 8A illustrates a side-perspective of a "Type 1" cylindrical battery cell arrangement 800A in accordance with another embodiment of the disclosure. In particular, the "Type 1" cylindrical battery cell arrangement 800A is a more detailed example implementation of the "Type 1" cylindrical battery cell arrangement 600 of FIG. 6 for a battery module for a 3S system configuration that includes three P groups denoted as P groups 1, 2 and 3. So, in context with P groups 1 . . . N in FIG. 3, N=3 in the example depicted in FIG. 8A. P group 1 includes battery cells 805A and 810A, P group 2 includes battery cells 815A and 820A, and P group 3 includes battery cells 825A and 830A. So, in context with battery cells 1 . . . M in FIG. 3, M=2 in the example depicted in FIG. 8A. The various contact plates described below with respect to FIG. 8A are described below as multi-layer contact plates (e.g., with an integrated cell terminal connection layer from which bonding connectors are formed). However, as noted above, single-layer contact plates (e.g., without the integrated cell terminal connection layer) may be used in place of the multi-layer contact plates in other embodiments.

Referring to FIG. 8A, a hybrid contact plate arrangement 835A is deployed on top of P groups 1-3. The hybrid contact plate arrangement 835A is configured with a plurality of contact plates, including multi-layer contact plates 845A, 850A, 855A and 860A, and an insulation layer 865A. The multi-layer contact plate 845A is either part of or coupled to the negative terminal of the battery module (e.g., 305 of FIG.

3), and may be referred to as a "negative pole" contact plate. Also, the multi-layer contact plate 860A is either part of or coupled to the positive terminal of the battery module (e.g., 310 of FIG. 3), and may be referred to as a "positive pole" contact plate. The multi-layer contact plates 850A and 855A are not directly connected to either the positive or negative terminals of the battery module, and may thereby be referred to as "center" contact plates.

Referring to FIG. 8A, a divider 870A, or separation, is configured between the multi-layer contact plates 845A and 855A. Thus, multi-layer contact plates 845A and 855A are insulated from each other and thereby not directly coupled. A divider 875A, or separation, is also configured between the multi-layer contact plates 850A and 860A. Thus, multi-layer contact plates 850A and 860A are insulated from each other and thereby not directly coupled. In an example, the dividers 870A and 875A may comprise some form of insulation (e.g., part of insulation layer 865A). A number of bonding connectors (e.g., bonding ribbons) 880A are depicted in FIG. 8A, each of which connects a top-facing positive terminal or a top-facing negative terminal of the battery cells 805A through 830A to one of multi-layer contact plates 845A, 850A, 855A and 860A in a respective cell contact area (e.g., an "opening" in the hybrid contact plate arrangement 835A configured over each battery cell), as will be described below in more detail. In an example, the bonding connectors 880A may be formed from the cell terminal connection layer of the respective multi-layer contact plates 845A, 850A, 855A and 860A. Alternatively, if some or all of the multi-layer contact plates 845A, 850A, 855A and 860A are replaced with single-layer contact plates, the bonding connectors 880A may be added during battery module assembly.

Referring to FIG. 8A, top-facing negative terminals of battery cells 805A and 810A in P group 1 are coupled to the multi-layer contact plate 845A, while top-facing positive terminals of battery cells 805A and 810A in P group 1 are coupled to the multi-layer contact plate 850A. Further, top-facing negative terminals of battery cells 815A and 820A in P group 2 are coupled to the multi-layer contact plate 850A, while top-facing positive terminals of battery cells 815A and 820A in P group 2 are coupled to the multi-layer contact plate 855A. Further, top-facing negative terminals of battery cells 825A and 830A in P group 3 are coupled to the multi-layer contact plate 855A, while top-facing positive terminals of battery cells 825A and 830A in P group 3 are coupled to the multi-layer contact plate 860A. So, P groups 1, 2 and 3 are connected in series, with the multi-layer contact plate 845A functioning as the "negative pole" contact plate (or negative terminal) of the battery module (e.g., as in 305 of FIG. 3), while the multi-layer contact plate 860A functions as the "positive pole" contact plate (or positive terminal) of the battery module (e.g., as in 310 of FIG. 3).

FIG. 8B illustrates a side-perspective of a "Type 1" cylindrical battery cell arrangement 800B in accordance with another embodiment of the disclosure. In particular, the "Type 1" cylindrical battery cell arrangement 800B is a more detailed example implementation of the "Type 1" cylindrical battery cell arrangement 600 of FIG. 6 for a battery module with a 2S system configuration that includes two P groups denoted as P groups 1 and 2. So, in context with P groups 1 ... N in FIG. 3, N=2 in the example depicted in FIG. 8B. P group 1 includes battery cells 805B and 810B, and P group 2 includes battery cells 815B and 820B. So, in context with battery cells 1 ... M in FIG. 3, M=2 in the example depicted in FIG. 8B. The various contact plates described below with respect to FIG. 8B are described below as multi-layer contact plates (e.g., with an integrated cell terminal connection layer from which bonding connectors are formed). However, as noted above, single-layer contact plates (e.g., without the integrated cell terminal connection layer) may be used in place of the multi-layer contact plates in other embodiments.

Referring to FIG. 8B, a hybrid contact plate arrangement 825B is deployed on top of P groups 1 and 2. The hybrid contact plate arrangement 825B includes multi-layer contact plates 830B, 835B and 840B, and an insulation layer 845B. The multi-layer contact plate 830B is part of and/or coupled to the negative terminal of the battery module, and may be referred to as a "negative pole" contact plate. Also, the multi-layer contact plate 840B is part of and/or coupled to the positive terminal of the battery module, and may be referred to as a "positive pole" contact plate. The multi-layer contact plate 835B is not directly connected to either the positive or negative terminals of the battery module, and may thereby be referred to as a "center" contact plate.

Referring to FIG. 8B, a divider 850B, or separation, is configured between the multi-layer contact plates 830B and 840B. Thus, multi-layer contact plates 830B and 840B are insulated from each other and thereby not directly coupled. The divider 850B may comprise some form of insulation (e.g., part of insulation layer 845B). A number of bonding connectors (e.g., bonding ribbons) 855B are depicted in FIG. 8B, each of which connects a top-facing positive terminal or a top-facing negative terminal of the battery cells 805B through 820B to one of multi-layer contact plates 830B, 835B and 840B in a respective cell contact area (e.g., an "opening" in the hybrid contact plate arrangement 825B configured over each battery cell), as will be described below in more detail. In an example, the bonding connectors 855B may be formed from the cell terminal connection layer of the respective multi-layer contact plates. Alternatively, if some or all of the multi-layer contact plates 830B, 835B and 840B are replaced with single-layer contact plates, the bonding connectors 855B may be added during battery module assembly.

Referring to FIG. 8B, top-facing negative terminals of battery cells 805B and 810B in P group 1 are coupled to the multi-layer contact plate 830B, while top-facing positive terminals of battery cells 805B and 810B in P group 1 are coupled to the multi-layer contact plate 835B. Further, top-facing negative terminals of battery cells 815B and 820B in P group 2 are coupled to the multi-layer contact plate 835B, while top-facing positive terminals of battery cells 815B and 820B in P group 2 are coupled to the multi-layer contact plate 840B. So, P groups 1 and 2 are connected in series, with the multi-layer contact plate 830B functioning as the "negative pole" contact plate (or negative terminal) of the battery module (e.g., as in 305 of FIG. 3), while the multi-layer contact plate 840B functions as the "positive pole" contact plate (or positive terminal) of the battery module (e.g., as in 310 of FIG. 3).

Figure 9:
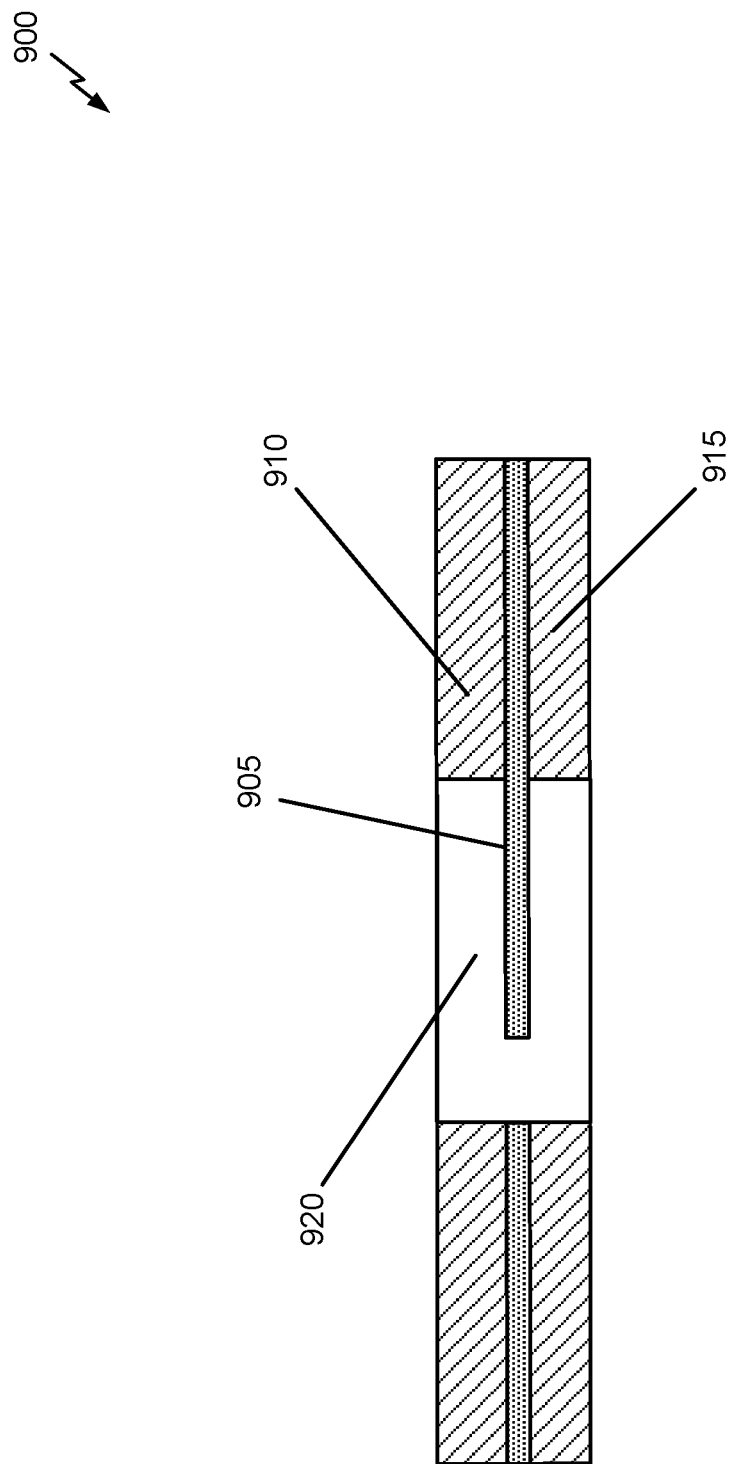
FIG. 9 illustrates a side-perspective of a portion of a multi-layer contact plate in accordance with an embodiment of the disclosure.

FIG. 9 illustrates a side-perspective of a portion of a multi-layer contact plate 900 in accordance with an embodiment of the disclosure. In particular, the multi-layer contact plate 900 is depicted as a three-layer contact plate. In an example, the multi-layer contact plate 900 may be based on joining a series of "clad" sheets, which form the layers of the multi-layer contact plate 900. More specifically, in one embodiment, the cell connection terminal layer of the multi-layer contact plate 900 is implemented as a middle or intermediate (e.g., steel) sheet 905 that is joined with more highly conductive (e.g., Al or Cu) sheets 910 and 915 (e.g., the primary conductive layers) produced by a cold-welding process. In an example, etching and/or corrosion processes, as examples, may be used to remove conductive material from the welding partner of the battery cell near contact areas 920. The contact area 920 may correspond to the "holes" from which the bonding connectors are joined to the top-facing terminals of battery cells 805A through 830A in FIG. 8A. In other words, the bonding connectors are not threaded "through" the contact area 920 like a needle (e.g., with the bonding connectors being attached to a top portion of the multi-layer contact plate 900 that is outside of the "hole" or contact area 920). Rather, in certain embodiments, the bonding connectors may be formed from an integrated cell terminal connection layer (e.g., the intermediate sheet 905), such that the bonding connectors can be said to protrude out of (or join with) an interior sidewall of the "hole" or contact area 920 itself. Hence, bonding connectors configured in this manner (e.g., from an integrated layer within the multi-layer contact plate) help to form an electrical connection from a cell terminal to a position "in" the hole, instead of "through" the hole. Accordingly, the portion of the intermediate sheet 905 in the contact area 920 may be used as a bonding connector (or ribbon) to connect to a positive or negative terminal of a battery cell (e.g., by pushing the bonding connector downwards and then welding the bonding connector onto a cell terminal). In an example, as will be described below in more detail, the portion of the intermediate sheet 905 in the contact area 920 may include one or more contact tabs that are configured to be welded to positive and/or negative top-facing terminals of a battery cell.

Referring to FIG. 9, the conductive sheets 905-915 may be prepared before the joining process that forms the multi-layer contact plate 900 in at least one embodiment. For example, the conductive sheets 910 and 915 may be stamped (e.g., to create the openings or contact areas, such as contact area 920 in FIG. 9, where the bonding connectors are positioned) and then joined with the intermediate sheet 905. Alternatively, instead of stamping, the conductive sheets 910 and 915 may undergo drilling, milling, water jet cutting, etching, and/or laser cutting to define the openings or contact areas. In an example, manufacturers may have problems with interrupted geometries, in which case the conductive sheets 910 and 915 may be joined via cladding, soldering, brazing or clinching.

Referring to FIG. 9, it will be appreciated that while many of the embodiments described herein are characterized with respect to cylindrical battery cells, a number of these embodiments are also applicable to pouch cells and/or prismatic cells. In an example, battery modules comprised of battery cells with different cell types may be deployed in energy systems (e.g., some battery modules may comprise cylindrical battery cells while other battery modules in the same energy storage system comprise pouch cells or prismatic cells).

In cylindrical battery cells, it is common for the cell terminals to be made from steel, which is one reason why the bonding connectors (e.g., which may be formed from the intermediate sheet 905 in an example) may also be made of steel. However, some pouch cells and/or prismatic cells use other materials for their respective cell terminals, such as Al or Cu. In an embodiment where the intermediate sheet 905 is selected specifically to match the cell terminal material, this means that the intermediate sheet 905 may be made from Al or Cu, resulting in an Al—Al—Al contact plate (e.g., two relatively thick Al primary conductive layers sandwiching a thinner and more flexible Al-based cell terminal connection layer, such as Al foil) or an Al—Cu—Al contact plate (e.g., two relatively thick Al primary conductive layers sandwiching a thinner and more flexible Cu-based cell terminal connection layer, such as Cu foil).

Moreover, the cell terminal connection layer may itself be subdivided so as to comprise different materials. For example, assume that a "center" multi-layer contact plate is connecting two P groups in series with different materials on their cell terminals (e.g. Cu on negative terminals and Al on positive terminals), with a first of the P groups contacting the negative terminals with a first contacting sheet metal section of the cell terminal connection layer made out of Cu and a second of the P groups contacting the positive terminals with a second contacting sheet metal section of the cell terminal connection layer made out of Al. In an example, the above-noted material differential between the positive and negative terminals may occur with respect to a prismatic cell configuration for a battery module, although it is also possible in conjunction with cylindrical cells that are configured with different terminal materials (e.g., positive steel terminal with negative Al or Cu terminal or vice versa, positive Cu terminal with negative Al terminal or vice versa, etc.).

So, the Al, Cu or steel sheets are aligned with the contact areas of the P groups. The Al, Cu and steel sheets may then be joined to form a "hybrid" cell terminal connection layer that includes different materials (e.g., Al, Cu or steel) for the bonding connectors with respect to different contact areas. The "hybrid" cell terminal connection layer of the "center" multi-layer contact plate may also be used in a "center" two-layer contact plate described below in more detail.

In a further example, at least one primary conductive layer of the multi-layer contact plate 900 may include different sections made from different materials. In one particular example, the different sections of the at least one primary conductive layer may be aligned with the material used for the cell terminal connection layer (or intermediate sheet 905) in those sections. In an example, assume that a "hybrid" cell terminal connection layer in a "center" multi-layer contact plate includes a first section made from a first material (e.g., Al, Cu, steel, an alloy thereof, etc.) for connecting to cell terminals of a first P group, and a second section made from a second material (e.g., Al, Cu, steel, an alloy thereof, etc.) different from the first material for connecting to cell terminals of a second P group. The first and second sections of the cell terminal connection layer include different subsets of bonding connectors for connecting to the first and second P groups. In this case, at least one section of the at least one primary conductive layer aligned with (e.g., positive on top of or below) the first and/or second sections of the "hybrid" cell terminal connection layer may be made from the same material type (e.g., to reduce a transition resistance as current flows from the bonding connector). So, if one of the bonding connector subsets is made from Al or Cu, the primary conductive layer section(s) aligned with that bonding connector subset may likewise be made from Al or Cu in an example. However, if one of the bonding connector subsets is made from steel, the primary conductive layer section(s) aligned with that bonding connector subset may be made from a different material (e.g., Al or Cu) because the higher conductivity of Al or Cu may be more desirable through the primary conductive layer due to the higher resistance of steel irrespective of the transition resistance.

A primary conductive layer that comprises different material types as noted in the examples may be referred to as a "hybrid" primary conductive layer. For multi-layer contact plates with more than one primary conductive layer, each primary conductive layer may be configured as a hybrid primary conductive layer, although it is also possible for a combination of hybrid and non-hybrid primary conductive layers to be used together in the same multi-layer contact plate. Hybrid primary conductive layers may also be used in conjunction with two-layer contact plates or even single-layer contact plates, and are not necessarily limited to deployment in multi-layer contact plates having three layers as depicted in FIG. 9.

As will be appreciated, two joined plate-layers with different coefficients of thermal expansion may bend in response to a change in temperature (e.g., bi-metal effect). To reduce or avoid this bi-metal effect, in one example, at least three plate-layers (e.g., Al-Steel-Al) may be joined in the multi-layer contact plate 900, as depicted in FIG. 9. In other words, the top and bottom conductive sheets 910 and 915 being made from the same material (e.g., Al or Cu) may make the multi-layer contact plate 900 fairly resistant to temperature changes.

Alternatively, as noted above, the multi-layer contact plate may be formed from two joined plate-layers having different coefficients of thermal expansion (e.g., Al-Steel, Cu-Steel, etc.). In this example, the bi-metal effect may have a limited impact on the overall functionality of the multi-layer contact plate if the cell terminal connection layer (e.g., made from steel) is kept relatively thin.

Alternatively, as noted above, the multi-layer contact plate may be formed from two joined plate-layers of the same material type, and hence, the same coefficients of thermal expansion (e.g., Al—Al, Cu—Cu, etc.). This functions to reduce or avoid the bi-metal problem. For example, the two joined plate-layers may include a thick primary conductive layer (e.g., Al or Cu) joined with a thinner cell terminal connection layer (e.g., one or more sheets of flexible foil) made from the same material.

In one example, the intermediate sheet 905 is stamped beforehand to reduce weight and have material only locally around the contact area 920 to ensure the electrical connection between cell and conductive sheets 910 and/or 915. Alternatively, instead of stamping, the conductive sheets 910 and/or 915 may undergo drilling, milling, water jet cutting, etching, and/or laser cutting to reduce the material of the intermediate sheet 905. The design of the intermediate sheet 905 in the contact area 920 can be made very malleable (e.g., to form the bonding connector that may be laser-welded to a terminal of the battery cell). To save space, the thickness and shape of the stamped (e.g., or water drilled, laser cut, etc.) intermediate sheet 905 can be embossed in the conductive sheets 910 and/or 915 (e.g., to compensate for height tolerances among the battery cells). By reducing or avoiding the bi-metal effect, the stress between the layers of the multi-layer contact plate 900 at the contact area 920 of the battery cells will be reduced, and a functional reliability of the resulting contact will increase.

In an alternative embodiment, the conductive sheets 910 and/or 915 may be stamped, drilled, milled, water jet cut, etched, and/or laser cut to define contact areas, and the intermediate sheet 905 may be locally inserted into these defined contact areas for the welding connection. This insertion can be done, for example, by soldering or brazing, pressing and cold welding, or a process comparable with clinching or riveting.

In a further embodiment, to reduce or avoid contact corrosion between the different materials, a protective layer (or passivation layer such as metal oxide, etc.) can be applied between conductive sheet 910 and intermediate sheet 905 and/or between the conductive sheet 915 and the intermediate sheet 905. If necessary, the impact of the transition resistance between the intermediate sheet 905 and the conductive sheets 910 and 915 upon current flowing through the multi-layer contact plate 900 is mitigated because current flowing through the intermediate sheet 905 may move to the conductive sheets 910 and 915.

Figure 10:
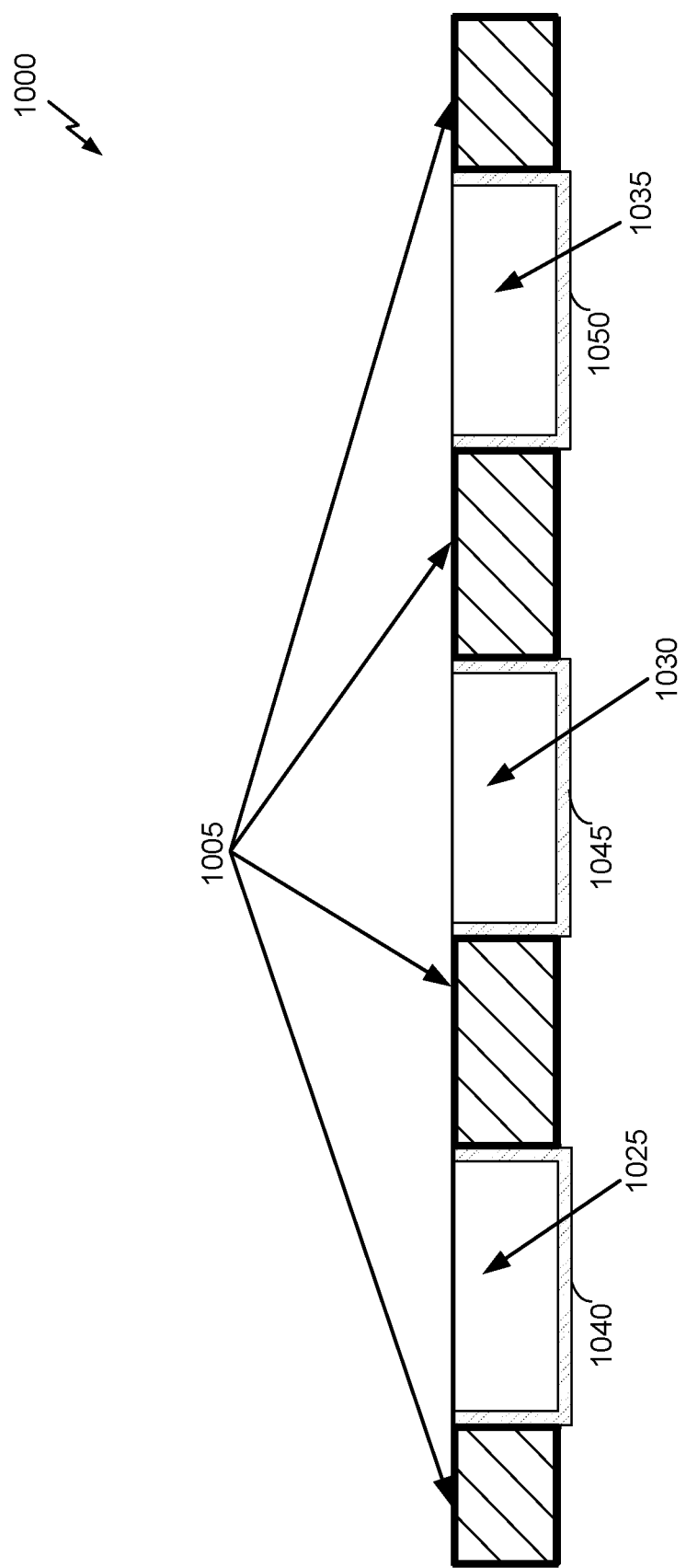
FIG. 10 illustrates a side-perspective of a multi-layer contact plate in accordance with another embodiment of the disclosure.

FIG. 10 illustrates a side-perspective of a multi-layer contact plate 1000 in accordance with another embodiment of the disclosure. Referring to FIG. 10, the multi-layer contact plate 1000 includes a relatively thick primary conductive layer 1005, and a relatively thin and flexible cell terminal connection layer (1040, 1045, 1050). In this embodiment, bonding connectors formed from the cell terminal connection layer (1040, 1045, 1050) are radially fixed in holes in the primary conductive layer 1005 (e.g., pressed, soldered, welded, etc.).

The primary conductive layer 1005 is depicted in FIG. 10 as including separate sections which are each part of the same contact plate, with the "holes" separating the sections of the primary conductive layer 1005 corresponding to contact areas 1025, 1030, 1035 (e.g., such as contact area 920 of FIG. 9) where connections to top-facing positive and/or negative terminals of battery cells can be made (e.g., via steel bonding connectors). In other words, the separate sections of the primary conductive layer 1005 are all structurally part of the same component, with the "holes" being a result of the cross-section perspective of FIG. 10. The portion of the intermediate sheet 905 (or cell terminal connection layer) that extends into the contact area 920 from FIG. 9 can be affixed onto respective battery cell terminals (e.g., pressed down and then welded or soldered), as shown at 1040, 1045 and 1050. More specifically, 1040, 1045 and 1050 may be bonding connectors (e.g., bonding ribbons) that are implemented as steel bushings (or contact elements) pressed or soldered onto the respective battery cell terminals. Various ways of affixing bonding connectors of multi-layer contact plates, such as the multi-layer contact plate 1000 of FIG. 10, to respective top-facing terminals of battery cells will be described in more detail below.

Figure 11:
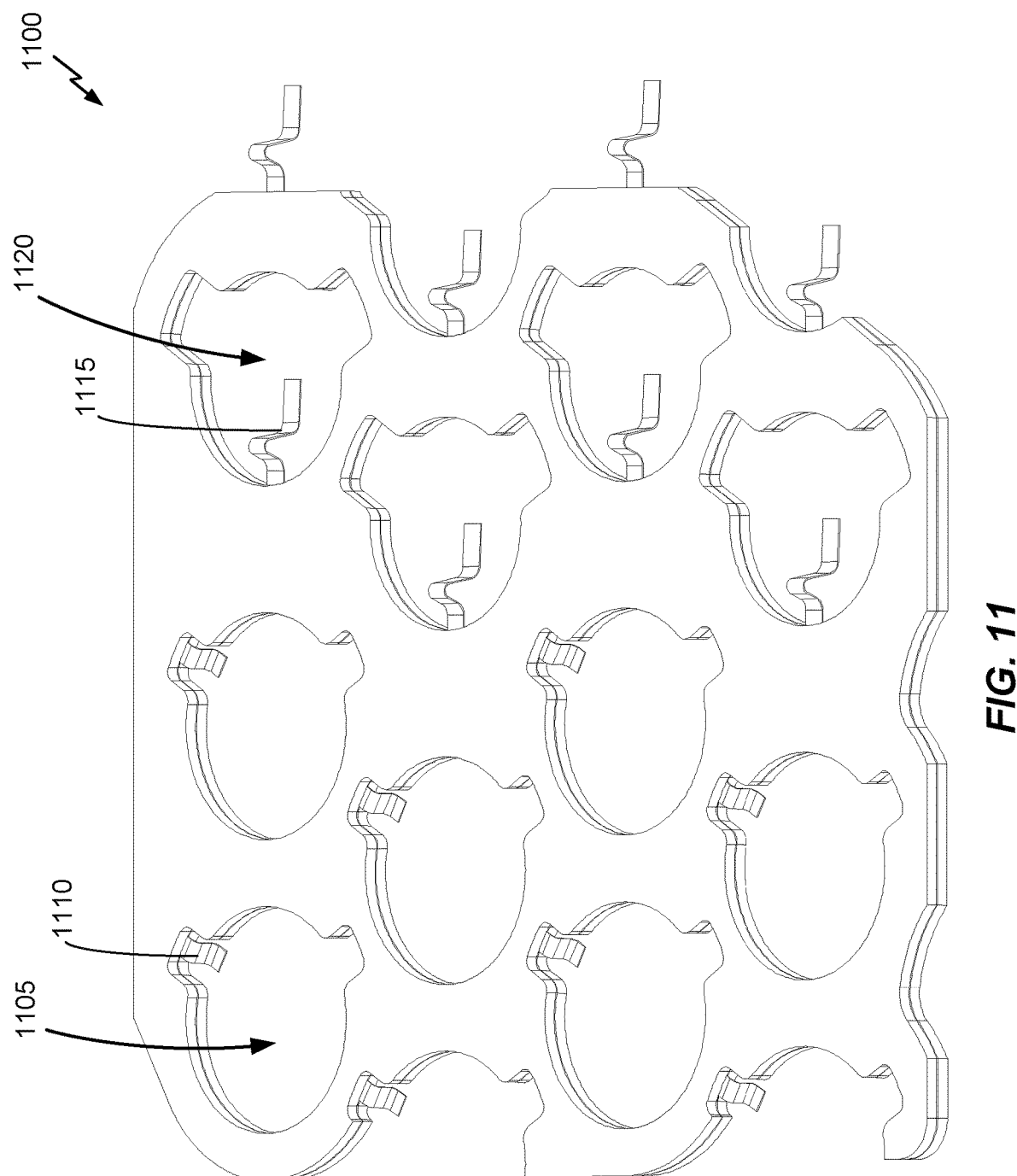
FIG. 11 illustrates a top-perspective of a "center" multi-layer contact plate in accordance with an embodiment of the disclosure.

FIG. 11 illustrates a top-perspective of a "center" multi-layer contact plate 1100 in accordance with an embodiment of the disclosure. In particular, the "center" multi-layer contact plate 1100 represents an example of a three-layer contact plate including a top and bottom primary conductive layers (e.g., Cu, Al, etc.), with a "sandwiched" cell terminal connection layer (e.g., made from Cu, Al, steel, etc.) being sandwiched between the top and bottom primary conductive layers over some or all of the "center" multi-layer contact plate 1100. The "center" multi-layer contact plate 1100 includes a plurality of openings, or contact areas, such as contact areas 1105 and 1120. These contact areas are positioned over battery cells to permit connections between top-facing terminals and the "center" multi-layer contact plate 1100 via bonding connectors (e.g., bonding ribbons), which may be formed from the "sandwiched" cell terminal connection layer as described above.

With respect to contact area 1105 of FIG. 11, a bonding connector 1110 may be used to form a connection with a top-facing negative terminal of a battery cell (e.g., in a first P group) that is installed underneath the contact area 1105. A bonding connector 1115 may be used to form a connection with a top-facing positive terminal of a battery cell (e.g., in a second P group) that is installed underneath the contact area 1120. Accordingly, each battery cell in the first P group connects to the "center" multi-layer contact plate 1100 via one of the bonding connectors 1110, and each battery cell in the second P group connects to the "center" multi-layer contact plate 1100 via one of the bonding connectors 1115, to facilitate the in-series connection between the respective P groups.

Referring to FIG. 11, it will be appreciated that the "center" multi-layer contact plate 1100 may correspond to either the "center" multi-layer contact plate 850A or the "center" multi-layer contact plate 855A in FIG. 8A, as an example. If the "center" multi-layer contact plate 1100 corresponds to the "center" multi-layer contact plate 850A, then the first P group in FIG. 11 that connects to the "center" multi-layer contact plate 1100 via the bonding connectors 1110 corresponds to P group 2 in FIG. 8A, and the second P group in FIG. 11 that connects to the "center" multi-layer contact plate 1100 via the bonding connectors 1115 corresponds to P group 1 in FIG. 8A. Alternatively, if the "center" multi-layer contact plate 1100 corresponds to the "center" multi-layer contact plate 855A, then the first P group in FIG. 11 that connects to the "center" multi-layer contact plate 1100 via the bonding connectors 1110 corresponds to P group 3 in FIG. 8A, and the second P group in FIG. 11 that connects to the "center" multi-layer contact plate 1100 via the bonding connectors 1115 corresponds to P group 2 in FIG. 8A.

While not shown explicitly in FIG. 11, the "negative pole" and "positive pole" multi-layer contact plates 845A and 860A can be configured somewhat similarly to the "center" multi-layer contact plate 1100. However, as will be discussed below in more detail, the "negative pole" and "positive pole" multi-layer contact plates 845A and 860A connect a single P group to either the negative terminal or positive terminal for the battery module. Accordingly, only one type of bonding connector may be deployed in the "negative pole" and "positive pole" multi-layer contact plates 845A and 860A, in contrast to the "center" multi-layer contact plate 1100. For example, a "negative pole" multi-layer contact plate may include bonding connectors configured to connect to top-facing negative terminals of battery cells in a respective P group (e.g., similar to 1110 of FIG. 11), and "positive pole" multi-layer contact plate may include bonding connectors configured to connect to top-facing positive terminals of battery cells in a respective P group (e.g., similar to 1115 of FIG. 11).

With respect to FIG. 11, it will be appreciated that the shapes of the contact areas 1105 and 1120 defined by the multi-layer contact plate 1100 may vary based on a configuration of battery cells within a particular battery module and/or other design criteria. Generally, contact areas are defined over battery cell terminal connections of a battery module, but otherwise may vary in terms of shape based on various design criteria. Accordingly, the shape or layout of contact areas 1105 and 1120 in FIG. 11 merely represents one possible example implementation for a particular battery cell configuration.

With respect to FIG. 11, it will be appreciated that the battery cells of each P group are clustered together, resulting in the "left" part of the multi-layer contact plate 1100 including contact areas for negative terminal connections to a first P group, and the "right" part of the multi-layer contact plate 1100 including contact areas for positive terminal connections to a second P group. Generally, the multi-layer contact plate 1100 will collect current from the second P group over the positive cell connections, and transfer this collected current to the first P group over the negative cell connections. Due to this particular clustering of P groups, the current distribution will generally be expected to be highest in the multi-layer contact plate 1100 in-between the respective P groups (e.g., where all the current from the second P group has been collected but has not yet been transferred to the first P group), as will be discussed in more detail below with respect to FIGS. 12-15E.

In conventional battery packs (sometimes referred to as soft packs) deployed in high-power systems (e.g., electric vehicle drive motor systems), battery cells are connected together within the battery packs to achieve higher voltage and/or current. The battery cells are connected to each other via conductive single-layer contact plates (e.g., Al or Cu). Conventionally, these contact plates are made from thin homogeneous flat stamped sheet metal (e.g., homogeneous in terms of thickness). However, battery cells are typically arranged in battery packs mostly side-by-side in blocks. Due to this preset arrangement of the battery cells, it is difficult to generate a homogeneous current flow using the above-noted flat homogeneous conducting plates. For example, enlarging the width and/or thickness of the flat homogeneous conductive plates would theoretically contribute to a more homogeneous current flow, but enlarging the width and/or thickness in this manner is difficult in conventional battery packs. Hence, conventional battery packs may experience very inhomogeneous current distribution with more resistance in the conductive plate. Additionally, in areas of the battery pack with low current density, unnecessary conductive material (e.g., Al or Cu) may be included, which adds to the cost of the battery pack.

Figure 12:
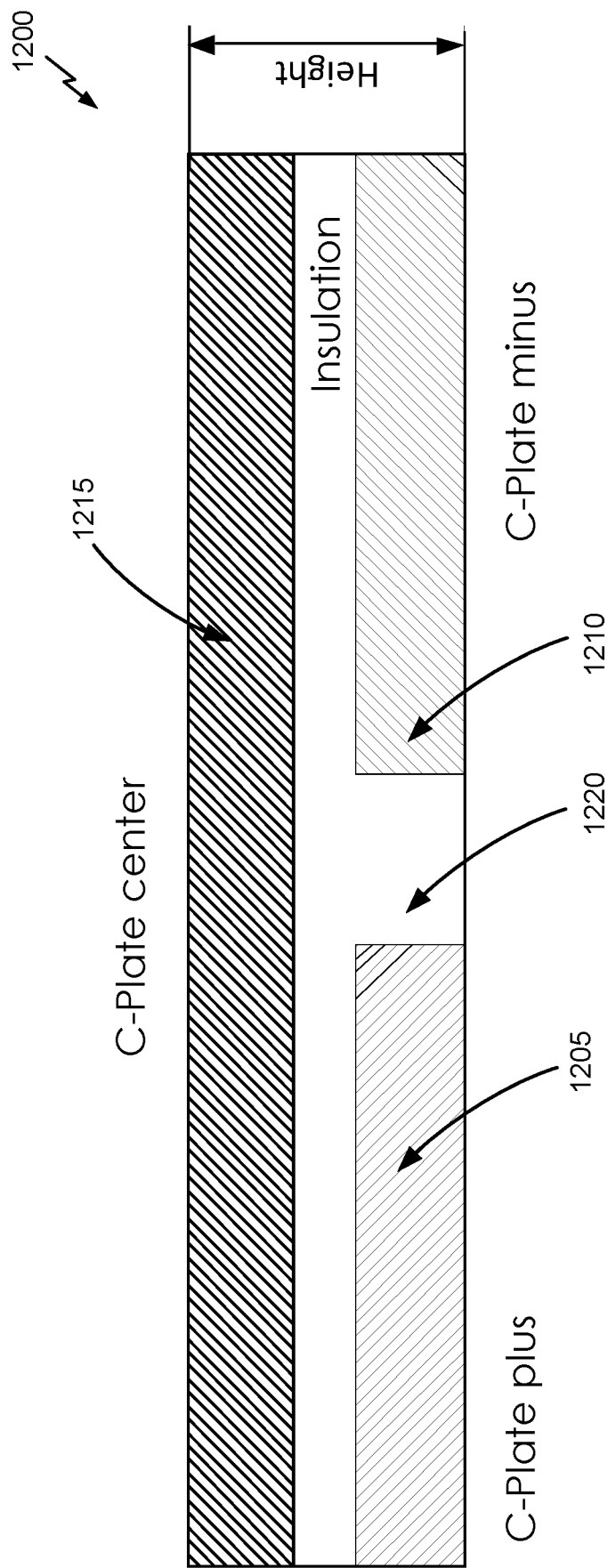
FIG. 12 illustrates a side-perspective of a hybrid contact plate arrangement in accordance with an embodiment of the disclosure.

FIG. 12 illustrates a side-perspective of a hybrid contact plate arrangement 1200 in accordance with an embodiment of the disclosure. In particular, the hybrid contact plate arrangement 1200 is configured for deployment in a 2S system that includes two P groups connected in series. While not drawn to scale, FIG. 12 emphasizes the relative thicknesses of particular contact plates.

As shown in FIG. 12, the hybrid contact plate arrangement 1200 includes a "positive pole" contact plate 1205, a "negative pole" contact plate 1210, a "center" contact plate 1215, and an insulation layer 1220. In FIG. 12, the contact plates 1205-1215 each include substantially the same thickness (e.g., height or depth) throughout the hybrid contact plate arrangement 1200, such that the overall thickness (e.g., height or depth) of the hybrid contact plate arrangement 1200 is constant. In an example, the "positive pole" contact plate 1205, "negative pole" contact plate 1210 and "center" contact plate 1215 may be implemented either as single-layer contact plates (e.g., one primary conductive layer without an integrated cell terminal connection layer) or as multi-layer contact plates (e.g., one or more primary conductive layers sandwiching and/or attached to an integrated cell terminal connection layer).

In other embodiments of the disclosure, the thickness of the contact plates may be configured variably (e.g., to achieve a target current density at various locations in a battery module so as to achieve a more homogeneous current flow). For example, the thickness of the contact plates (e.g., single-layer or multi-layer contact plates) may be configured to be larger in sections of the battery module with a higher current flow expectation, and lower in sections of the battery module with a lower current flow expectation, while maintaining a substantially constant thickness across the entire hybrid contact plate arrangement. Furthermore, via special arrangement of individual inhomogeneous plates (turning), it is possible to further reduce the thickness of the hybrid contact plate arrangement, as will be described below in more detail.

FIG. 13A illustrates a side-perspective of a hybrid contact plate arrangement 1300A for a battery module in accordance with an embodiment of the disclosure. In particular, the hybrid contact plate arrangement 1300A is configured for deployment in a 2S system (e.g., as described above with respect to FIG. 8B) that includes two P groups connected in series. While not drawn to scale, FIG. 13A emphasizes the relative thicknesses of particular contact plates (e.g., single-layer or multi-layer contact plates).

As shown in FIG. 13A, the hybrid contact plate arrangement 1300A includes a "positive pole" contact plate 1305A, a "negative pole" contact plate 1310A, a "center" contact plate 1315A, and an insulation layer 1320A. In contrast to FIG. 12, the thicknesses of the contact plates 1305A-1315A may be controlled to increase their respective thicknesses, or depths, in regions of the battery module with higher expected current density flow. Accordingly, the "positive pole" contact plate 1305A and "negative pole" contact plate 1310A are configured to be thicker near the respective ends of the hybrid contact plate arrangement 1300A (e.g., near the respective poles of the battery module), and the "center" contact plate 1315A is configured to be thickest near its respective center or middle section.

FIG. 13B illustrates a side-perspective of a hybrid contact plate arrangement 1300B for a battery module in accordance with another embodiment of the disclosure. In particular, the hybrid contact plate arrangement 1300B is configured for deployment in a 3S system that includes three P groups connected in series, such as the "Type 1" cylindrical battery cell arrangement 800A described above with respect to FIG. 8A. While not drawn to scale, FIG. 13B emphasizes the relative thicknesses of particular contact plates.

As shown in FIG. 13B, the hybrid contact plate arrangement 1300B includes a "positive pole" contact plate 1305B, a "negative pole" contact plate 1310B, a "center" contact plate 1315B, a "center" contact plate 1320B, and insulation layers 1325B and 1330B. In an example, the insulation layers 1325B and 1330B may be implemented as one continuous layer, or alternatively as two separate layers. Similar to the 2S system example in FIG. 13A, the thicknesses of the contact plates 1305B-1320B may be controlled to increase their respective thicknesses, or depths, in regions of the battery module with higher expected current density flow. Accordingly, the "positive pole" contact plate 1305B and "negative pole" contact plate 1310B are configured to be thicker near the respective ends of the hybrid contact plate arrangement 1300B (e.g., near the respective poles of the battery module), and the "center" contact plates 1315B and 1320B are configured to be thicker near their respective centers or middle sections.

Figure 13C:
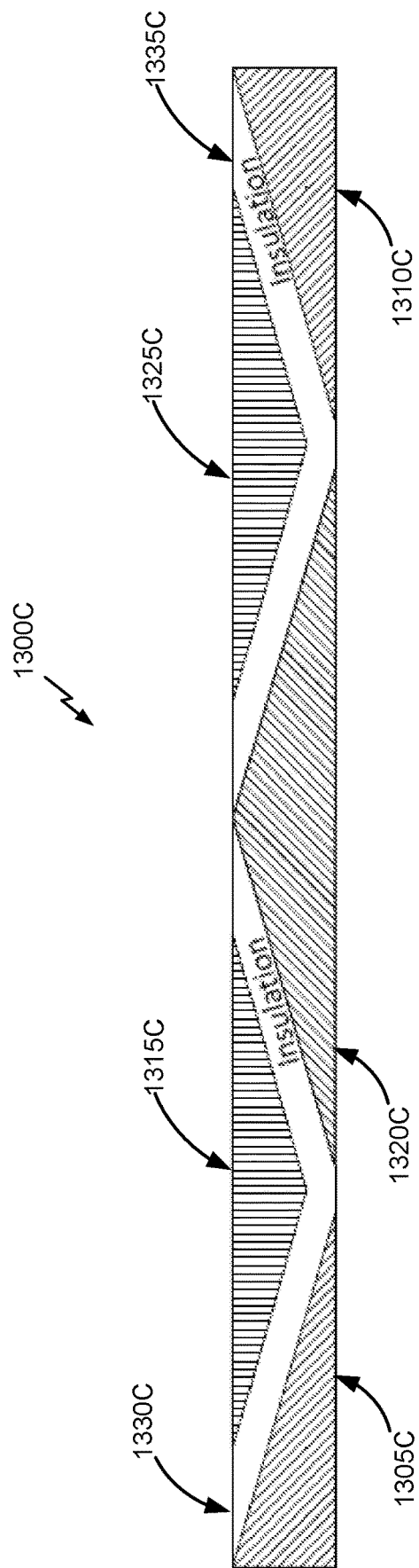
FIG. 13C illustrates a side-perspective of a hybrid contact plate arrangement for a battery module in accordance with another embodiment of the disclosure.

FIG. 13C illustrates a side-perspective of a hybrid contact plate arrangement 1300C for a battery module in accordance with another embodiment of the disclosure. In particular, the hybrid contact plate arrangement 1300C is configured for deployment in a 4S system that includes four P groups connected in series. While not drawn to scale, FIG. 13C emphasizes the relative thicknesses of particular contact plates.

As shown in FIG. 13C, the hybrid contact plate arrangement 1300C includes a "positive pole" contact plate 1305C, a "negative pole" contact plate 1310C, "center" contact plates 1315C, 1320C and 1325C, and insulation layers 1330C and 1335C. In an example, the insulation layers 1330C and 1335C may be implemented as one continuous layer, or alternatively as two separate layers. Similar to the 2S system example in FIG. 13A, and the 3S system example in FIG. 13B, the thicknesses of the contact plates 1305C-1325C may be controlled to increase their respective thicknesses, or depths, in regions of the battery module with higher expected current density flow. Accordingly, the "positive pole" contact plate 1305C and "negative pole" contact plate 1310C are configured to be thicker near the respective ends of the hybrid contact plate arrangement 1300C (e.g., near the respective poles of the battery module), and the "center" contact plates 1315C, 1320C and 1325C are configured to be thicker near their respective centers or middle sections.

Figure 13D:
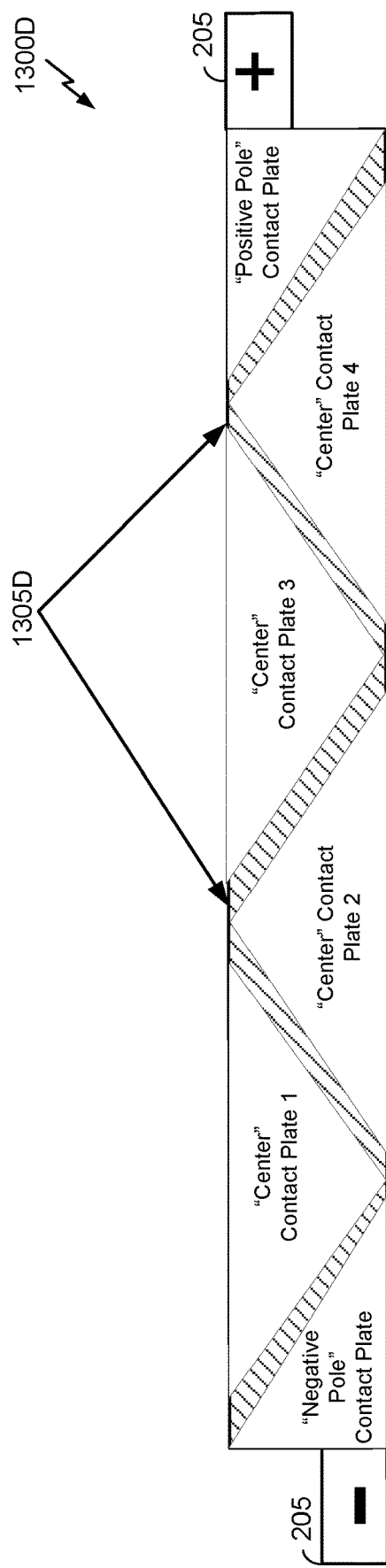
FIG. 13D illustrates a side-perspective of a hybrid contact plate arrangement for a battery module in accordance with another embodiment of the disclosure.

FIG. 13D illustrates a side-perspective of a hybrid contact plate arrangement 1300D for a battery module in accordance with another embodiment of the disclosure. In particular, the hybrid contact plate arrangement 1300D is configured for deployment in a 5S system that includes four P groups connected in series. While not drawn to scale, FIG. 13D emphasizes the relative thicknesses of particular contact plates. Moreover, the hybrid contact plate arrangement 1300D is represented in FIG. 13D as a modified version of the hybrid contact plate arrangement 700A described above with respect to FIGS. 7A-7B, with the contact plates described above in the hybrid contact plate arrangement 700A being varied in thickness.

As shown in FIG. 13D, the hybrid contact plate arrangement 1300D includes a "positive pole" contact plate, a "negative pole" contact plate, "center" contact plates 1-3, and insulation layer(s) 1305D. In an example, the insulation layer(s) 1305D may be implemented as one continuous layer, or alternatively as two separate layers. Similar to the 2S system example in FIG. 13A, the 3S system example in FIG. 13B, and the 4S system example in FIG. 13C, the thicknesses of the contact plates may be controlled to increase their respective thicknesses, or depths, in regions of the battery module with higher expected current density flow. Accordingly, the "positive pole" contact plate and "negative pole" contact plate are configured to be thicker near the respective ends of the hybrid contact plate arrangement 1300D (e.g., near the respective poles of the battery module), and the "center" contact plates 1-3 are configured to be thicker near their respective centers or middle sections.

Figure 13E:
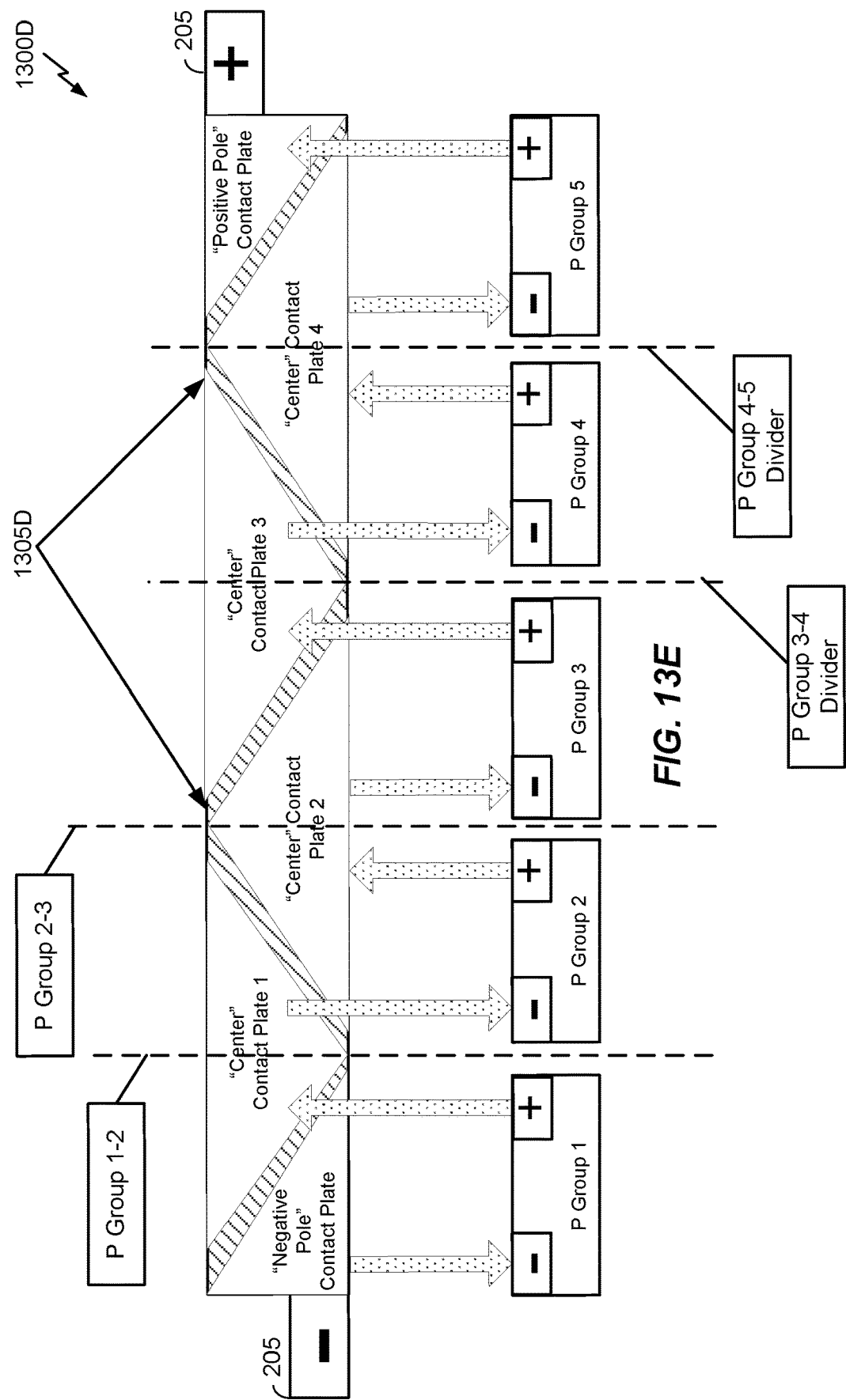
FIG. 13E illustrates the hybrid contact plate arrangement of FIG. 13D being arranged on top of P groups 1-5 in accordance with an embodiment of the disclosure.

FIG. 13E illustrates the hybrid contact plate arrangement 1300D of FIG. 13D being arranged on top of P groups 1-5 (e.g., similar to FIG. 7B) in accordance with an embodiment of the disclosure. The dotted arrows in FIG. 13E convey the flow of current between P groups 1-5 and the respective contact plates. This flow of current may be facilitated via bonding connectors between individual battery cell terminals in the respective P groups 1-5 and corresponding contact plates. Also marked in FIG. 13E are dividers between "adjacent" P groups (e.g., P groups 1-2, P groups 2-3, P groups 3-4 and P groups 4-5. In an example, the dividers may be sections of the hybrid contact plate arrangement 1300D occupied by the insulation layer(s) 1305D.

In a further example, as noted above with respect to FIG. 7B, the dividers between the respective P groups may be aligned with dividers between adjacent contact plates on the same "level" of an alternating semi-stacked layout of the contact plates within the hybrid contact plate arrangement 1300D. The levels in the hybrid contact plate arrangement 1300D as shown in FIGS. 13D-13E are not as clear-cut as in the hybrid contact plate arrangement 700A of FIGS. 7A-7B where there are separate upper and lower levels. However, in FIGS. 13D-13E, it will be appreciated that the "flat" side of each contact plate is either aligned with the upper or lower part of the hybrid contact plate arrangement 1300D, which can be used to designate the "level" (e.g., upper or lower) of each contact plate. For example, the "negative pole" contact plate and "center" contact plates 2, 4 are on a lower level of the hybrid contact plate arrangement 1300D, and the "center" contact plates 1, 3 and "positive pole" contact plate are on an upper level of the hybrid contact plate arrangement 1300D (e.g., in other embodiments, the level arrangements can be swapped and/or otherwise modified to accommodate higher or lower numbers of P groups, such that the "negative pole" contact plate is on the upper level, etc.). So, on the lower level, the "negative pole" contact plate is adjacent to "center" contact plate 2, and "center" contact plate 2 is adjacent to "center" contact plate 4. On the upper level, "center" contact plate 1 is adjacent to "center" contact plate 3, and "center" contact plate 3 is adjacent to the "positive pole" contact plate. Accordingly, the P group 1-2 divider corresponds to a divider between the "negative pole" contact plate and the "center" contact plate 2, and so on.

Moreover, "center" contact plates may include contact areas (or holes) where bonding connectors are fused with battery cell terminals of battery cells in respective P groups. These contact areas may be clustered together so that one side of a "center" contact plate includes all the contact areas for establishing electrical connections to a first P group, and another side of the "center" contact plate includes all the contact areas for establishing electrical connections to a second P group. In certain embodiments, the various P group dividers shown in FIG. 13E may also be aligned with an area of the "center" contact plate between the clustered P group-specific contact area. So, the battery cells in the P groups may be clustered in the battery module, and the contact areas that align with these battery cells may be likewise clustered in the "center" contact plates of the hybrid contact plate arrangement 1300D. As will be explained below in more detail, the dividing region between the contact areas for the different P groups in a "center" contact plate may be the area of the "center" contact plate with a highest current flow expectation, such that "center" contact plates are made to be thickest in this particular area (e.g., in alignment with the P group divider between the P groups that a respective "center" contact plate is configured to connect in series). This is shown illustratively in FIG. 13E whereby each P group divider is aligned with the thickest section of a corresponding "center" contact plate.

Referring to FIGS. 13A-13E, the contact plates described above may be implemented as multi-layer contact plates in at least one embodiment. However, this is not strictly necessary in all embodiments, and other embodiments may relate to single-layer contact plates (e.g., Al or Cu) that do not necessarily stack together as layers in a multi-layer contact plate (e.g., Al-Steel-Al, Cu-Steel-Cu, Al—Al, Cu—Cu, Al-Steel, Cu-Steel, etc.).

Figure 14:
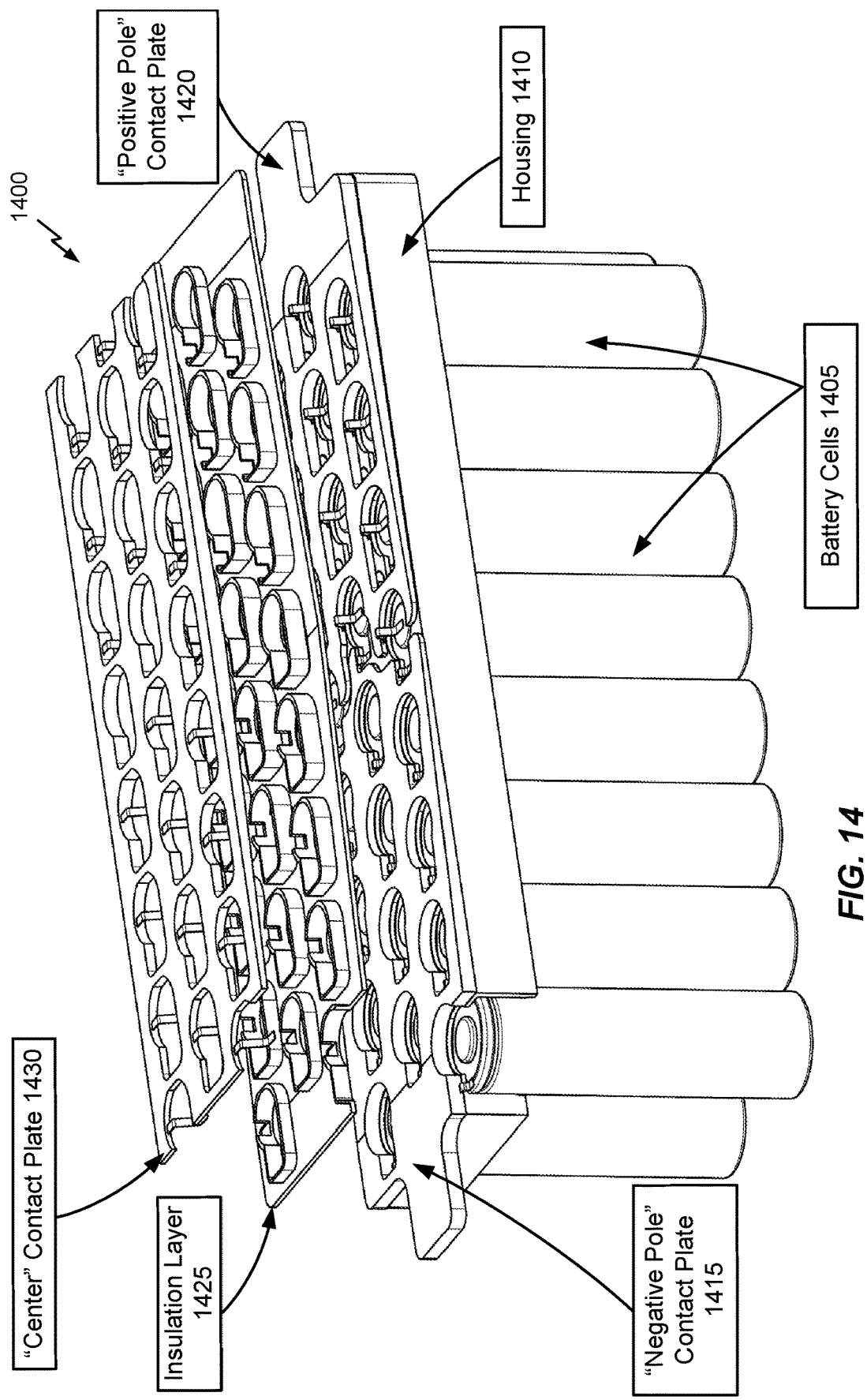
FIG. 14 illustrates a deconstructed perspective of various layers of a hybrid contact plate arrangement in accordance with an embodiment of the disclosure.

FIG. 14 illustrates a deconstructed perspective of various layers of a hybrid contact plate arrangement 1400 in accordance with an embodiment of the disclosure. In particular, the hybrid contact plate arrangement 1400 is configured for a 2S system that connects two P groups in parallel, as in FIG. 8B or FIG. 13A for example. It will be appreciated that the hybrid contact plate arrangement 1400 is exemplary in nature and does not directly map to each embodiment described above. For example, in FIG. 2, the HV connectors 205 are positioned on the same side of the battery module 100, whereas the positive and negative poles for the hybrid contact plate arrangement 1400 are located at opposite sides. However, despite these types of implementation differences (e.g., such as the HV connector locations, etc.), the basic teachings of the various embodiments can be used in conjunction together (e.g., contact plates having different thicknesses that align with current distribution expectations can vary as shown in FIG. 14 in conjunction with any other embodiment disclosed herein).

Referring to FIG. 14, the hybrid contact plate arrangement 1400 is positioned on top of a housing 1410 that houses battery cells 1405 with top-facing positive and negative terminals. In an example, the housing 1410 may be made from plastic for low cost and high insulation. The housing 1410 is configured to secure the battery cells 1405 and provide support for the hybrid contact plate arrangement 1400. Moreover, while only an upper section of the housing 1410 is depicted in FIG. 14, the housing 1410 may include additional sections to secure the battery cells 1405 (e.g., a lower section underneath the battery cells 1405, and so on).

Referring to FIG. 14, the hybrid contact plate arrangement 1400 is mounted on top of the housing 1410, and includes a "negative pole" contact plate 1415, a "positive pole" contact plate 1420, an insulation layer 1425, and a "center" contact plate 1430 (e.g., which may be configured similarly to the "center" multi-layer contact plate 1100 of FIG. 11, with a somewhat different contact area shape and arrangement). While not shown expressly, in an example, the contact plates 1415, 1420 and 1430 may each be separated from the insulation layer 1425 with a respective optional passivation layer. Moreover, in at least one embodiment, each of the contact plates 1415, 1420 and 1430 in the hybrid contact plate arrangement 1400 may be implemented as single-layer or multi-layer contact plates, as described above.

As shown in FIG. 14, the thicknesses, or the depths, of contact plates 1415, 1420 and 1430 vary along the length of the hybrid contact plate arrangement 1400 similar to the hybrid contact plate arrangement 1300A described above with respect to FIG. 13A. In particular, the "positive pole" contact plate 1420 and "negative pole" contact plate 1415 are configured to be thicker near the respective ends of the hybrid contact plate arrangement 1400, and the "center" contact plate 1430 is configured to be thicker near its respective center or middle section. So, in at least one embodiment, when stacked together, the thickness of the overall hybrid contact plate arrangement 1400 can be substantially constant across the entirety of the battery module even while its constituent contact plates vary in thickness at different locations. In a further embodiment, the thickness of the overall hybrid contact plate arrangement 1400 may be further controlled by manipulating the thickness of the insulation layer 1425 at different locations. In this case, extra conductive material (e.g., Al or Cu, which is generally more expensive than insulation material such as plastic) beyond the current density requirements of the hybrid contact plate arrangement 1400 need not be used to achieve the substantially constant overall thickness of the hybrid contact plate arrangement 1400; instead, extra insulation material (e.g., plastic) may be used.

As will be described below in more detail, in contrast to a static height implementation for each contact plate as depicted in FIG. 12, regulating the thickness of the respective contact plates and/or insulation layer as shown in FIGS. 13A-14 may be used to provide a battery module with a number of benefits. These benefits include (i) a reduction of material, costs, and/or weight, (ii) a reduction of inner resistance, (iii) a reduction of design space (height) through the hybrid contact plate arrangement, and/or (iv) an improved relationship between cost of materials and current density.

Figure 15A:
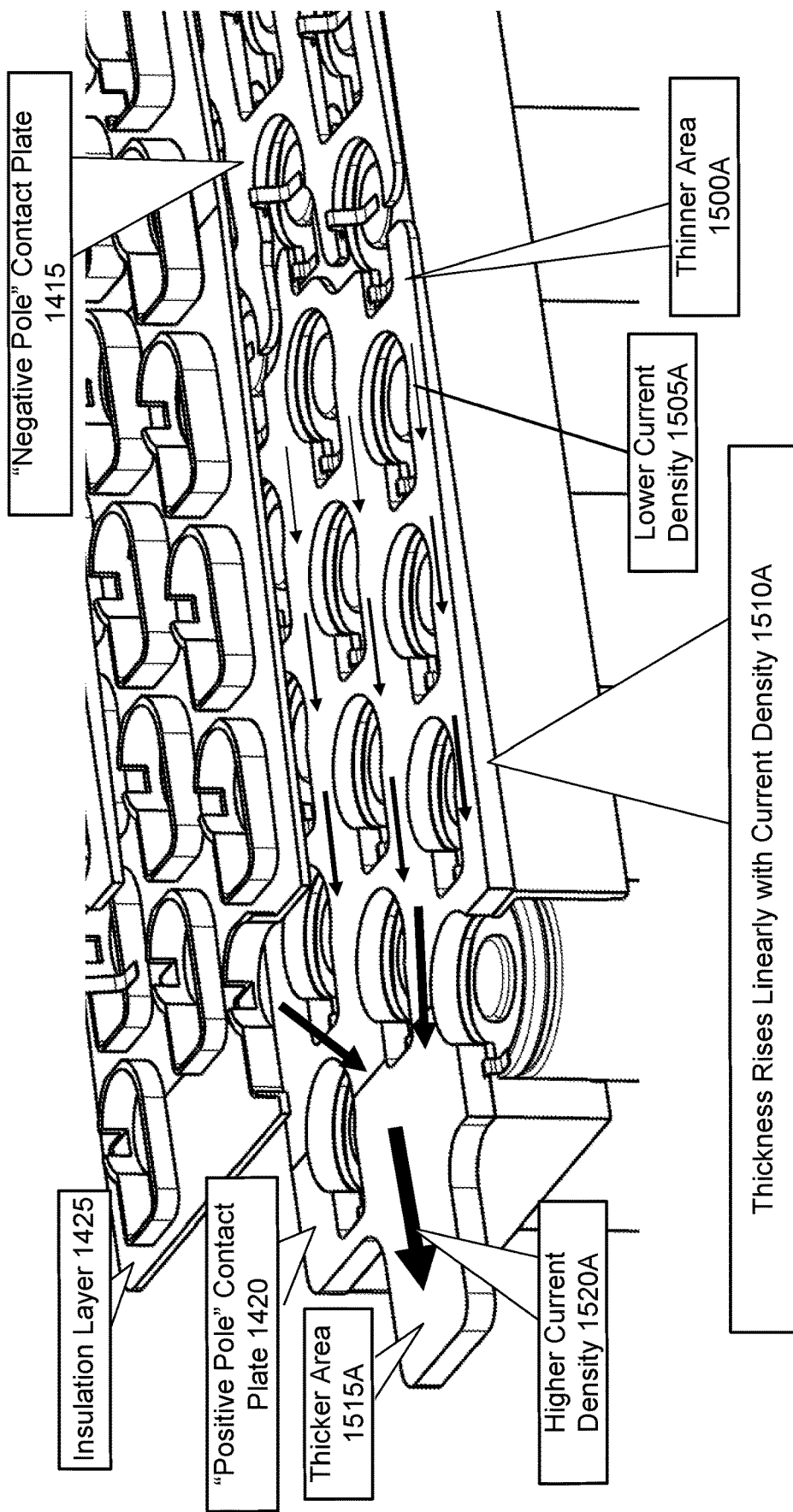
FIG. 15A illustrates an example of current density distribution at different areas of the hybrid contact plate arrangement depicted in FIG. 14 in accordance with an embodiment of the disclosure.

FIG. 15A illustrates an example of current density distribution at different areas of the hybrid contact plate arrangement 1400 depicted in FIG. 14 in accordance with an embodiment of the disclosure. In FIG. 15A, the hybrid contact plate arrangement 1400 is assumed to be bonded to battery cells as shown in FIG. 8B. Also, in FIG. 15A, larger arrows denote higher amounts of current density at a particular location of the "positive pole" contact plate 1420.

Referring to FIG. 15A, a thinner area 1500A of the "positive pole" contact plate 1420 is near the center of the hybrid contact plate arrangement 1400 where the "center" contact plate 1430 (not shown in FIG. 15A) is thicker. A current density of the "positive pole" contact plate 1420 is low in this center-area, as noted at 1505A. This region of low thickness and low current density maps to where battery cell 815B connects to the "positive pole" multi-layer contact plate 840B in FIG. 8B. More specifically, the thickness of the "positive pole" contact plate 1420 increases along the direction of the current flow.

As current is added to the "positive pole" contact plate 1420 by the various battery cells in a particular P group, the current moves towards the positive terminal (or pole) of the battery module. Hence, the current density rises in the direction towards the positive terminal of the battery module, and the thickness of the "positive pole" contact plate 1420 increases (e.g., linearly) with the current density, as noted at 1510A, which results in a thicker area 1515A being aligned with a higher current density area 1520A.

Figure 15B:
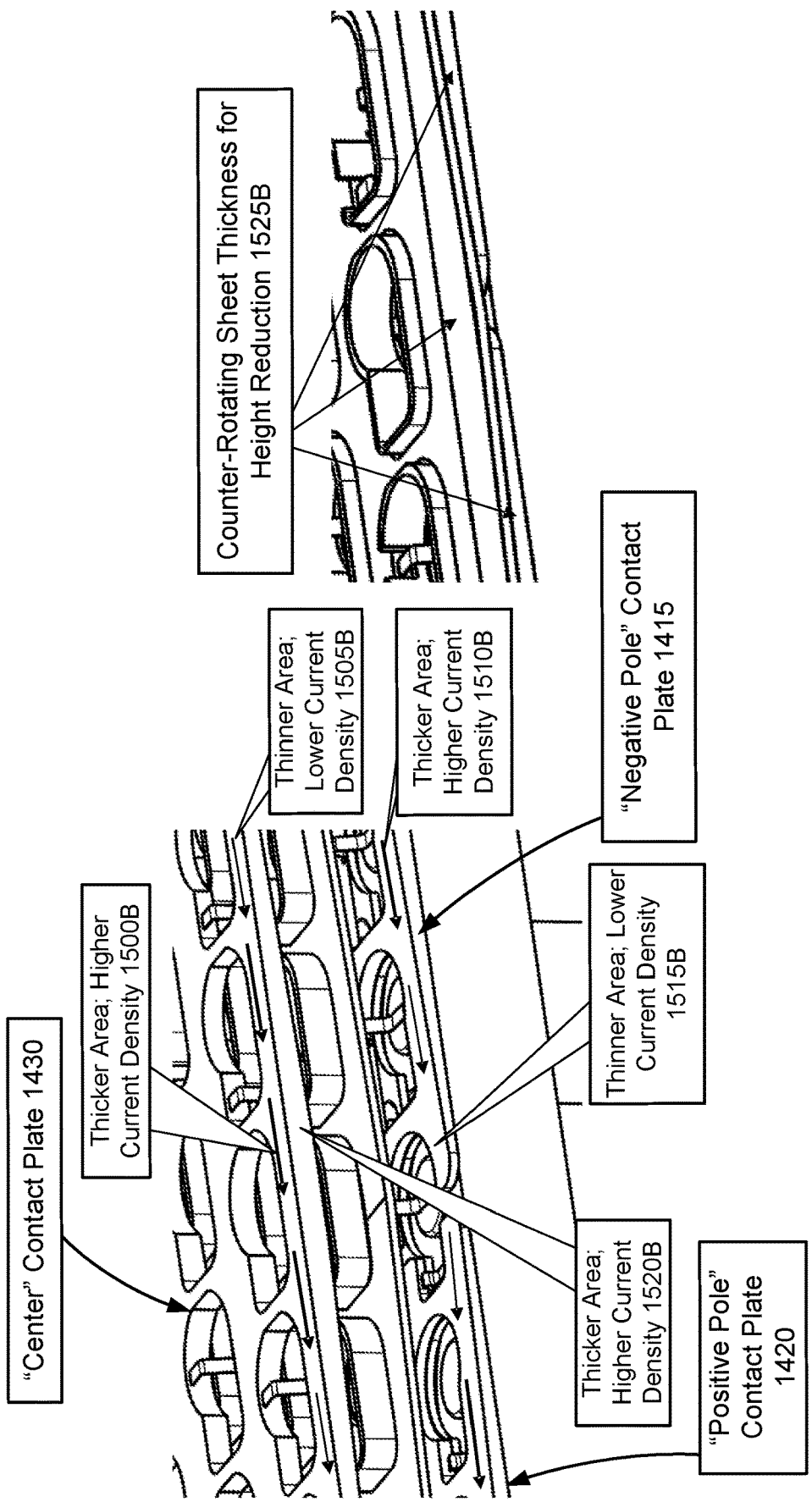
FIG. 15B illustrates a more detailed view of the hybrid contact plate arrangement of FIG. 14 in accordance with an embodiment of the disclosure.

While FIG. 15A is described with respect to the "positive pole" contact plate 1420, it will be appreciated that the approach of aligning the thickness of a contact plate with an expected current density distribution can be implemented with respect to any of the contact plates of the hybrid contact plate arrangement 1400, as shown in FIG. 15B. As will be appreciated, aligning the thickness(es) of contact plate(s) with an expected current density distribution helps to provide a more homogeneous current flow throughout the battery module.

FIG. 15B illustrates a more detailed view of the hybrid contact plate arrangement 1400 of FIG. 14 in accordance with an embodiment of the disclosure. Referring to FIG. 15B, current density distribution and corresponding contact plate thickness is shown between 1500B-1520B. For example, thicker areas with higher current density are shown at 1500B, 1510B and 1520B, while thinner areas with lower current density are shown at 1505B and 1515B. Also, at 1525B, a portion of the insulation layer 1425 is shown in more detail. In particular, the thickness of the insulation layer 1425 may be customized to provide an overall height reduction to the hybrid contact plate arrangement 1400 while maintaining a substantially constant height (e.g., such that variations in the thicknesses of the contact plates need not be the only manner in which the height of the overall hybrid contact plate arrangement 1400 is regulated).

As noted above with respect to the "center" multi-layer contact plate 1100 of FIG. 11, battery cells may be clustered together by P group, resulting in "center" contact plates that include different sections allocated to terminal connections with different P groups. Because the "center" contact plate is essentially moving current from one P group to another P group, the highest current density is generally expected to be in the dividing area between the respective P groups. With respect to FIG. 15B, this means that the thicker areas 1500B and 1520B in the "center" contact plate 1430 may correspond to the portion of the "center" contact plate 1430 that separates the respective P group terminal connections, with the "center" contact plate 1430 gradually becoming thinner moving away from this P group terminal connection divider region.

As discussed above with respect to FIGS. 15A-15B, current density may increase at the positive and negative poles of a battery module (e.g., near the respective HV connectors 205 described above with respect to FIG. 6B). The HV connectors 205 may have a higher resistance relative to the resistance of the HV busbars that connect adjacent battery modules to each other. The higher resistance at these locations may likewise cause an increase in temperature at these locations (e.g., near the respective HV connectors 205 described above with respect to FIG. 6B) which may also spread to the HV busbars. Higher temperatures at these locations of the battery module limit the maximum power that may be charged or discharged by the battery module. This may be especially problematic for certain high-power applications that require fast charging (e.g., electric vehicles, which may require charging to approximately 350 kW in a short period).

Embodiments of the disclosure are thereby related to transferring heat away from the HV connectors of a battery module, which correspond to respective ends of the "positive pole" contact plate and "negative pole" contact plate inside the battery module.

Figure 15C:
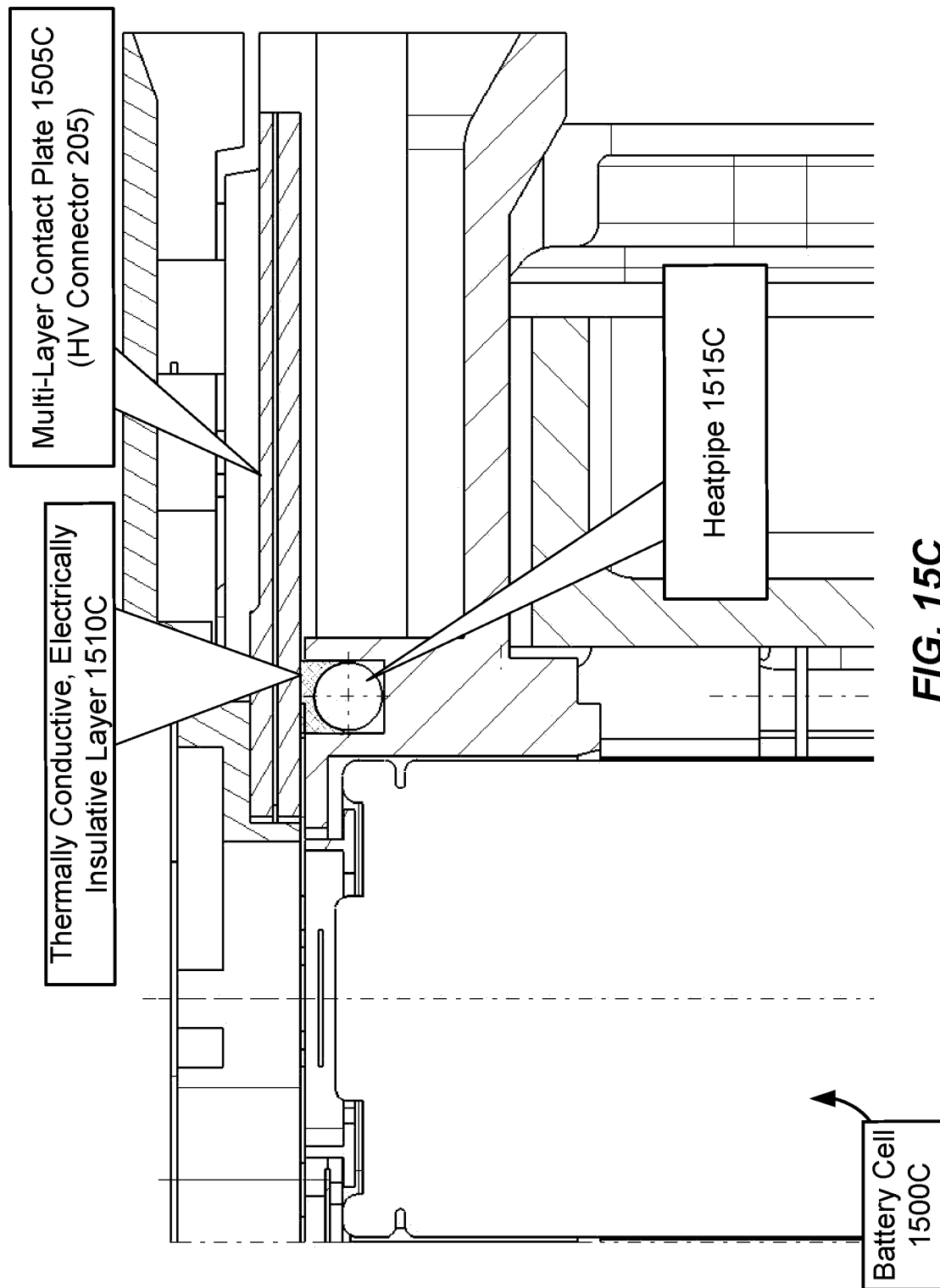
FIG. 15C illustrates a cooling mechanism for a battery module in accordance with an embodiment of the disclosure.

FIG. 15C illustrates a cooling mechanism for a battery module in accordance with an embodiment of the disclosure. Referring to FIG. 15C, a battery cell 1500C includes a positive or negative terminal that is connected to a multi-layer contact plate 1505C. The multi-layer contact plate 1505C corresponds to either a "positive pole" contact plate or a "negative pole" contact plate. In an example, the multi-layer contact plate 1505C is directly coupled to one of the HV connectors for the battery module (e.g., one of the HV connectors 205, which is configured to connect to a corresponding HV connector that is coupled to an HV busbar). In another example, the HV connector 205 can be structurally integrated with the multi-layer contact plate 1505C itself (e.g., the multi-layer contact plate 1505C extends outside of the battery module for connecting to a corresponding HV connector that is coupled to an HV busbar).

Referring to FIG. 15C, a layer 1510C of thermally conductive and electrically insulative material is placed in direct contact with a terminal component (e.g., at a positive terminal of the battery module or a negative terminal of the battery module). In an example, the layer 1510C may comprise an insulation foil (e.g., Kapton foil), ceramic insulation, anodized aluminum, or a combination thereof (e.g., Kapton foil wrapped around anodized aluminum). As used herein, the terminal component refers to any component that conducts heat in response to high current flowing through an associated positive or negative terminal, such as the multi-layer contact plate 1505C and/or its associated HV connector 205. The layer 1510C is further in direct contact with a heat pipe 1515C. In an example, the heat pipe 1515C may be made from a material that is conductive with respect to both temperature and electricity, in an example. Accordingly, heat from the terminal component (e.g., the multi-layer contact plate 1505C and/or its associated HV connector 205) will be transferred away from the terminal component towards the heat pipe 1515C with little to no electricity being conducted through the heat pipe 1515C. In an example, the heat pipe 1515C may include a substance that undergoes a phase-change between liquid and gas to transfer heat from one end to the other.

Figure 15D:
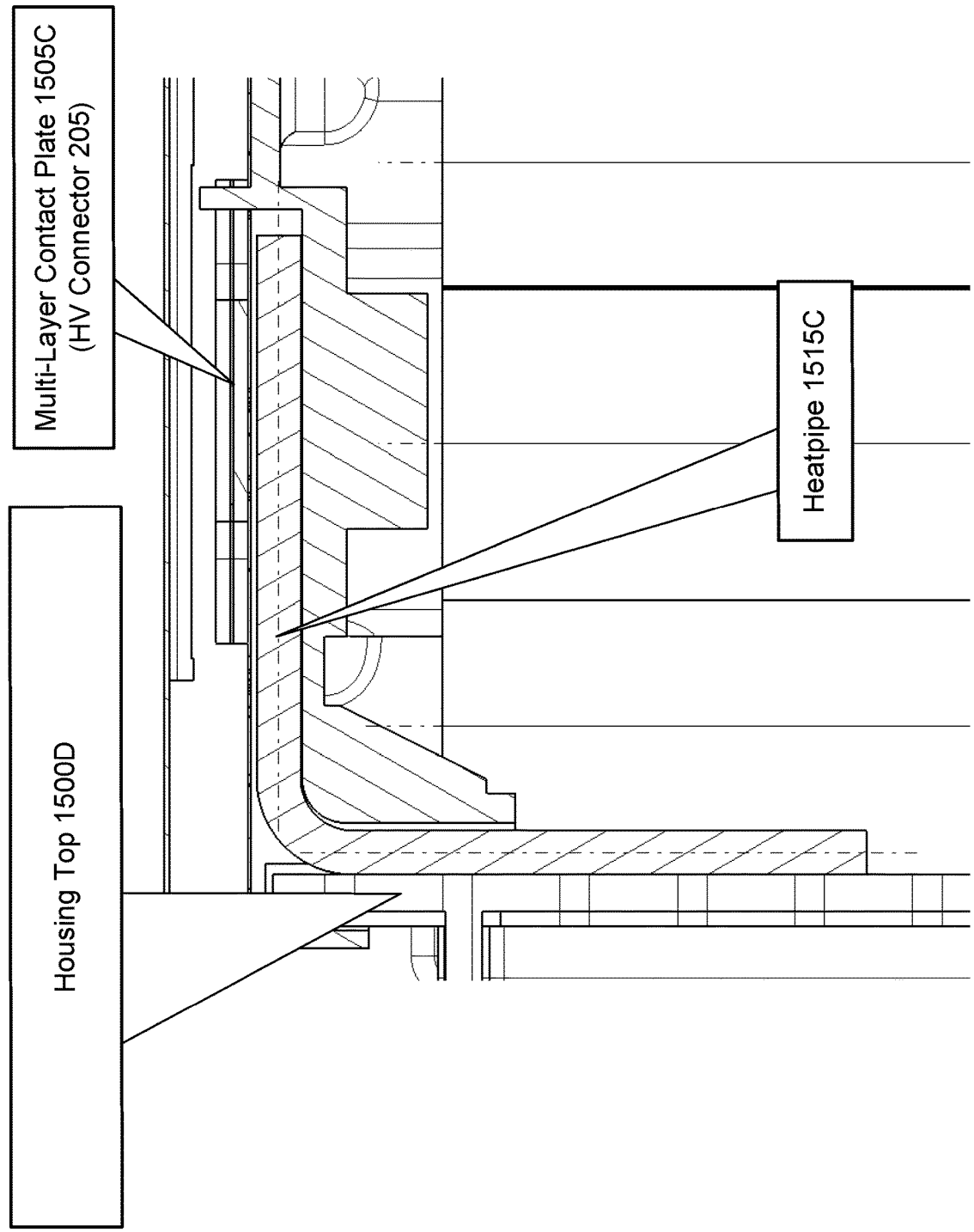
FIG. 15D illustrates another perspective of the cooling mechanism of FIG. 15C in accordance with an embodiment of the disclosure.

FIG. 15D illustrates another perspective of the cooling mechanism of FIG. 15C in accordance with an embodiment of the disclosure. In FIG. 15D, the heat pipe 1515C may be secured via attachment to a housing top 1500D (e.g., made from plastic). Moreover, the heat pipe 1515C is shown as extending from the terminal component (e.g., the multi-layer contact plate 1505C and/or its associated HV connector 205)

near the top of the battery module to a lower area of the battery module. In one example, a cooling plate may be integrated into the battery module as described above, and the heat pipe 1515C may be configured to transfer heat away from the terminal component (e.g., the multi-layer contact plate 1505C and/or its associated HV connector 205) and towards the cooling plate.

Figure 15E:
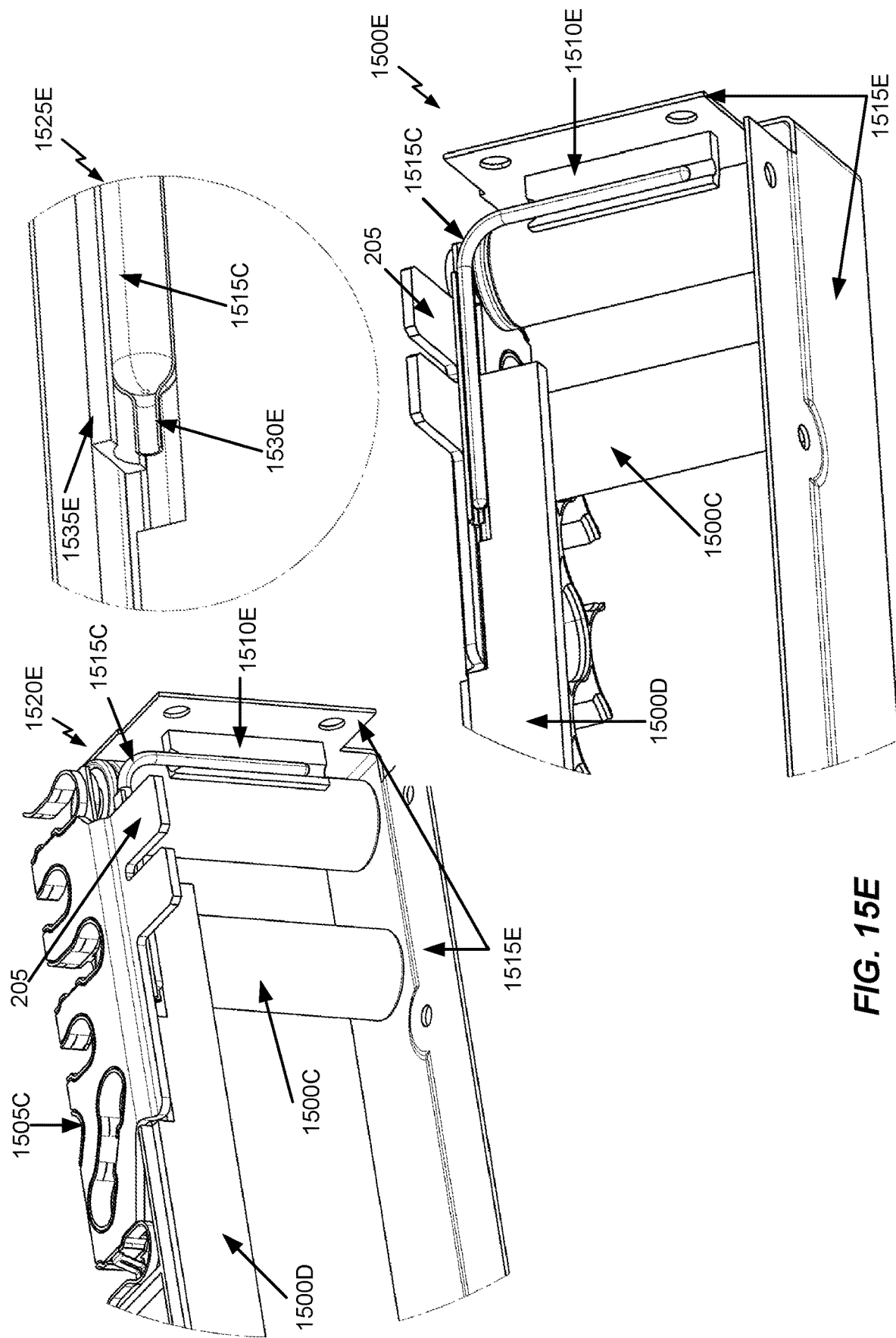
FIG. 15E illustrates additional perspectives of the cooling mechanism of FIG. 15C in accordance with an embodiment of the disclosure.

FIG. 15E illustrates additional perspectives of the cooling mechanism of FIG. 15C in accordance with an embodiment of the disclosure. In perspectives 1500E and 1520E, the heat pipe 1515C is secured via attachment to the housing top 1500D in an example. The heat pipe 1515C is further shown as being positioned underneath the HV connector 205 (e.g., the terminal component in this example), with the heat pipe 1515C being bent and coupled to a front plate 1510E. An attachment between the heat pipe 1515C and the front plate 1510E may be configured with good surface contact to facilitate heat transfer. The front plate 1510E is in turn coupled to a cooling plate 1515E. While not shown expressly in FIG. 15E, the cooling plate 1515E may be cooled via a liquid cooling system.

Referring to FIG. 15E, perspective 1525E, a zoomed-in view of the attachment between the heat pipe 1515C and the terminal component (e.g., the multi-layer contact plate 1505C and/or its associated HV connector 205). In perspective 1525E, the heat pipe 1515C is separated from the terminal component by an electrical insulation layer 1530E and gap filler 1535E (e.g., thermal interface material, such as caulk). In an example, the electrical insulation layer 1530E may correspond to the layer 1510C described above with respect to FIG. 15C, which may be formed from a thermally conductive and electrically insulative material. In another example, the electrical insulation layer 1530E and gap filler 1535E together may comprise the layer 1510C.

Hence, with respect to FIGS. 15C-15E, heat from the terminal component (e.g., the multi-layer contact plate 1505C and/or its associated HV connector 205) is transferred to the heat pipe 1515C (e.g., via the layer 1510C), which then transfers the heat to the cooling plate 1515E (e.g., via the front plate 1510E), which is then cooled via a liquid cooling system (not shown in FIGS. 15C-15E). Moreover, the heat pipe 1515C is described as being connected to a generic terminal component of the battery module, which corresponds to either the positive terminal or the negative terminal of the battery module. In an example, two separate heat pipes 1515C may be deployed in the battery module, with a first heat pipe 1515C being deployed with respect to a first terminal component at the positive terminal, and a second heat pipe 1515C being deployed with respect to a second terminal component at the negative terminal. Both heat pipes 1515C may be configured substantially as shown above with respect to FIGS. 15C-15D, except for being deployed with respect to terminal components at different terminals (or poles) of the battery module. Also, while FIGS. 15C-15E include reference to the multi-layer contact plate 1505C, it will be appreciated that heat being concentrated near the HV connectors 205 will likewise occur if a single-layer contact plate is used. Hence, another embodiment is directed to a heat pipe arrangement as shown in FIGS. 15C-15E with respect to a single-layer contact plate.

In some of the embodiments noted above, reference is made to bonding connectors that are used to connect battery cell terminals to a corresponding contact plate. In an embodiment, these bonding connectors may be implemented as ultrasonically welded wire bonds. However, ultrasonic welding requires a lot of time due to the high number of connections. This increases throughput time for the production line. Also, the cross-section is limited in ultrasonic welding (e.g., suitable for round wire welding, but less suitable for welding larger surface areas such as flat metal bonding ribbons).

In some embodiments of the disclosure, bonding connectors may be formed from a cell terminal connection layer (e.g., part of a multi-layer contact plate as described above). In this case, the bonding connectors are integrated (or preassembled) into the structure of the multi-layer contact plate, in the sense that no additional welding is required to secure the bonding connectors to the multi-layer contact plate during assembly of the battery module. In another embodiment of the disclosure, contact plates (e.g., single-layer or multi-layer) may be preassembled with bonding connectors that are implemented as laser-welded bonding ribbons (e.g., which are not necessarily formed from an integrated layer of the contact plate, but rather may be bonded onto the contact plate specifically near the contact areas), as discussed below with respect to FIG. 16A. Hence, the assembly of the battery module can be simplified due to the bonding ribbons already being integrated into their respective contact plates (e.g., irrespective of whether a multi-layer contact plate is used). For example, the contact plates may be produced on a separate production line from the production line that produces the battery modules.

Figure 16A:
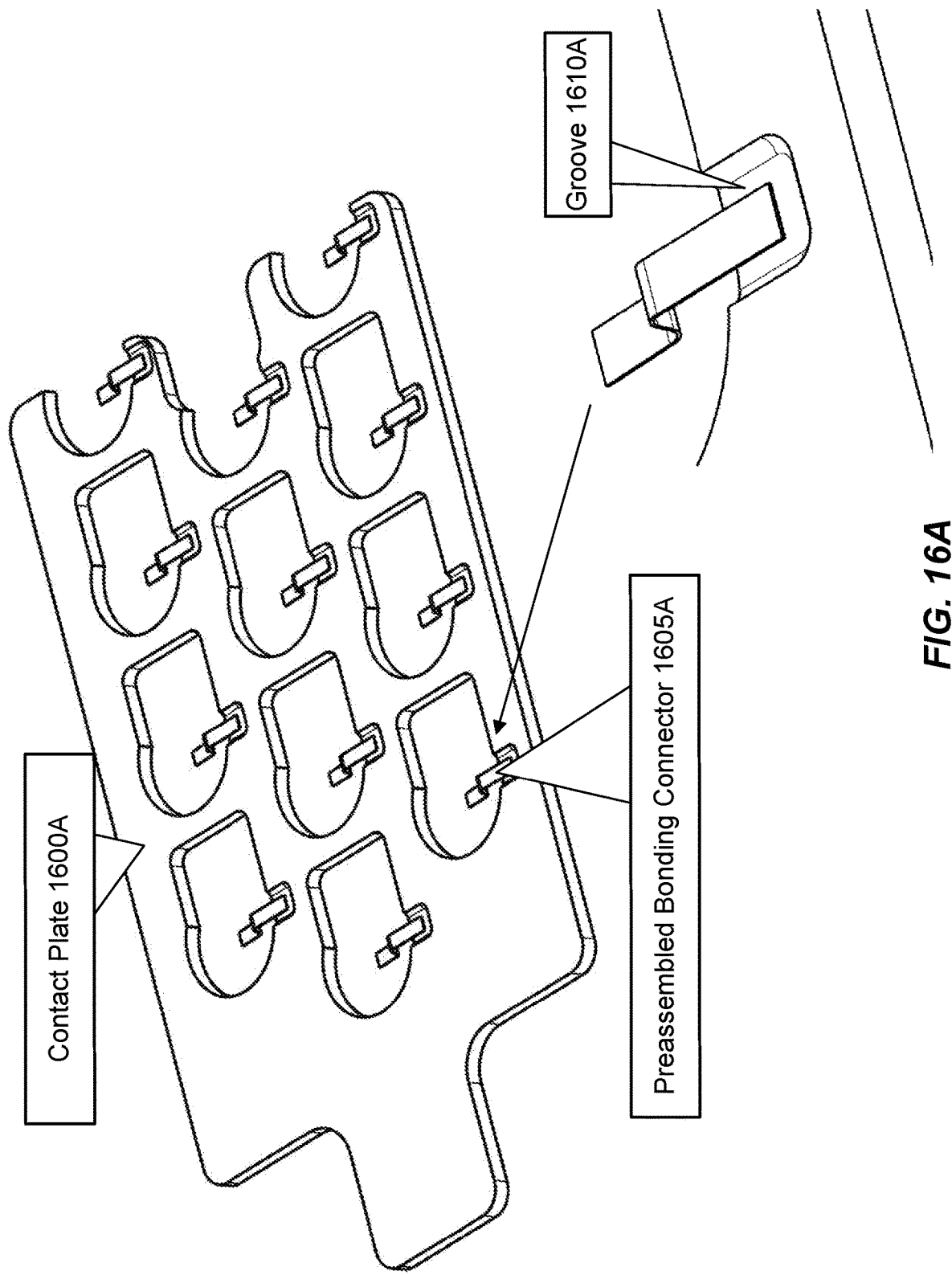
FIG. 16A illustrates a contact plate that is preassembled with bonding connectors in accordance with an embodiment of the disclosure.

FIG. 16A illustrates a contact plate 1600A that is preassembled with bonding connectors in accordance with an embodiment of the disclosure. In an example, the contact plate 1600A may be preassembled with bonding connectors 1605A using a laser-welding process. In an example, the bonding connectors 1605A may be formed from the same material (or a compatible material) with respect to the battery terminals to which the bonding connectors (e.g., steel, such as Hilumin), although different materials may also be used (e.g., a steel battery cell terminal may be bonded to an Al or Cu bonding connector, etc.). In a further example, each preassembled bonding connector 1605A may be installed (or welded) into a corresponding groove 1610A in the contact plate 1600A. In an example, using the groove 1610A helps to reduce the overall height (or thickness/depth) of the contact plate 1600A because the preassembled bonding connectors (e.g., laser-welded bonding ribbons) will not add to the overall height (or thickness/depth) of the contact plate 1600A.

Figure 16B:
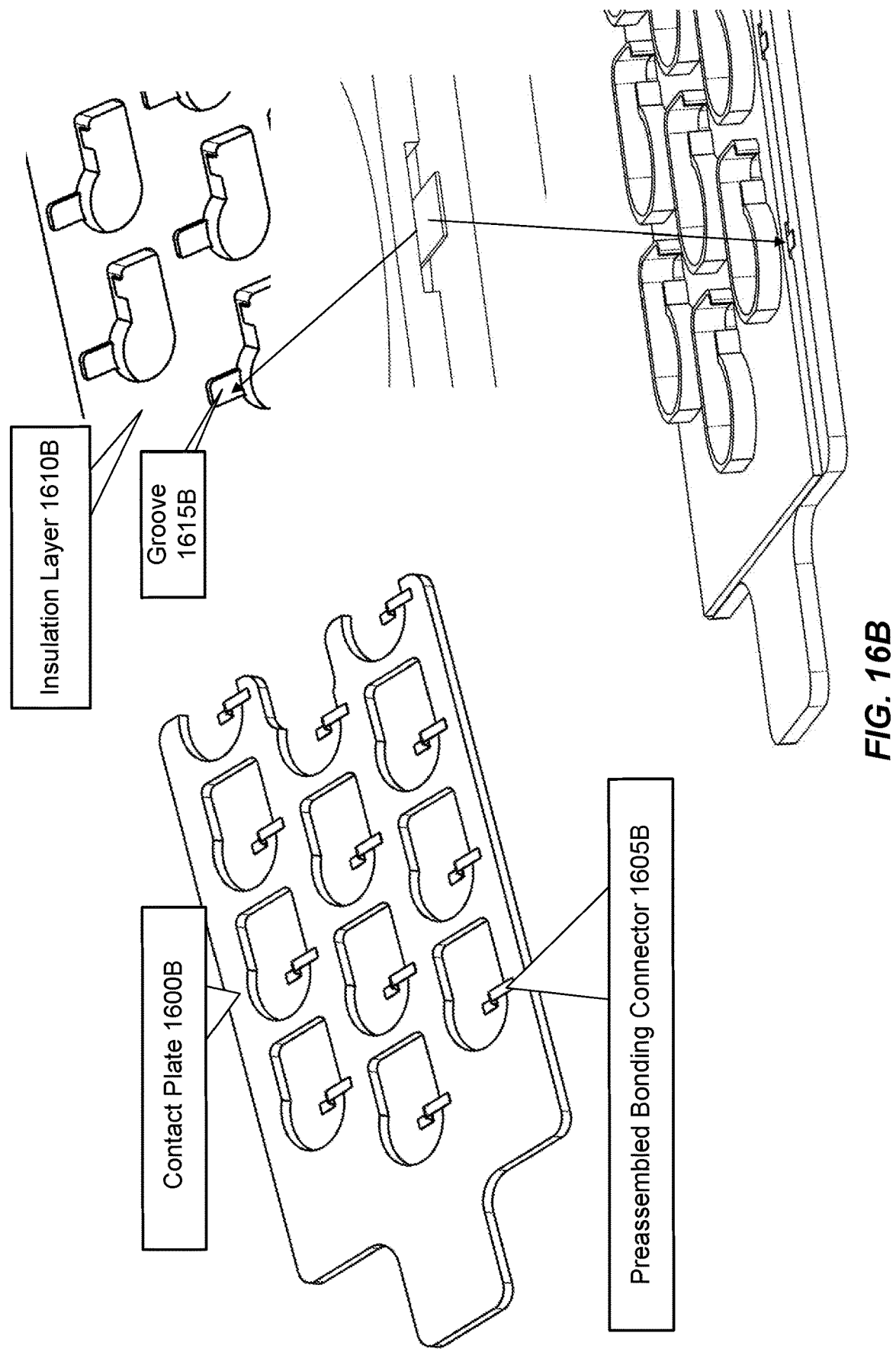
FIG. 16B illustrates a contact plate with preassembled bonding ribbons in accordance with another embodiment of the disclosure.

FIG. 16B illustrates a contact plate 1600B with preassembled bonding ribbons in accordance with another embodiment of the disclosure. In an example, the contact plate 1600B may be preassembled with bonding connectors 1605B using a laser-welding process. However, in contrast to FIG. 16A, the bonding connectors 1605B are installed directly on a top surface of the contact plate 1600B (not in a groove). Accordingly, the bonding connectors 1605B contribute to the overall height (or thickness/depth) of the contact plate 1600B. In this case, an insulation layer 1610B may include grooves 1615B configured to fit the corresponding bonding connectors 1605B. So, when the various layers of the hybrid contact plate arrangement are stacked during assembly of the battery module, the bonding connectors 1605B will not contribute to the overall height (or thickness/depth) of the hybrid contact plate arrangement and/or the battery module, as shown in FIG. 16B.

As will be appreciated, using contact plates with preassembled bonding connectors as shown in FIGS. 16A-16B may provide a variety of benefits to battery modules. These benefits include (i) facilitating the use of a parallel production line, leading to reduced production time for battery modules, (ii) facilitating the use of preassembly by a separate entity such as a supplier (e.g., although in alternative embodiments, a battery module assembler could also be the producer of the contact plates with preassembled bonding ribbons), and (iii) variability in length and position (very flexible). It will be appreciated that these same benefits may also be achieved using bonding connectors in multi-layer contact plates formed from an integrated cell terminal connection layer, as described above. Accordingly, attaching bonding connectors to the contact areas of a contact plate (e.g., as in FIGS. 16A-16B) and forming bonding connectors from an integrated cell terminal connection layer of a multi-layer contact plate (e.g., as in FIG. 9, FIG. 11, etc.) constitute two alternative ways of preassembling a contact plate with bonding connectors (e.g., preassembled in the sense that the bonding connectors are part of the associated contact plate before battery module assembly, such that a technician need not weld the bonding connectors to the contact plate during battery module assembly).

Figure 16C:
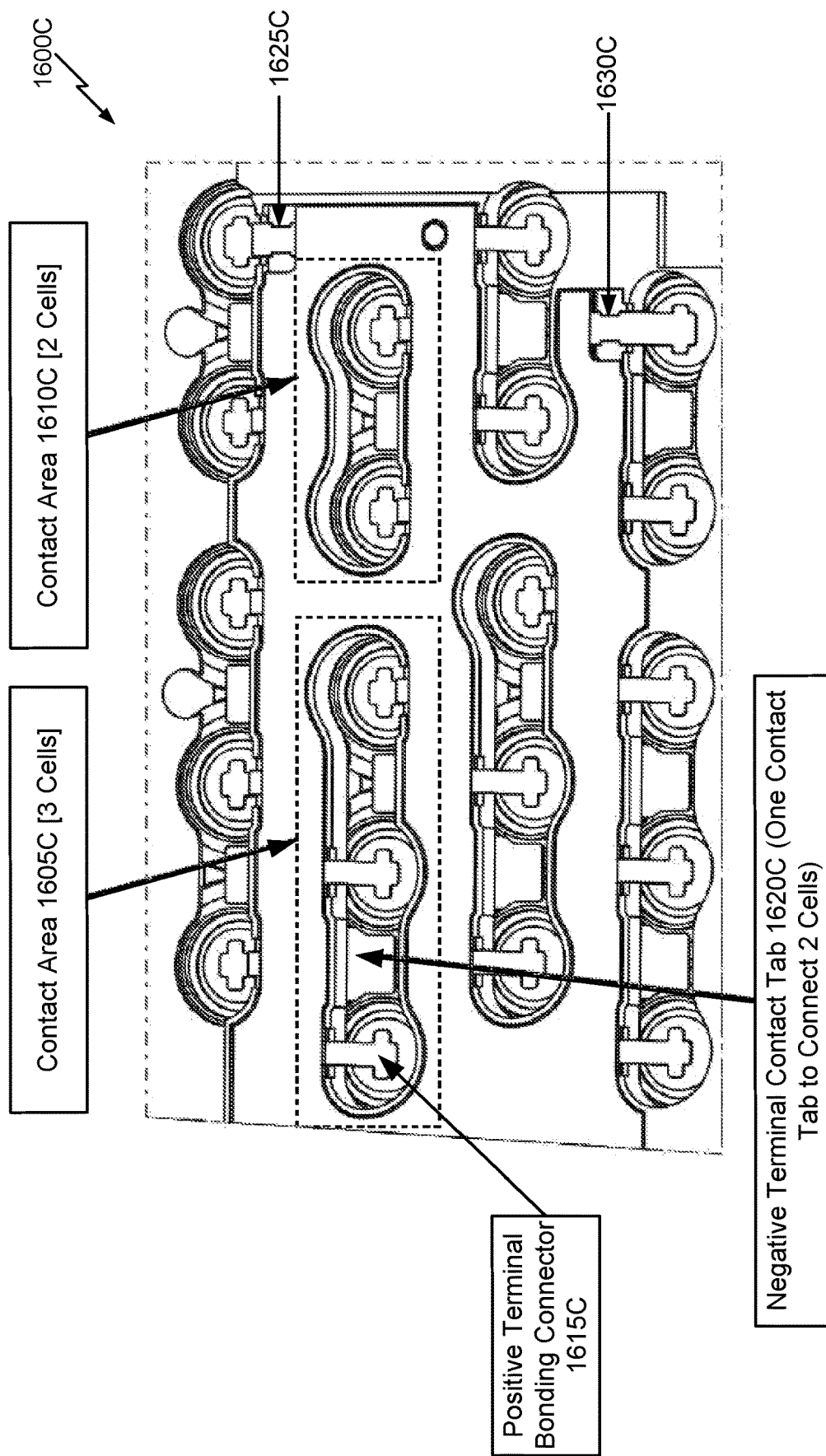
FIG. 16C illustrates a contact plate that is connected to a plurality of battery cells in accordance with an embodiment of the disclosure.

FIG. 16C illustrates a contact plate 1600C that is connected to a plurality of battery cells in accordance with an embodiment of the disclosure. Referring to FIG. 16C, battery cells are grouped together in shared contact areas that include either a 2-Cell or 3-Cell arrangement. For example, contact area 1605C depicts a 3-Cell arrangement and contact area 1610C depicts a 2-Cell arrangement. In an example, each positive cell head of each battery cell may be connected to a contact plate via a respective bonding connector, such as bonding connector 1615C, which may be preassembled as discussed above with respect to FIGS. 16A-16B and/or formed from an integrated cell terminal connection layer of a multi-layer contact plate as discussed above with respect to FIGS. 9 and 11. In a further example, each negative cell rim (or negative terminal) of each battery cell may be connected to a contact plate via a bonding connector that is implemented as a contact tab integrated into the contact plate. During assembly, the contact tab may be affixed to one or more respective negative cell rims (e.g., by being pressed downward and welded onto a region that includes portions from each of the one or more negative cell rims). For example, contact tab 1620C is shown in contact with negative cell rims of two adjacent battery cells.

In an example, the contact plate 1600C may be configured as either a single-layer contact plate or a multi-layer contact plate as noted above. In an example where the contact plate 1600C is implemented as a multi-layer contact plate, the contact areas 1605C and 1610C and contact tabs 1620C may correspond to locations where the primary conductive layer(s) of the contact plate 1600C are "stamped" (e.g., or, instead of stamping, the contact areas or holes in the primary conductive layer(s) may be defined by drilling, milling, water jet cutting, etching, and/or laser cutting). So, when joined with the cell terminal connection layer (e.g., made from flexible steel, such as foil), the stamped (e.g., or water drilled, laser cut, etc.) areas of the primary conductive layer(s) form the contact tabs 1620C (e.g., the contact tabs 1620C are portions of the multi-layer contact plate where the flexible cell terminal connection layer may be moved downwards towards the negative cell terminals).

Referring to FIG. 16C, "high-fuse" bonding connectors 1625C and 1630C are depicted. The "high-fuse" bonding connectors 1625C and 1630C are special higher-resistance bonding connectors configured to break last among bonding connectors for a particular P group. Accordingly, the "high-fuse" bonding connectors 1625C and 1630C are connected to different P groups. More specifically, a lower-resistance section of the "high-fuse" bonding connectors 1625C and 1630C are marked in FIG. 16C, which has a lower resistance than the remainder of the "high-fuse" bonding connectors 1625C and 1630C while still having a higher resistance than any other bonding connector associated with a respective P group. "High-fuse" bonding connectors are described in more detail below with respect to FIGS. 17A-17C.

Figure 16D:
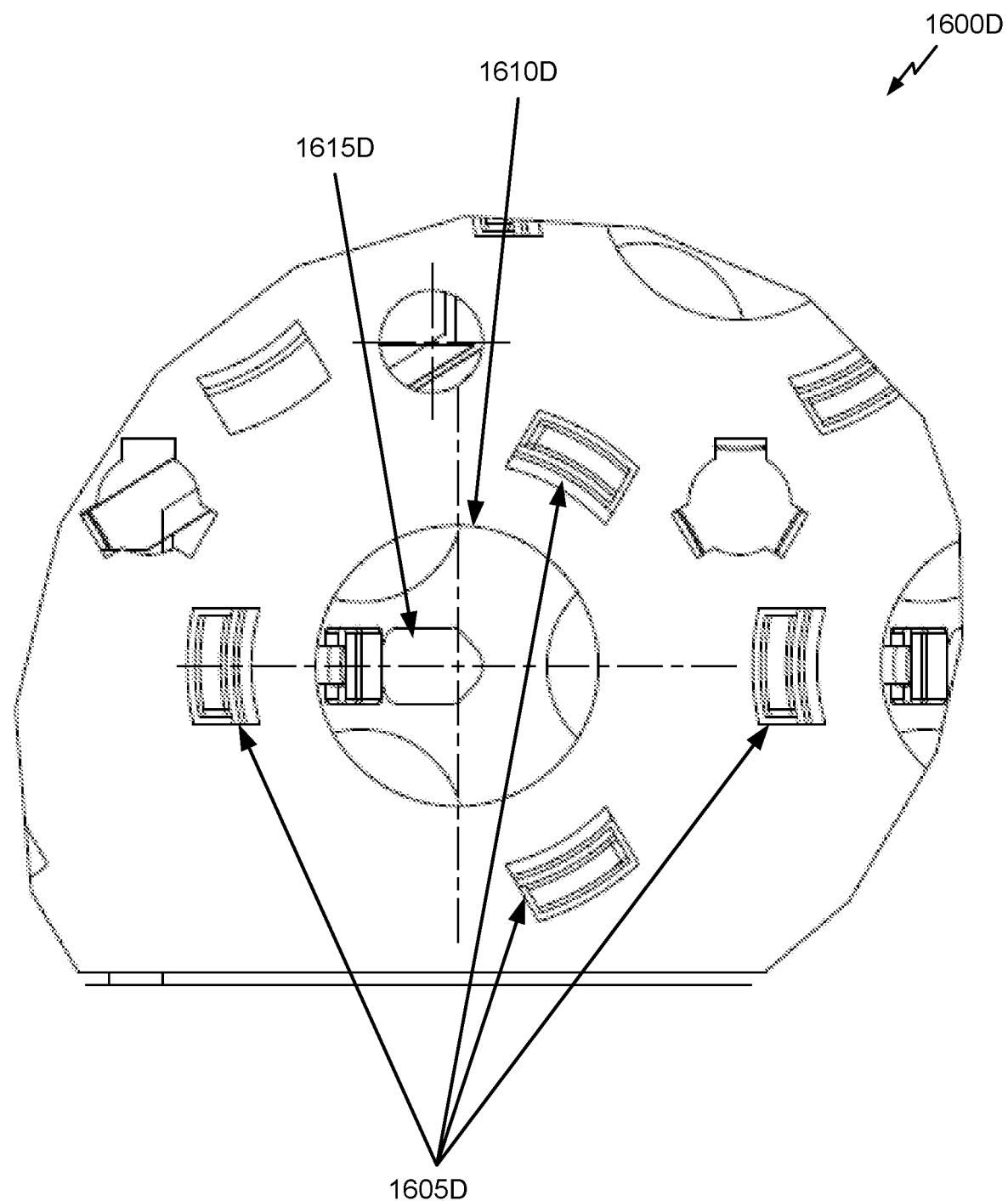
FIG. 16D illustrates a top-view of a portion of a multi-layer contact plate in accordance with an embodiment of the disclosure.

FIG. 16D illustrates a top-view of a portion of a multi-layer contact plate 1600D in accordance with an embodiment of the disclosure. The multi-layer contact plate 1600D is corrugated so as to include a plurality of contact tabs 1605D (e.g., formed from a cell terminal connection layer of the multi-layer contact plate 1600D) that are arranged around respective contact areas, such as contact areas 1610D. A positive terminal bonding connector 1615D, which may correspond to one of the preassembled bonding connectors described above with respect to FIGS. 16A-16B and/or formed from an integrated cell terminal connection layer of the multi-layer contact plate as discussed above with respect to FIGS. 9 and 11 in an example, is also shown with respect to one of the contact areas 1610D. In an example, the positive terminal bonding connector 1615D may be connected to a different contact plate that is stacked with the multi-layer contact plate 1600D in a hybrid contact plate arrangement, as described above with respect to FIG. 14, for example. The contact tabs 1605D may be used to facilitate a connection to respective top-facing negative terminals (or negative cell rims) of battery cells via laser welding or projection welding, as will be described below in more detail.

While FIG. 16C illustrates contact areas 1605C and 1610C encompassing multiple battery cells (e.g., 2-Cell arrangement or 3-Cell arrangement), in other embodiments, each contact area may be deployed with respect to a single cell (or 1-Cell arrangement). An example of a 1-Cell arrangement is depicted in FIG. 16D, as well as FIGS. 16E-16F which are described below in more detail. These alternative descriptions emphasize the various embodiment alternatives that are encompassed by the present disclosure. It will be appreciated that the various embodiments described below (e.g., the laser welding techniques described with respect to FIG. 16F-16G, etc.) are applicable not only to 1-Cell arrangements, but rather any N-Cell arrangement (e.g., 1-Cell, 2-Cell, 3-Cell, etc.).

Referring to FIG. 16D, the contact tabs 1605D are each arranged around a respective contact area 1610D in a "circular" manner. In an example, each respective contact area 1610D may be configured to be directly above at least one positive cell head of at least one battery cell to which a bonding connector for that contact area is to be joined. As shown in FIG. 16C, the contact area need not be circular as illustrated in FIG. 16D. In the example shown in FIG. 16D, there are three contact tabs 1605D that encircle the contact area 1610D (e.g., each offset by 120 degrees radially). While not shown expressly in FIG. 16D, three contact tabs 1605D may encircle each contact area of the multi-layer contact plate 1600D. The radial distance of the contact tabs 1605D from the center-point of a respective contact area 1610D may be scalable to achieve one or more design objectives. For example, a smaller radial distance can be used to achieve an increased cross-section at the busbar, as well as to reduce a resistance associated with a battery cell connection and thereby increase current capacity. In a further example, each contact tab 1605D may be spring-loaded to facilitate laser welding by achieving a near-zero gap to a respective battery cell (e.g., the positive cell head or negative cell rim of the battery cell) and compensate tolerances. Alternatively, each contact tab 1605D may be configured to be pressed downwards onto a respective battery cell to facilitate projection welding or resistance welding.

Figure 16E:
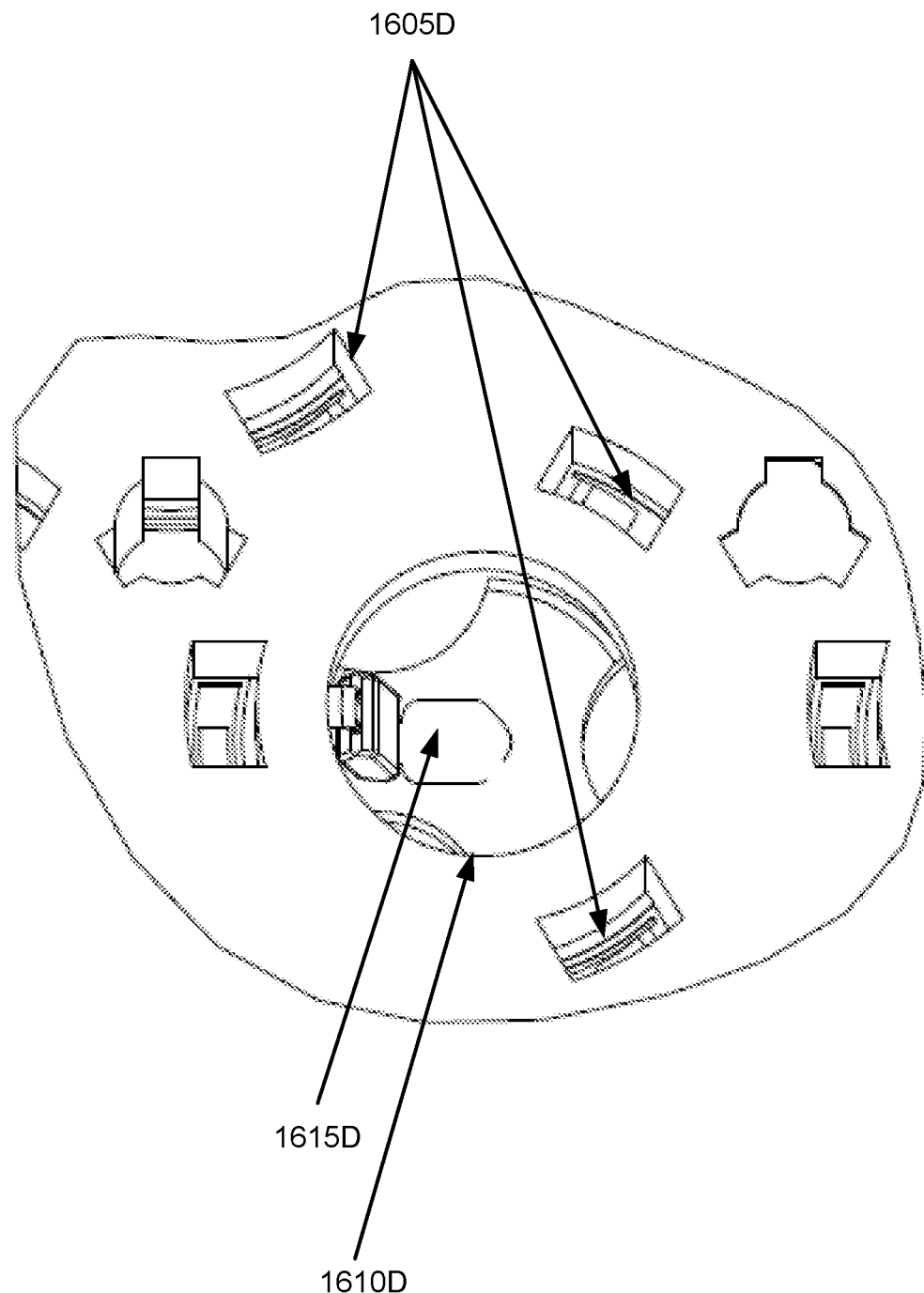
FIG. 16E illustrates the portion of the multi-layer contact plate in FIG. 16D with contact tabs being pushed down onto respective negative cell rim(s) of battery cells in accordance with an embodiment of the disclosure.

Referring now to FIG. 16E, the contact tabs 1605D are shown in a state of being pushed down onto respective negative cell rim(s) of battery cells. As the contact tabs 1605D are pushed downwards, the contact tabs 1605D become bonding connectors (or bonding ribbons), which may be configured somewhat similarly to the positive terminal bonding connectors 1615D described above. However, in at least one embodiment, each positive terminal bonding connector 1615D is connected to a single positive cell head, while each negative terminal bonding connector formed from a respective contact tab 1605D may be connected to multiple negative cell rims as depicted in FIG. 16C. Accordingly, in FIG. 16E, contact tabs 1605D are shown in the act of being pushed down onto respective negative cell rims. In at least one embodiment, the bonding connector 1615D and contact tabs 1605D depicted in FIGS. 16D-16E may each be made from steel (e.g., Hilumin), although the contact tabs 1605D may alternatively be made from other materials (e.g., Al, Cu, etc.).

Moreover, while FIGS. 16D-16E illustrate an implementation where "negative" bonding connectors are constructed from contact tabs 1605D formed from the cell terminal connection layer of the multi-layer contact plate 1600D, other embodiments may be directed to positive bonding connectors formed from contact tabs as well.

In a further example, while the contact tabs 1605D may be constructed from the cell terminal connection layer of a multi-layer contact plate aligned with stamped (e.g., or water drilled, laser cut, etc.) sections from the top and bottom conductive layers as noted above, in other embodiments a single-layer contact plate may be used. In this case, the single-layer contact plate (e.g., solid or non-layered Al or Cu) may be stamped, drilled, milled, water jet cut, etched, and/or laser cut to produce holes, with a contact tab compound (e.g., steel, Al, Cu, etc.) being locally inserted into these holes to produce the contact tabs (e.g., similar to how the bonding connectors are added to the contact plates as shown in FIGS. 16A-16B).

For laser welding, it is generally necessary to have a very small gap or ideally no gap between the two components being welded together. Therefore, contact tabs may be fabricated to be spring-loaded on the negative cell rim or on the positive cell head, depending on whether the contact tab is configured to be deployed on the positive or negative terminal of the battery cell. Due to manufacturing tolerances, however, there may be small differences in the exact welding position.

Figure 16F:
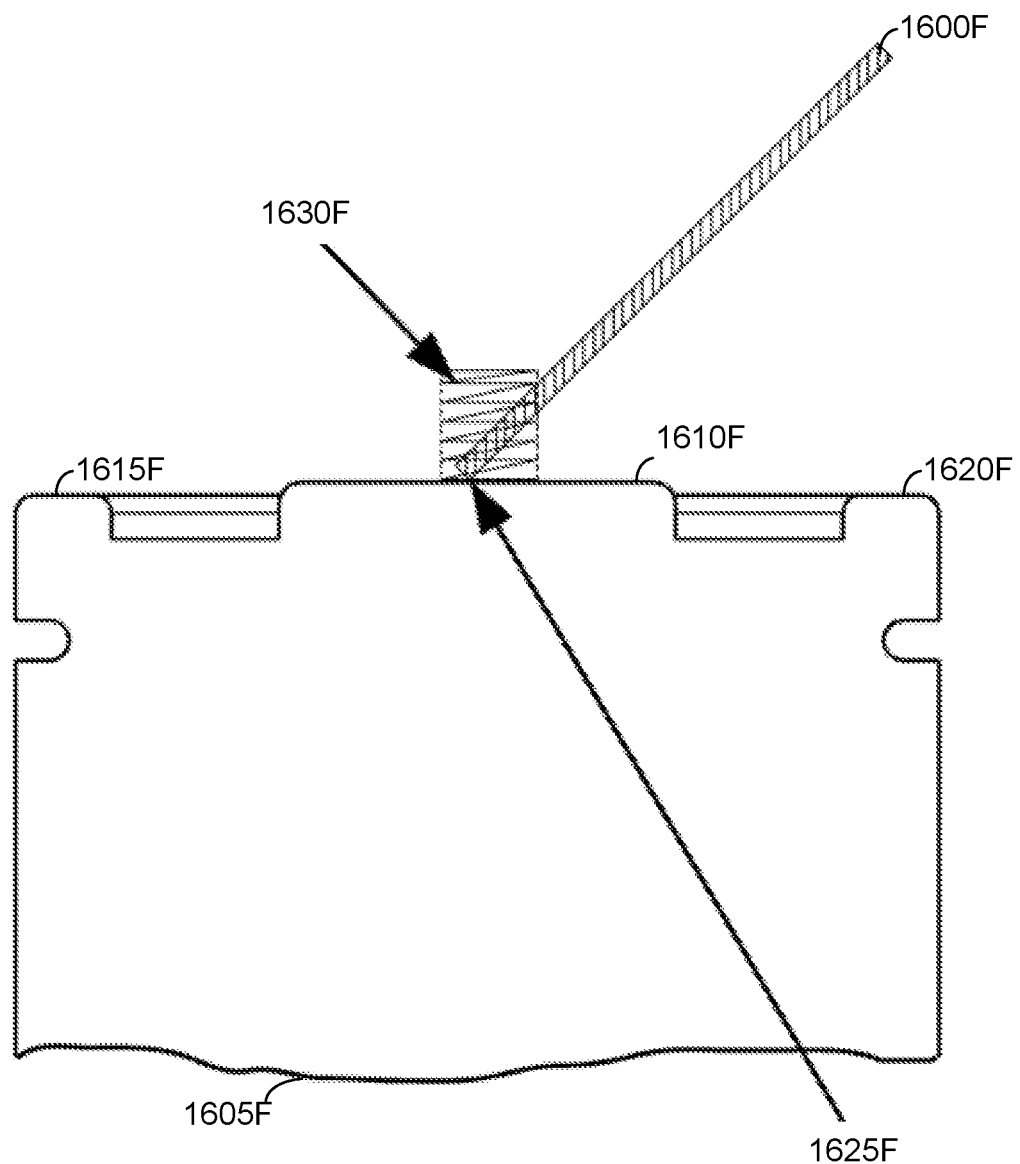
FIG. 16F illustrates an example of a bonding connector being welded onto a positive cell head of a battery cell in accordance with an embodiment of the disclosure.

FIG. 16F illustrates an example of a bonding connector 1600F being welded onto a positive cell head 1610F of a battery cell 1605F in accordance with an embodiment of the disclosure. The battery cell 1605F also includes a negative cell rim 1615F-1620F. In an example, the bonding connector 1600F may be a preassembled bonding connector that is welded onto a contact plate as described above with respect to FIGS. 16A-16B, or alternatively may be formed from an integrated cell terminal connection layer of a multi-layer contact plate as described above with respect to FIGS. 9 and 11.

As shown in FIG. 16F, a contact point 1625F where the bonding connector 1600F meets the positive cell head 1610F may be at an angle, such that the bonding connector 1600F does not sit "flush" on top of the positive cell head 1610F and instead only makes direct contact at the contact point 1625F. More specifically, the contact point 1625F may refer to an area where an edge of the bonding connector 1600F directly contacts the positive cell head (e.g., assuming the bonding connector 1600F is not bent). In an example, the laser welding between the bonding connector 1600F and the positive cell head 1610F may be implemented via an oscillator (e.g., an oscillating laser). By oscillating the laser over a particular range 1630F, the area in which the bonding connector 1600F is welded to the positive cell head 1610F may be increased. Hence, via the use of an oscillating laser, good welding between the bonding connector 1600F and the positive cell head 1610F may be achieved over an area that extends beyond the area where direct (or close) contact between the bonding connector 1600F and the positive cell head 1610F is present prior to the welding.

Figure 16G:
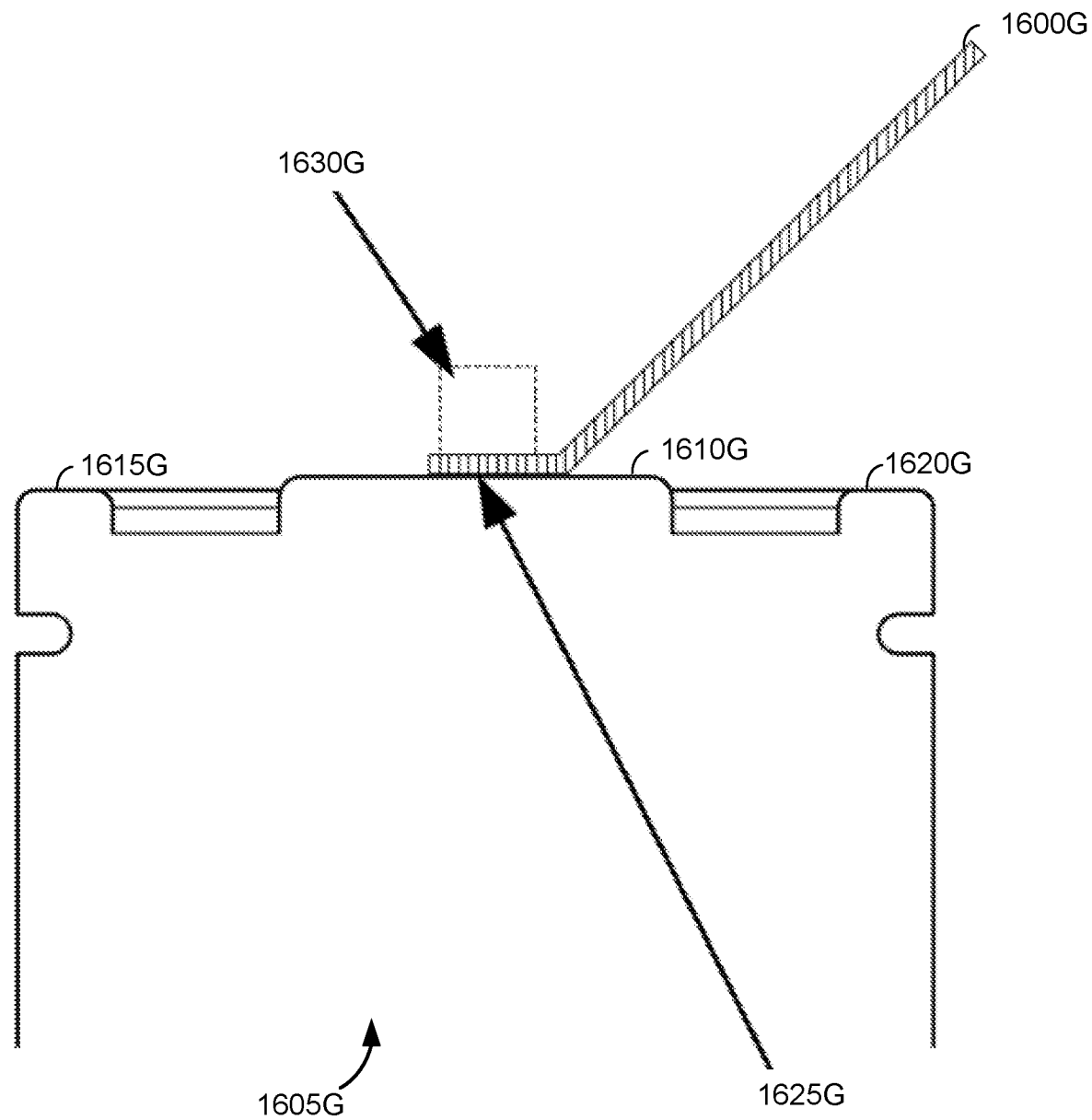
FIG. 16G illustrates an alternative welding implementation relative to FIG. 16F in accordance with an embodiment of the disclosure.

FIG. 16G illustrates an alternative welding implementation relative to FIG. 16F in accordance with an embodiment of the disclosure. Referring to FIG. 16G, a bonding connector 1600G is flattened on top of a positive cell head 1610G of a battery cell 1605G prior to welding. The battery cell 1605G also includes a negative cell rim 1615G-1620G.

As shown in FIG. 16G, instead of a narrow point of direct contact between the bonding connector and positive cell head prior to welding as in FIG. 16F, by virtue of being "flattened", the bonding connector 1600G is flush with the positive cell head 1610G over a target range or target area 1625G. In an example, the bonding connector 1600G may be flattened by applying a hold-down component over the bonding connector 1600G and exerting downward force. In a further example, the hold-down component may correspond to a sapphire glass component. By flattening the bonding connector 1600G over the target range 1625G, a zero or near-zero gap between the bonding connector 1600G and the positive cell rim may be achieved over the target range 1625G prior to welding as shown at 1630G, which improves the transition (e.g., increasing current flow and reducing resistance) between the bonding connector 1600G and the positive cell head 1610G. In an example, an oscillating laser need not be used for welding in FIG. 16G due to the flattening that occurs prior to welding, although this is still possible.

In a further embodiment with respect to the bonding connector welding examples described with respect to FIGS. 16F-16G, soldering (or welding) of a bonding connector to a positive or negative terminal of a battery cell may be facilitated via a soldering compound. In one example, the soldering compound may include a reactive multi-layer foil (e.g., NanoFoil or similar product). The soldering compound may be glued or printed onto a respective bonding connector and, once soldered, may help to form the electrical connection (or electrical bond) between the respective contact plate and a respective terminal of the battery cell. In an example, the soldering compound is separate from the bonding connector itself.

In an example where the soldering compound includes a reactive multi-layer foil, the reactive multi-layer foil may be activated by a small pulse of localized energy from electrical, optical, and/or thermal sources. When activated, the reactive multi-layer foil may be configured to react exothermically to precisely deliver localized heat (e.g., up to temperatures of 1500° C.) in a fraction (e.g., on the order of thousandths) of a second.

It will be appreciated that a conventional laser typically includes a single beam, which may be used to weld at one particular point or along one particular line. In a further embodiment with respect to the bonding connector welding examples described with respect to FIGS. 16F-16G, a diode laser may be used to weld a defined pattern over a broader area. With diode lasers, it is possible to speed up the welding process because the entire target welding area can be heated up concurrently. The heat impact to the battery cell is also reduced due to the reduced welding time in comparison with a standard laser welding process.

Figure 16H:
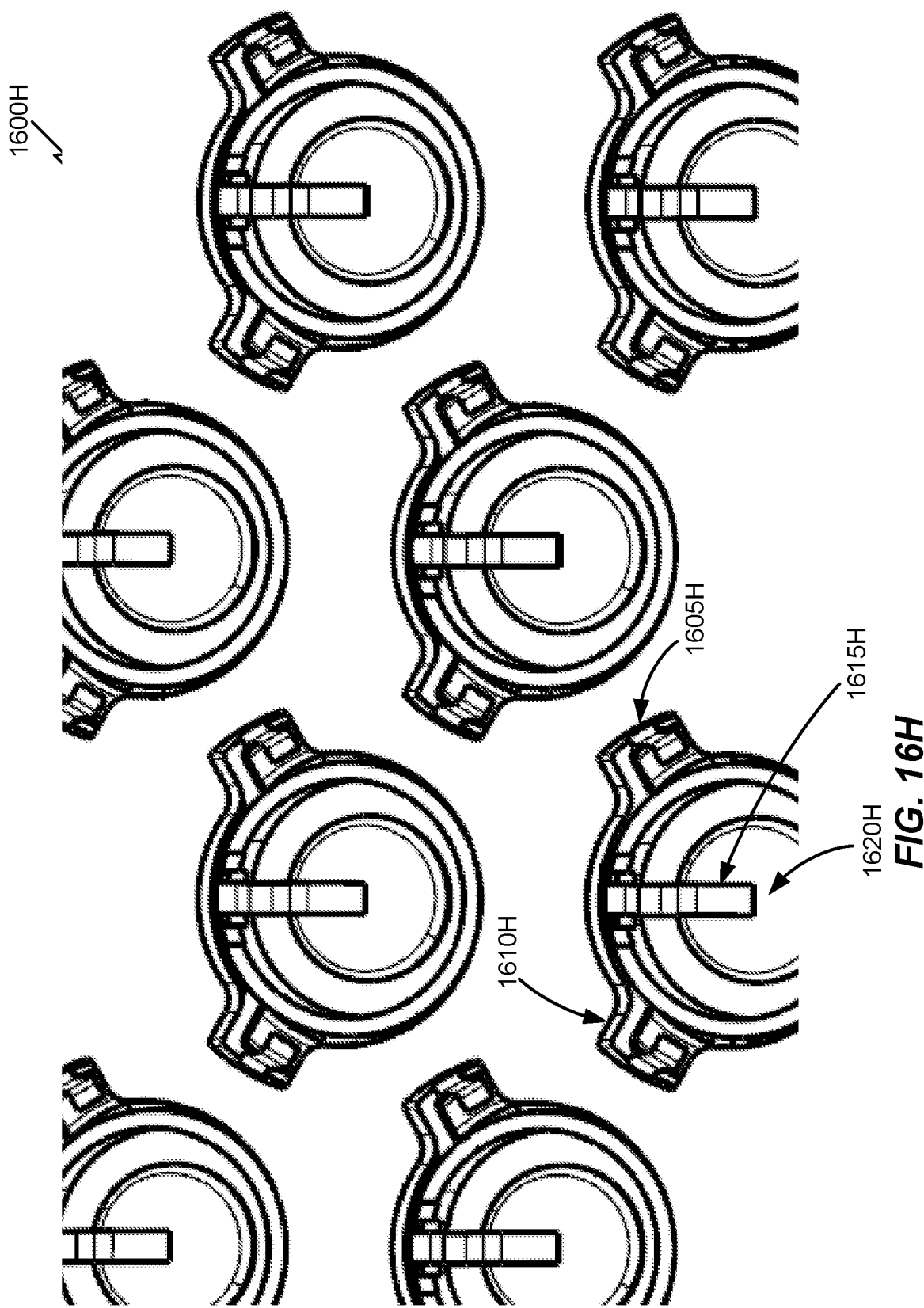
FIG. 16H depicts a 1-Cell arrangement with one contact area per battery cell in accordance with an embodiment of the disclosure.

FIG. 16H depicts a 1-Cell arrangement 1600H with one contact area per battery cell in accordance with an embodiment of the disclosure. In an example, the 1-Cell arrangement 1600H of FIG. 16H may be based on the contact plate described above with respect to FIGS. 16C-16D, with bonding connectors being welded onto positive and negative terminals of respective battery cells as described above with respect to FIGS. 16F-16G. For example, "negative" bonding connectors 1605H and 1610H are welded to negative terminals (or a negative cell rim) of a battery cell, while a "positive" bonding connector 1615H is welded to a positive terminal 1620H (or positive cell head) of the battery cell.

As noted above, for fixation purposes (e.g., laser welding), close contact between the parts is generally desired (e.g., although an oscillator laser can be used to accommodate larger gaps as described above), with little to no gap between the bonding connector and the terminal of the battery cell. In further embodiments, one or more "hold-down" mechanisms can be used to tightly secure the bonding connector to the terminal of the battery cell prior to welding. These hold-down mechanisms may be permanent components of a respective battery module, or alternatively may be non-permanent (e.g., used until the bonding connector is affixed, or welded, to a respective battery cell terminal, and then removed).

Figure 16I:
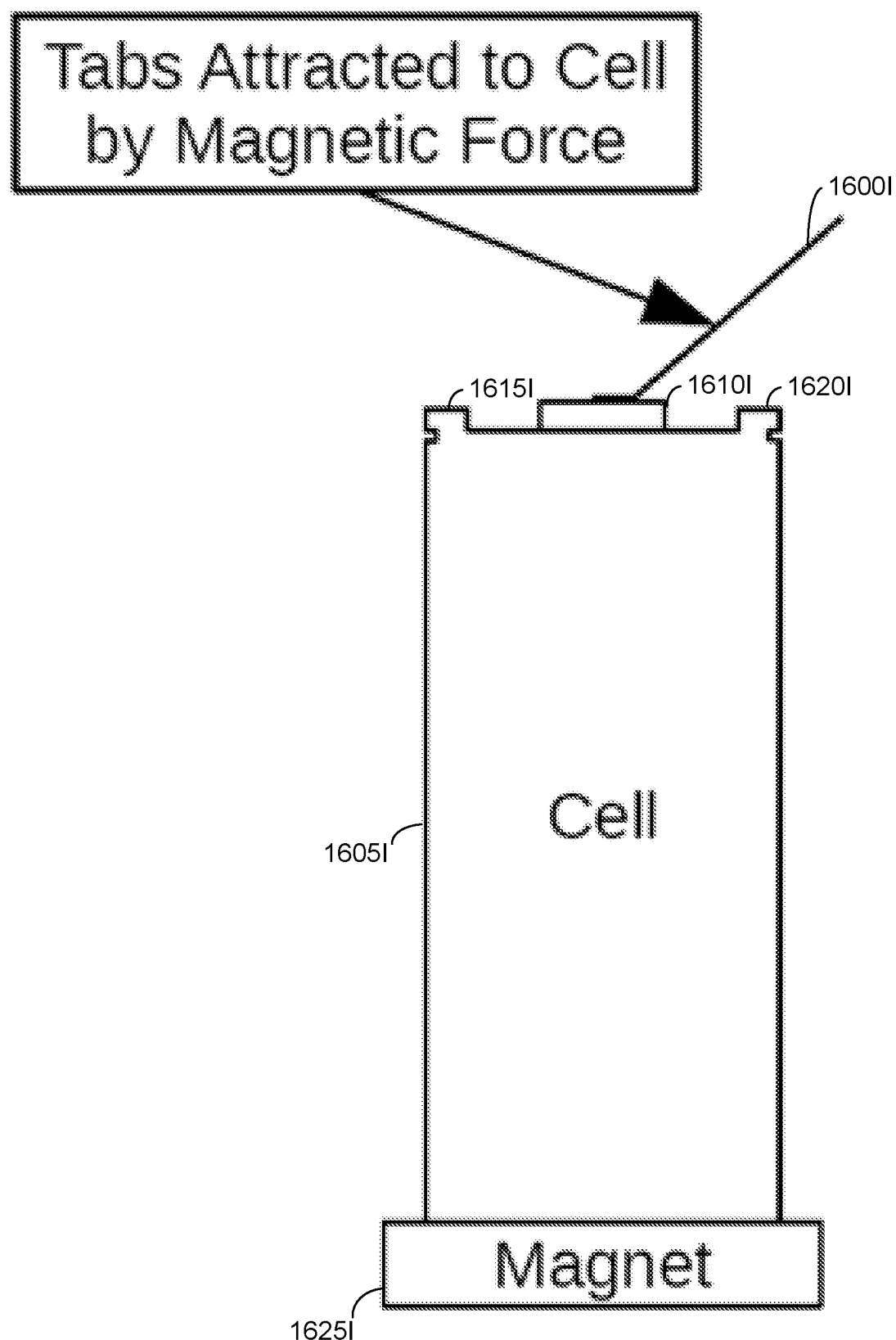
FIG. 16I illustrates an arrangement whereby a bonding connector is secured to a terminal of a battery cell at least in part based on a magnetic field that is used as a hold-down mechanism in accordance with an embodiment of the disclosure.

In a first embodiment, which is illustrated in FIG. 16I, magnetic-based fixation may be used as a hold-down mechanism to secure bonding connectors to a respective terminal of a battery cell prior to welding. More specifically, to facilitate contact between the battery cell terminal and the bonding connector, a magnetic field may be induced in proximity to the battery cell terminal, such that the bonding connector is magnetically attracted to the battery cell terminal. The permanent position of the bonding connector can then be fixed through a fixation process such as laser welding.

FIG. 16I illustrates an arrangement whereby a bonding connector 1600I is secured to a terminal of a battery cell 1605I at least in part based on a magnetic field that is used as a hold-down mechanism in accordance with an embodiment of the disclosure. The embodiment of FIG. 16I may be deployed in conjunction with any of the bonding connector fixation (or welding) techniques described herein. The battery cell 1605I includes a positive cell head 1610I, and a negative cell rim 1615I and 1620I. In FIG. 16I, the bonding connector 1600I is placed into contact with the positive cell head 1610I. To help secure the bonding connector 1600I to the positive cell head 1610I prior to welding, a magnetic field is applied to secure the bonding connector 1600I onto the positive cell head 1610I. In one example, a magnet 1625I is arranged beneath the battery cell 1605I. In an example, the magnet 1625I may be placed under or around the battery cell 1605I prior to the welding of the bonding connector 1600I to the positive cell head 1610I. More specifically, while not shown expressly in FIG. 16I, the battery cell 1605I may be placed into a relatively thin battery housing (e.g., made from plastic), along with a number of other battery cells. The magnet 1625I may be placed beneath the battery housing to induce the magnetic field described above (e.g., with respect to the battery cell 1605I and/or other battery cells in the battery housing). Accordingly, the magnet 1625I need not be in direct contact with the battery cell 1605I. In a further example, the magnetic field induced by the magnet 1625I may be elongated by metallic properties of the battery cell 1605I, such that the bonding connector 1600I becomes magnetically attracted to the positive cell head 1610I. In an example, after the fixation of the bonding connector 1600I to the positive cell head 1610I, the magnet 1625I may optionally be removed from the battery housing.

While FIG. 16I illustrates an example where a separate magnet is deployed to facilitate magnetic attraction between the bonding connector 1600I and the positive cell head 1610I to function as a hold-down mechanism, in another embodiment of the disclosure, the battery cell 1605I itself may be magnetized to facilitate the magnetic attraction. For example, each battery cell may be passed through a magnetic coil prior to insertion into the battery housing. In this case, the magnet 1625I may be omitted. Alternatively, the magnet 1625I may be used in conjunction with separately magnetized battery cells.

Figure 16J:
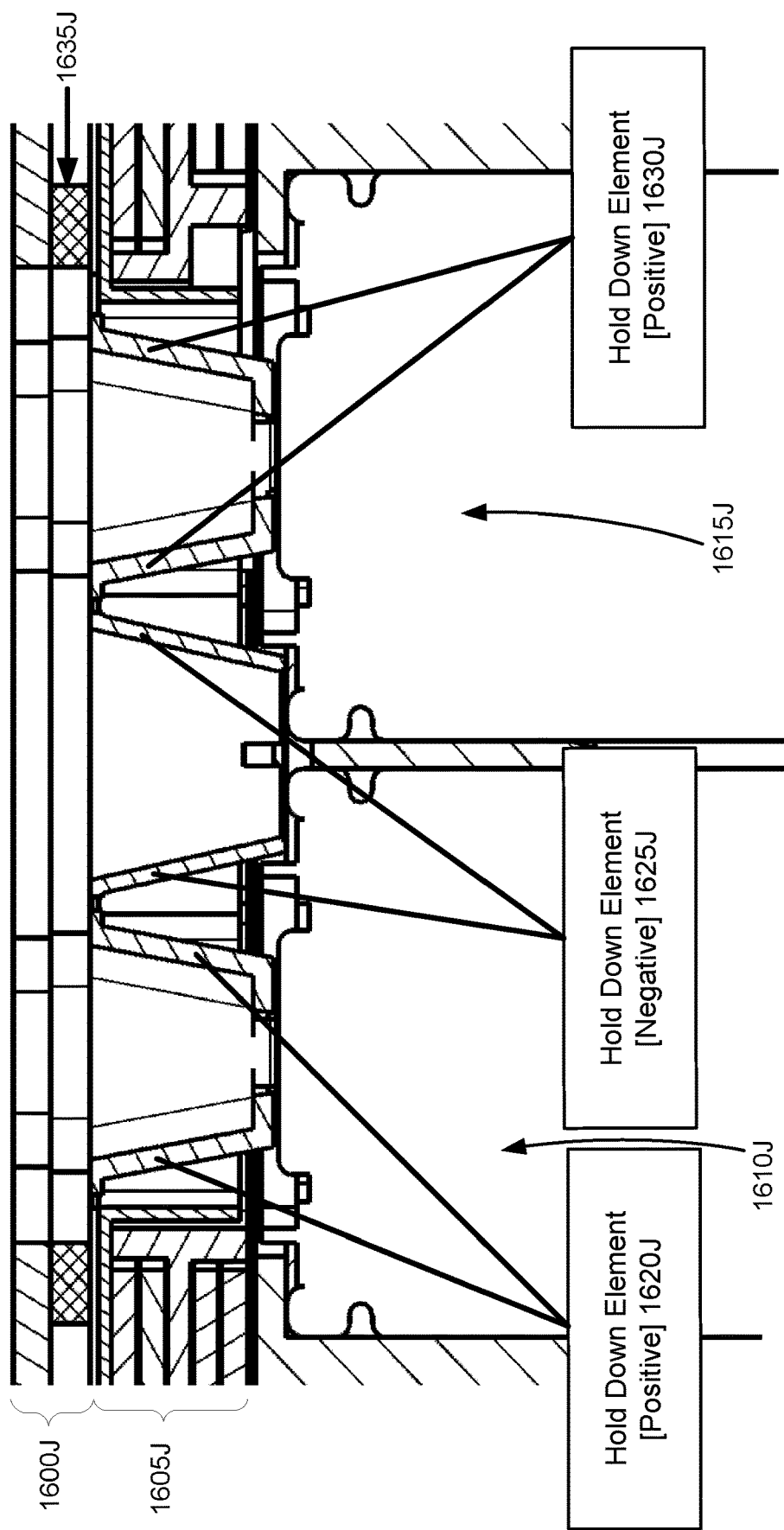
FIG. 16J depicts a hold-down plate mounted on top of a hybrid contact plate arrangement in accordance with an embodiment of the disclosure.
Figure 16K:
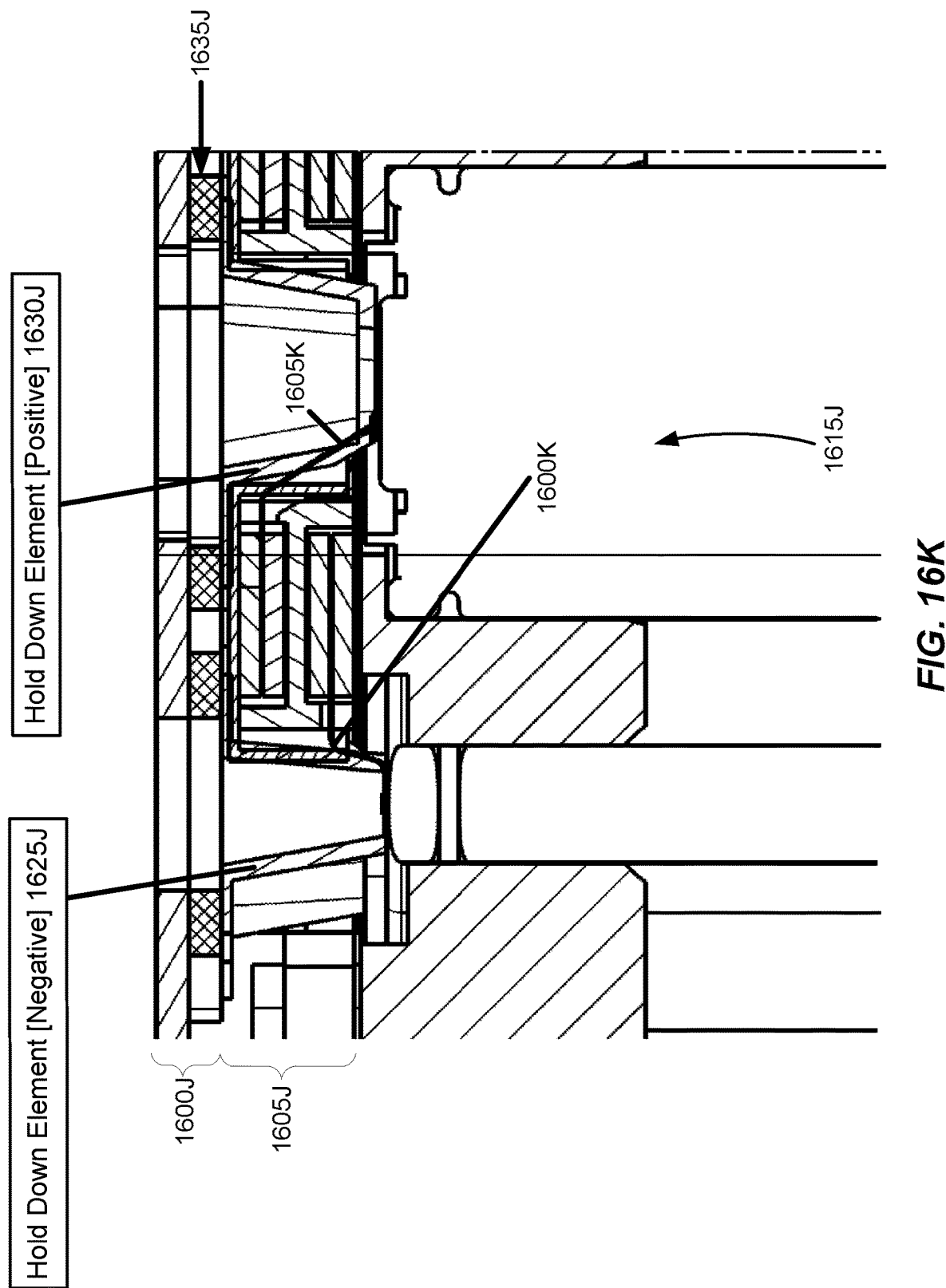
FIG. 16K depicts a different side-perspective of the hold-down plate depicted in FIG. 16J in accordance with an embodiment of the disclosure.
Figure 16L:
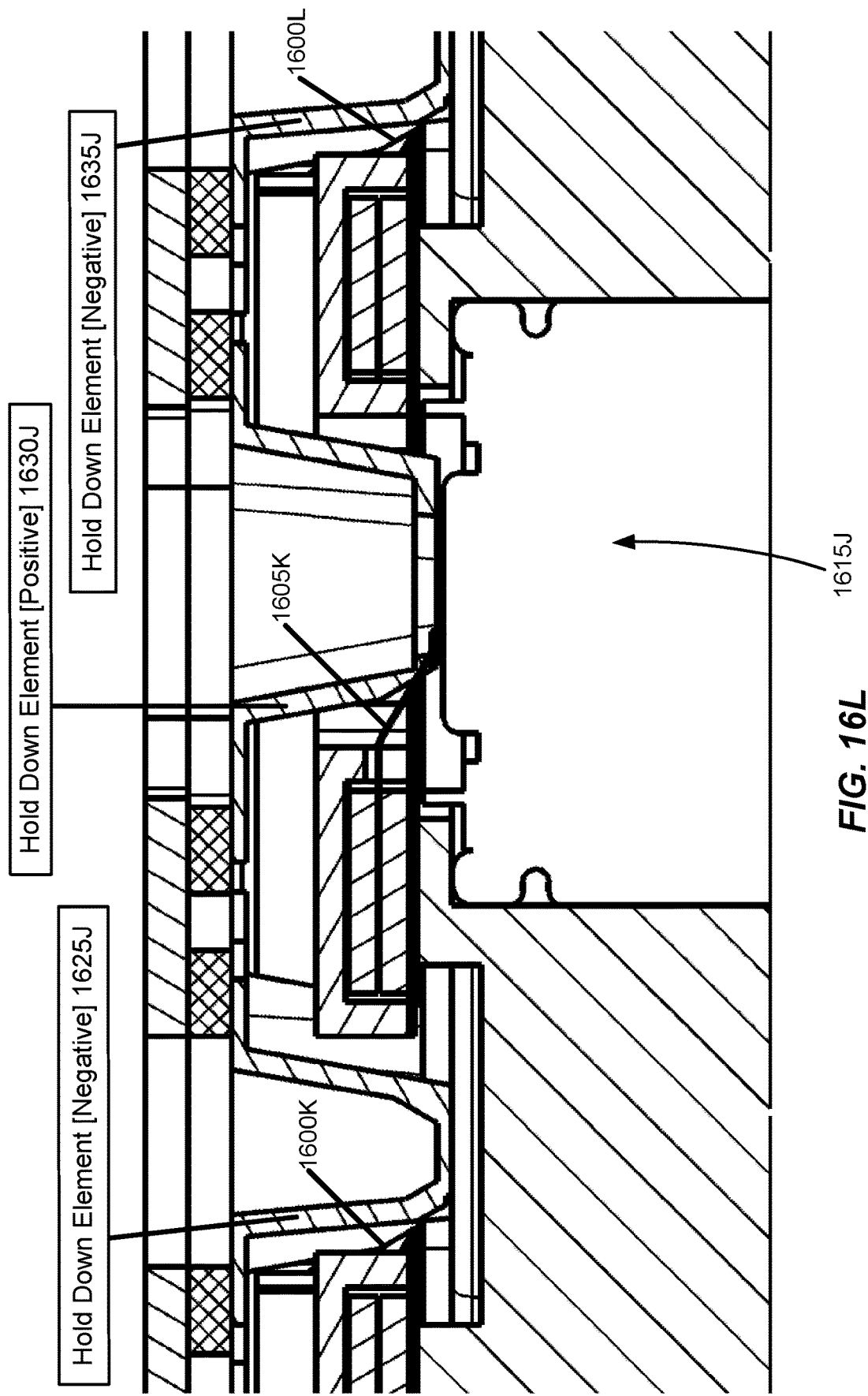
FIG. 16L depicts another different side-perspective of the hold-down plate depicted in FIG. 16J in accordance with an embodiment of the disclosure.

In a second embodiment, which is illustrated in FIGS. 16J-16L via different side-perspectives, a hold-down mechanism may be implemented via a hold-down plate that is placed on top of a hybrid contact plate (e.g., any of the hybrid contact plates described above).

Referring to FIG. 16J, a hold-down plate 1600J is shown as mounted on top of a hybrid contact plate arrangement 1605J (e.g., comprising a "top" multi-layer contact plate, an intervening insulation layer, and a "bottom" multi-layer contact plate), which is in turn mounted on top of battery cells 1610J and 1615J. Hold-down elements 1620J, 1625J and 1630J are connected to the hold-down plate 1600J. The hold-down elements 1620J, 1625J and 1630J are protrusions that are aligned with the contact areas where the various bonding connectors are positioned (e.g., over respective positive and negative terminals of the battery cells 1610J and 1615J). By aligning these protrusions with bonding connectors and then applying downward force to the hold-down plate 1600J, the hold-down elements 1620J, 1625I and 1630I in turn apply downward force to the respective bonding connectors in the hybrid contact plate arrangement 1605I such that the bonding connectors are bent and pressed down onto respective terminals. More specifically, the hold-down element 1620I applies downward force to a "positive" bonding connector that is to be affixed to a positive cell head of battery cell 1610J, the hold-down element 1625I applies downward force to a "negative" bonding connector that is to be affixed to negative cell rims of battery cells 1610I and 1615J, and the hold-down element 1630I applies downward force to a "positive" bonding connector that is to be affixed to a positive cell head of battery cell 1615I. The shapes of the above-noted protrusions may be configured to conform to a desired shape of the bonding connectors prior to the bonding connectors being welded to the respective terminals. As will be appreciated, the battery cell arrangement depicted in FIG. 16J is an example of a 2-Cell arrangement, as shown in FIG. 16C with respect to 1610C as an example. It will be appreciated that the hold-down plate 1600I may alternatively be configured for 1-Cell arrangements (e.g., as in FIG. 16H), 3-Cell arrangements (e.g., 1615C of FIG. 16C), and so on. Also shown in FIG. 16J is an elastic element 1635J, which may help for tolerance (e.g., so that damage is not caused to the hybrid contact plate arrangement 1605J, battery cells 1610J-1615J, and/or the battery housing as downward force is applied to the hold-down plate 1600J).

Referring to FIG. 16K, a different side-perspective of the hold-down plate 1600I depicted in FIG. 16J is shown. The negative and positive bonding connectors 1600K and 1605K are more clearly illustrated in FIG. 16K.

Referring to FIG. 16L, another different side-perspective of the hold-down plate 1600I depicted in FIG. 16J is shown. The negative and positive bonding connectors 1600K and 1605K are more clearly illustrated in FIG. 16L, as well as negative contact tab 1600L.

As discussed above, battery modules for certain applications, such as electric vehicles, may be required to provide a fairly high voltage output (e.g., 300V-800V or even higher). Due to the high voltage, there is a possibility that an arc (i.e., an electrical discharge) will occur. Arcs occur when an electrical connection is opened (e.g., by a high current), resulting in a voltage differential. For P groups connected in series, an arc may be most likely to occur when the last parallel connection in one of the P groups is opened (e.g., because the current intended to be handled by the entire P group is instead channeled through one particular cell terminal connection, which will then likely break). Arcs can involve a high amount of current and can thereby be very dangerous (e.g., an arc can cause a temperature spike which can damage one or more battery cells in a battery module). Conventionally, the risk of arcs is mitigated by placing insulation between areas with a voltage differential and/or physically separating two areas with different electrical potentials (e.g., increasing a creeping distance). However, it may be difficult to predict precisely where an arc will occur. For example, in a battery module with a high number of battery cells connected in parallel per P group, an arc could theoretically occur at any of these battery cells.

As noted above, arcs are most likely to occur in a serial circuit arrangement, such as P groups connected in series, when the very last parallel electrical connection within a particular P group is broken. Generally, as described below with respect to FIGS. 17A-17C, one particular parallel electrical connection in a P group may be configured with a higher fuse rating (e.g., an amperage at which the fuse is configured to break the fuse) than any other in that P group to isolate where an arc is most likely to occur so that arc mitigation features can be deployed at that particular area of a contact plate.

Figure 17A:
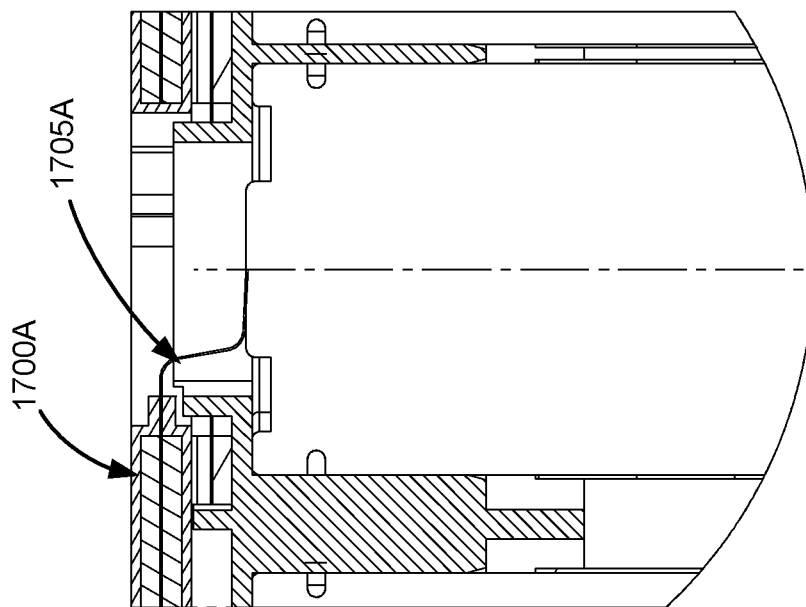
FIG. 17A illustrates a top-perspective of a portion of a multi-layer contact plate, along with a side-perspective of the multi-layer contact plate that shows the multi-layer contact plate connected to a top-facing positive terminal of a battery cell in accordance with an embodiment of the disclosure.
Figure 17A:
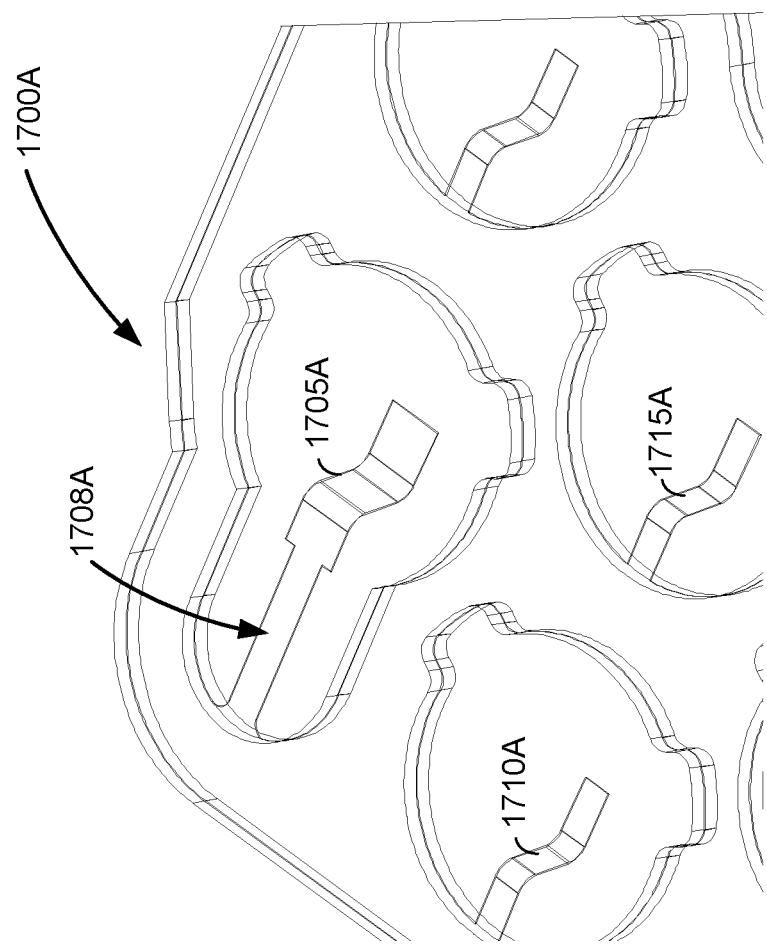

FIG. 17A illustrates a top-perspective of a portion of a multi-layer contact plate 1700A, along with a side-perspective of the multi-layer contact plate 1700A that shows the multi-layer contact plate 1700A connected to a top-facing positive terminal of a battery cell in accordance with an embodiment of the disclosure.

Referring to FIG. 17A, the multi-layer contact plate 1700A includes bonding connectors 1705A, 1710A and 1715A. As discussed above, the bonding connectors 1705A, 1710A and 1715A may either be formed from a cell connection terminal layer of the multi-layer contact plate 1700A, or alternatively may be attached (e.g., via welding) specifically near contact areas of the multi-layer contact plate 1700A as described above with respect to FIGS. 16A-16B.

As shown in FIG. 17A, the bonding connector 1705A is configured with a higher resistance than bonding connectors 1710A or 1715A, which gives the bonding connector 1705A a higher fuse rating relative to the bonding connectors 1710A and 1715A. Below, reference to the higher resistance of the "high-fuse" bonding connector is used interchangeably with reference to a "higher fuse rating" of the "high-fuse" bonding connector as two different alternate ways to characterize this particular characteristic of the "high-fuse" bonding connector. In an example, the higher relative resistance of the bonding connector 1705A may be implemented in a variety of ways, such as forming the bonding connector 1705A with a higher resistance material that is different from the material used for the bonding connectors 1710A or 1715A, configuring the bonding connector 1705A with a different geometry (e.g., modifying a shape of the bonding connector 1705A relative to other bonding connectors by increasing the relative length, thickness, etc. of the bonding connector 1705A), or any combination thereof. Accordingly, in some implementations, "high-fuse" bonding connectors may be made from a higher-resistant material relative to the other bonding connectors while having the same or similar geometry (e.g., same shape, thickness, etc.). In other implementations, "high-fuse" bonding connectors may be made from the same material as the other bonding connectors while having a different geometry (e.g., different shape, thickness, etc.). In yet other implementations, "high-fuse" bonding connectors may be made from a higher-resistant material relative to the other bonding connectors while also having a different geometry (e.g., different shape, thickness, etc.).

Referring to FIG. 17A, the bonding connector 1705A includes a lower-resistance section 1708A that functions as a fuse for the bonding connector 1705A. This lower-resistance section 1708A has a higher resistance than the bonding connectors 1710A or 1715A, while having a lower relative resistance than the rest of the bonding connector 1705A. Accordingly, when the bonding connector 1705A breaks due to high current, the specific point at which the break of the bonding connector 1705A will be expected to occur specifically at the lower-resistance section 1708A.

In an example, the bonding connectors 1705A, 1710A and 1715A may be made from steel, such as Hilumin (e.g., an electro nickel-plated diffusion annealed steel strip for battery applications with low contact resistance and high corrosion resistance). However, as noted above, the bonding connectors 1705A, 1710A and 1715A may also be made from other materials (e.g., which may be the same or different from the battery cell terminal material and/or materials used in one or more other layers of the multi-layer contact plate 1700A). Accordingly, as the current through the multi-layer contact plate 1700A increases, the bonding connectors 1710A and 1715A function as lower-resistance fuses that will be expected to break before the "high-fuse" bonding connector 1705A. As will be appreciated, defining the last bonding connector to break for a P group may help to isolate arc occurrences to that particular bonding connector, which reduces the area of the multi-layer contact plate that needs to be protected against arcs. This in turn saves material costs and simplifies production compared to deploying arc protection for all bonding connectors on the contact plate. Various arc protection features that may be deployed in proximity to the bonding connector 1705A are described below with respect to FIGS. 17B-17C.

While FIG. 17A describes a single "high-fuse" bonding connector for arc protection, it is theoretically possible for multiple bonding connectors to be deployed for this purpose in other embodiments (e.g., with arc protection being deployed with respect to each high-fuse bonding protector). Also, while FIG. 17A illustrates an example specific to a multi-layer contact plate, it will be appreciated that other embodiments can deploy high-fuse bonding connector(s) with respect to single-layer contact plates. For example, consider FIGS. 16A-16B where preassembled bonding connectors are simply attached to a contact plate without necessarily requiring a multi-layer contact plate. In this case, one (or more) of the preassembled bonding connectors can be configured more thickly than the others to achieve a higher fuse rating.

Figure 17B:
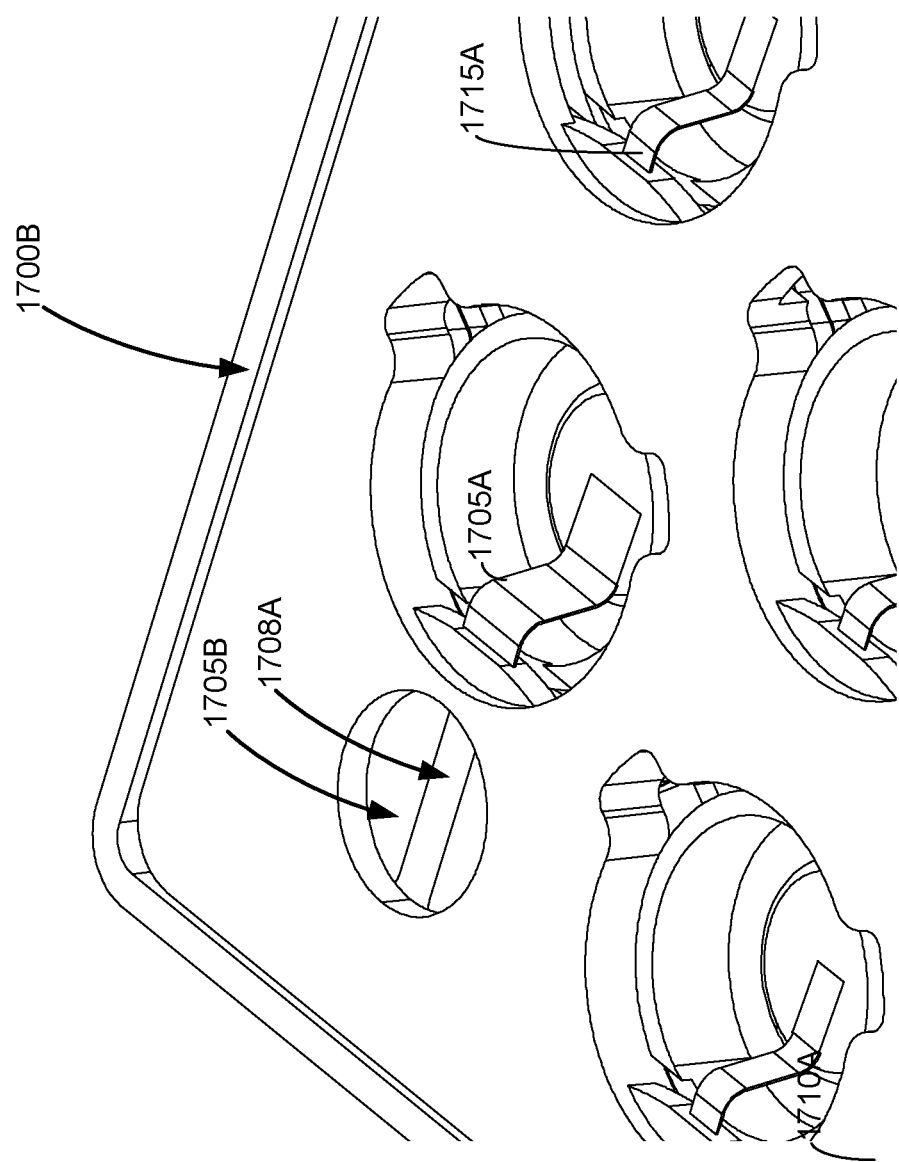
FIG. 17B illustrates a top-perspective of a portion of the multi-layer contact plate of FIG. 17A including an insulation layer stacked thereon in accordance with an embodiment of the disclosure.
Figure 17C:
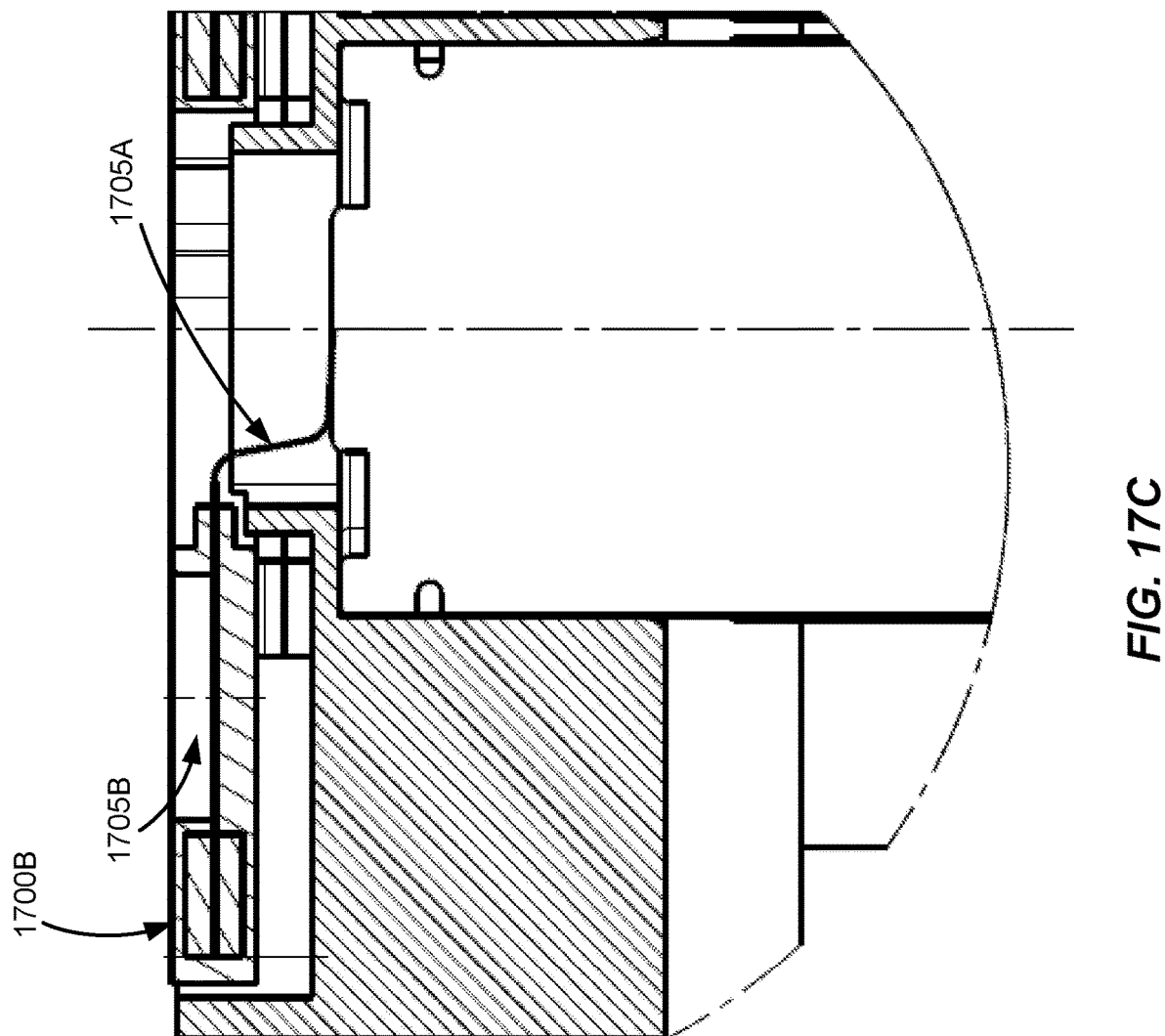
FIG. 17C illustrates a side-perspective of the multi-layer contact plate of FIG. 17C and the insulation layer of FIG. 17B that shows a respective connection to a top-facing positive terminal of a battery cell in accordance with an embodiment of the disclosure.

FIG. 17B illustrates a top-perspective of a portion of the multi-layer contact plate 1700A including an insulation layer 1700B stacked thereon, while FIG. 17C illustrates a side-perspective of the multi-layer contact plate 1700A and insulation layer 1700B that shows a respective connection to a top-facing positive terminal of a battery cell in accordance with an embodiment of the disclosure. In an example, the insulation layer 1700B may be configured similarly to any of the insulation layers described above with respect to hybrid contact plates.

Referring to FIGS. 17B-17C, a recessed portion 1705B (or hole) may be integrated into the insulation layer 1700B in proximity to the bonding connector 1705A, such that some or all of the lower-resistance section 1708A of the bonding connector 1705A is exposed through the recessed portion 1705B. As shown in FIG. 17C, the recessed portion 1705B may be filled with a protective compound (e.g., quartz sand, red phosphor gel, etc.) that is configured to provide arc protection. As noted above, the lower-resistance section 1708A of the bonding connector 1705A may be aligned with the recessed portion 1705B and may be configured with the lowest resistance along the bonding connector 1705A, while still having higher resistance than any other "normal" bonding connector. In this case, the "high-fuse" bonding connector 1705A may be configured to break specifically in the recessed portion 1705B where the protective compound is provided. The protective compound deployed in the recessed portion 1705B may help to cool down the bonding connector 1705A when opening (e.g., after high current is experienced) to ensure to reduce plasma being formed from the vaporized metal of the blown fuse. In another example, additional arc protection features can be deployed in proximity to the bonding connector 1705A, such as implementing a magnetic field or air flow to interrupt an arc. These additional arc protection features may be applied specifically to the lower-resistance section 1708A, as an example. In a further example, the bonding connector 1705A may be implemented as a melting safety fuse.

Turning back to the general configuration of cylindrical battery cells as discussed above with respect to FIGS. 4-5, cylindrical battery cells deployed in P group arrangements conventionally include positive and negative terminals at opposite sides of the battery cell. This is in part due to the conventional layout of contact plates, which generally do not permit all contact plates to be arranged on the same side of the battery cells across different P groups. Various embodiments of the disclosure which have already been described above relate to contact plate arrangements that permit cylindrical battery cells that include both top-facing positive and negative terminals to be used, which will now be discussed in more detail.

Figure 18A:
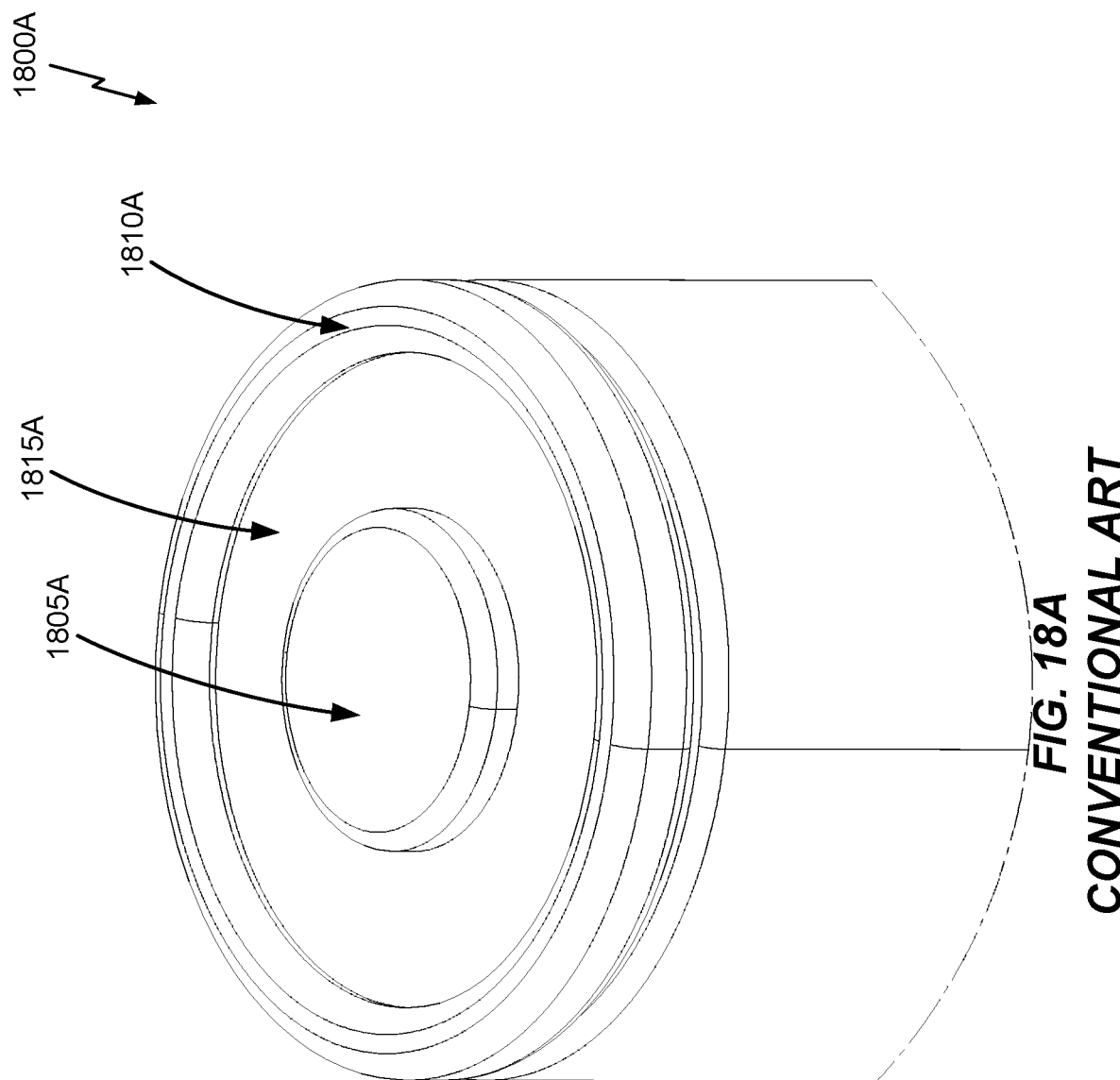
FIG. 18A illustrates a conventional multi-terminal cell side of a conventional cylindrical battery cell.

FIG. 18A illustrates a conventional multi-terminal cell side 1800A of a conventional cylindrical battery cell. As noted above, while the cylindrical battery cell depicted in FIG. 18A is conventional (e.g., an off-the-shelf product available on the market), this type of cylindrical battery cell has generally not been used in association with P group arrangements in battery modules.

Referring to FIG. 18A, the multi-terminal cell side 1800A includes a positive cell head 1805A (e.g., the positive terminal for the battery cell) that is implemented as a round head in the center or inner portion of the multi-terminal cell side 1800A. In an example, for an 18650 cell, the positive cell head 1805A may occupy an area of approximately 50 mm². The multi-terminal cell side 1800A further includes a negative cell rim 1810A (e.g., the negative terminal for the battery cell) arranged along an outer periphery (or "rim") of the multi-terminal cell side 1800A. A recessed area 1815A is arranged between the positive cell head 1805A and the negative cell rim 1810A. While not expressly shown in FIG. 18A, a relatively thin insulative divider (e.g., made from plastic) may be configured between the positive cell head 1805A and the negative cell rim 1810A (e.g., to internally separate the positive and negative terminals).

Figure 18B:
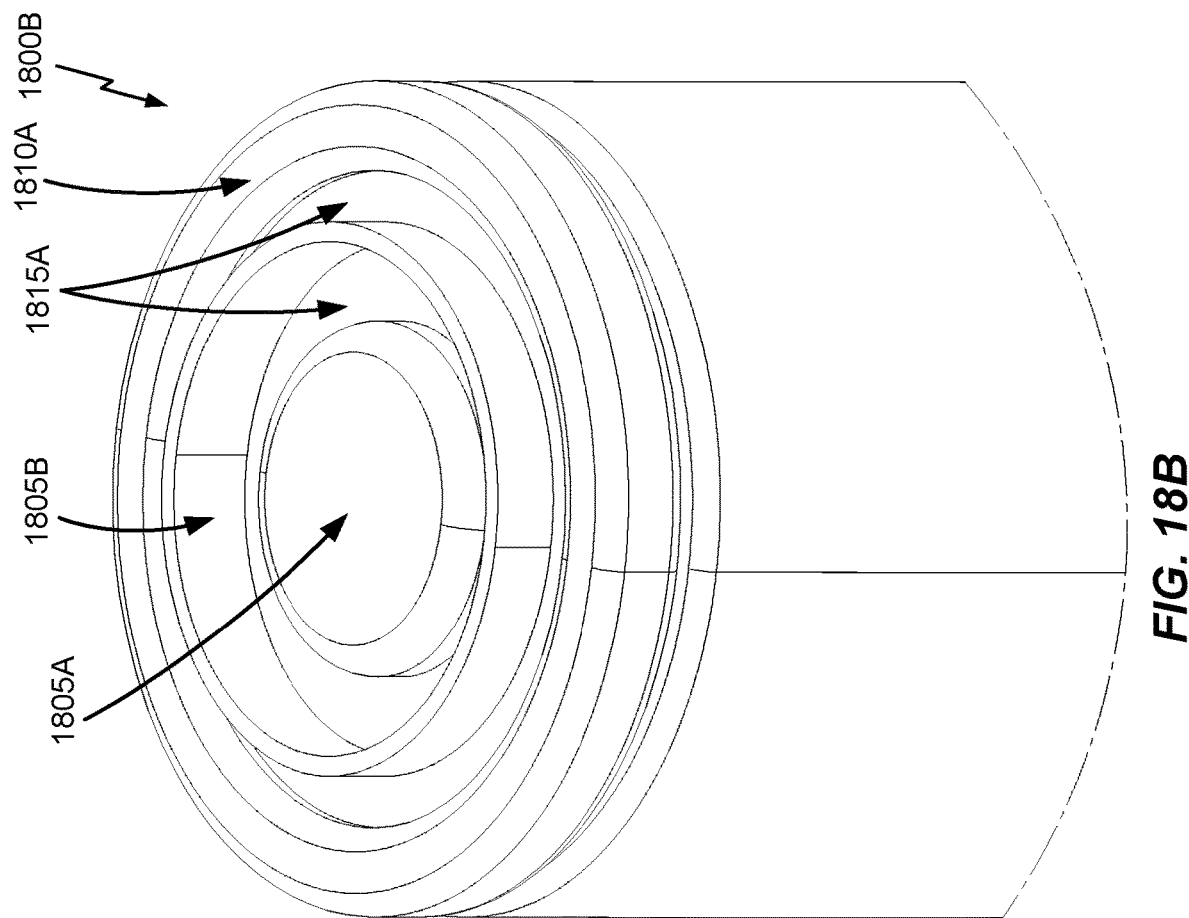
FIG. 18B illustrates a multi-terminal cell side of a cylindrical battery cell in accordance with an embodiment of the disclosure.

FIG. 18B illustrates a multi-terminal cell side 1800B of a cylindrical battery cell in accordance with an embodiment of the disclosure. The multi-terminal cell side 1800B includes the positive cell head 1805A, the negative cell rim 1810A, and the recessed area 1815A, similar to the multi-terminal cell side 1800A described above with respect to FIG. 18A. In addition, the multi-terminal cell side 1800B further includes an insulative ring 1805B (e.g., made from plastic) placed over an insulative divider (not shown) in the recessed area 1815A between the positive cell head 1805A and the negative cell rim 1810A. The insulative ring 1805B acts as a "wall" or barrier between the positive cell head 1805A and the negative cell rim 1810A that may provide a variety of benefits, as explained below with respect to FIG. 19.

Figure 19:
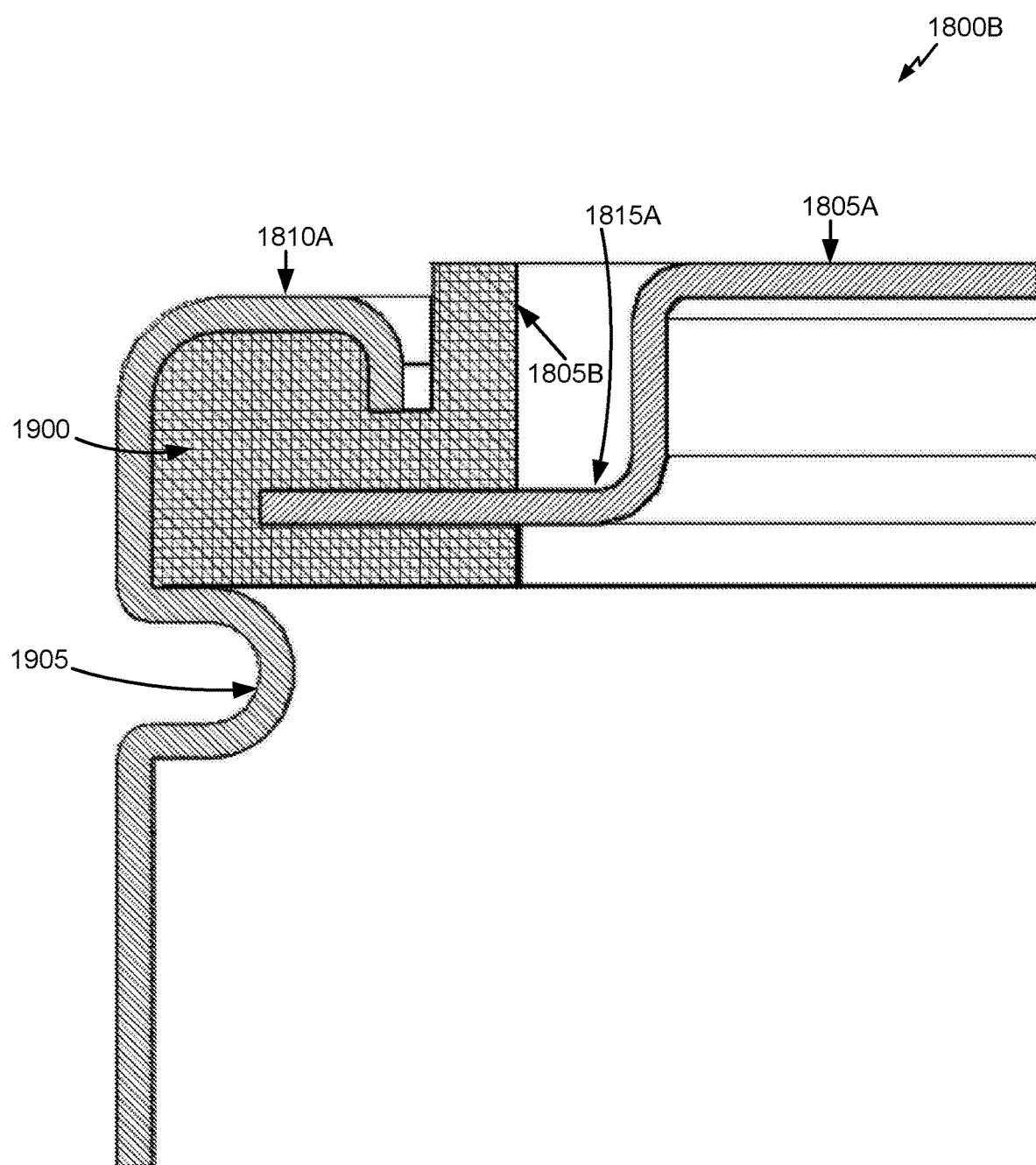
FIG. 19 illustrates a side-perspective of the multi-terminal cell side of FIG. 18B in accordance with an embodiment of the disclosure.

FIG. 19 illustrates a side-perspective of the multi-terminal cell side 1800B of FIG. 18B in accordance with an embodiment of the disclosure. In particular, the insulative ring 1805B is shown in more detail in FIG. 19, as well as an insulative divider 1900.

Most cylindrical battery cells, such as the 18650 cell, are configured for applications with lower voltages. In the future, however, voltage requirements for certain applications (e.g., electric vehicles) are likely to increase. Higher-voltage applications may require higher insulation between the positive cell head 1805A and the negative cell rim 1810A. The insulative ring 1805B increases the insulation between the positive cell head 1805A and the negative cell rim 1810A, which may increase a creeping distance (e.g., an electrical creeping distance) between the positive cell head 1805A and the negative cell rim 1810A. The insulative ring 1805B may also protect one pole from the other and from sparks during (an optional) welding process. The insulative ring 1805B may also be configured to protect against conductive material leaking out of the cylindrical battery cell in response to an overpressure condition.

Referring to FIG. 19, the insulative ring 1805B and the insulative divider 1900 formed in the recessed area 1815A are shown as one joined layer (e.g., one piece of plastic), such that the insulative ring 1805B is part of the insulative divider 1900. However, in other embodiments, the insulative ring 1805B and the insulative divider 1900 may be implemented as separate components (e.g., two pieces of plastic that are glued together). A groove 1905 may be configured as a fixation element (e.g., to hold the insulative divider 1900 in place). In an example, the insulative ring 1805B may be arranged (e.g., clamped) between the inner-section of the groove 1905 and the negative cell rim 1810A, as shown in FIG. 19.

Referring to FIG. 19, during construction of the battery cell, battery fluid material may be filled with the battery cell via an open top. In an example, once the battery fluid reaches a target fill-level for the battery cell, the side of the battery cell is crimped to form the negative cell rim 1810A.

Referring to FIGS. 18-19, the positive cell head 1805A and negative cell rim 1810A may be made from the same material (e.g., steel or Hilumin) in some embodiments. However, it is also possible to configure the positive cell head 1805A and the negative cell rim 1810A in FIGS. 18-19 with different material types in other embodiments (e.g., Al and steel, Cu and Al, Cu and steel, etc.).

Between battery cells connected in serial between respective P groups in a battery module as described above, some form of insulation may be integrated via an insulator between the respective battery cells. For example, cylindrical battery cells may be fixed at their top and bottom in a housing as discussed above with respect to FIG. 14, and an insulator (e.g., an insulation dividing wall) may be integrated between these top and bottom parts of the battery. However, allocating additional space for insulation in the housing may reduce the capacity of a battery module.

Figure 20:
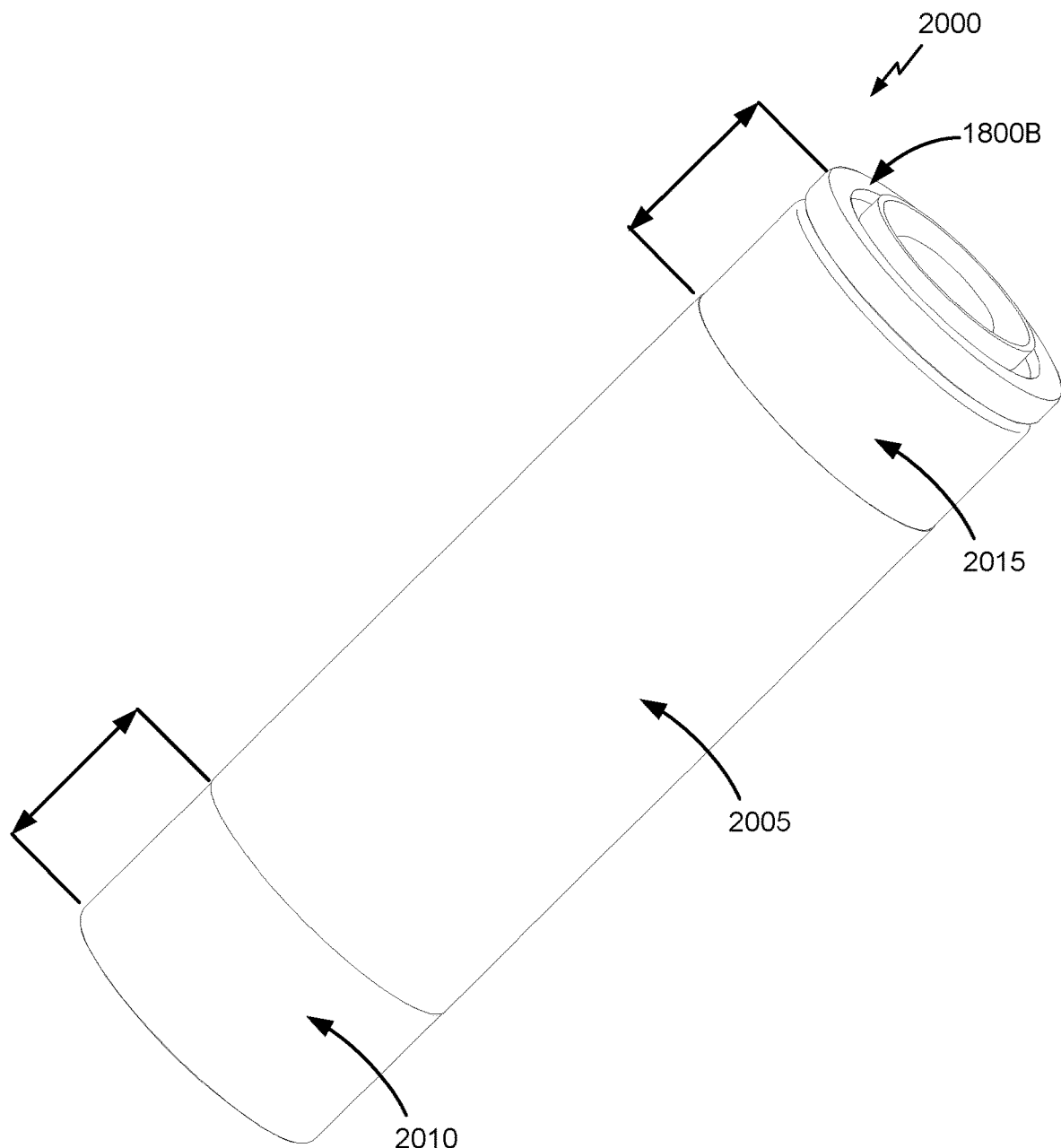
FIG. 20 illustrates a cylindrical battery cell in accordance with an embodiment of the disclosure.

FIG. 20 illustrates a cylindrical battery cell 2000 in accordance with an embodiment of the disclosure. The cylindrical battery cell 2000 includes a higher insulation area 2005 in a middle-portion of the cylindrical battery cell 2000, a first lower insulation area 2010 extending from the multi-terminal cell side 1800B, and a second lower insulation area 2015 extending from a side (or end) of the cylindrical battery cell 2000 that is opposite from the multi-terminal cell side 1800B. The higher insulation area 2005 and the first and second lower insulation areas 2010-2015 are arranged around the sides (or ends) of the cylindrical battery cell 2000 as shown in FIG. 20. More specifically, the higher insulation area 2005 is an area where one or more extra layers of insulation are integrated into the battery cell itself, which reduces the need to use external insulation between battery cells inside of a housing. In an example, the one or more extra layers of insulation (e.g., foil) may be wrapped around the middle area of the cylindrical battery cell 2000 to form the higher insulation area 2005. By contrast, the first and second lower insulation areas 2010-2015 omit the one or more extra layers of insulation. In an example, the first and second lower insulation areas 2010-2015 may be uninsulated, in the sense that these sections of the cylindrical battery cell 2000 are comparable, in terms of insulation, to a conventional cylindrical battery cell (e.g., an 18650 cell).

Referring to FIG. 20, in an example, the first and second lower insulation areas 2010-2015 may be sized so as to align with a portion of a battery housing that is configured to enclose the cylindrical battery cell 2000. For example, pieces of plastic from the battery housing may at least partially cover the first and second lower insulation areas 2010-2015, such that the extra insulation layer(s) can be omitted in these particular sections (e.g., comparable levels of insulation may be obtained from the battery housing envelopment over these sections).

Figure 21:
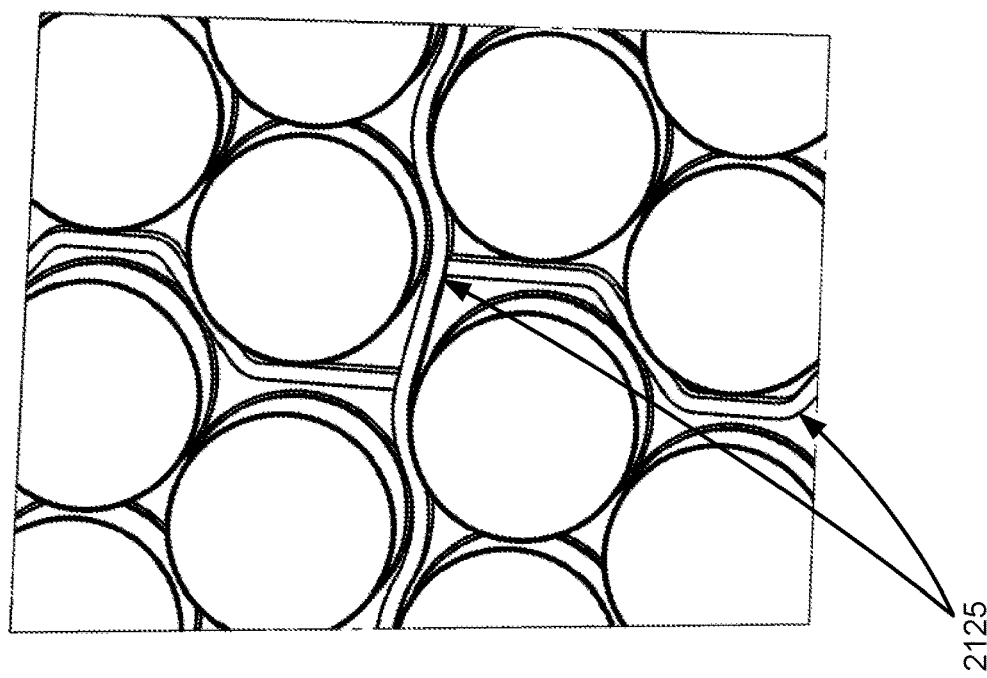
FIG. 21 illustrates a side-perspective and a top-perspective of a housing including a number of cylindrical battery cells as described above with respect to FIG. 20 inserted therein in accordance with an embodiment of the disclosure.
Figure 21:
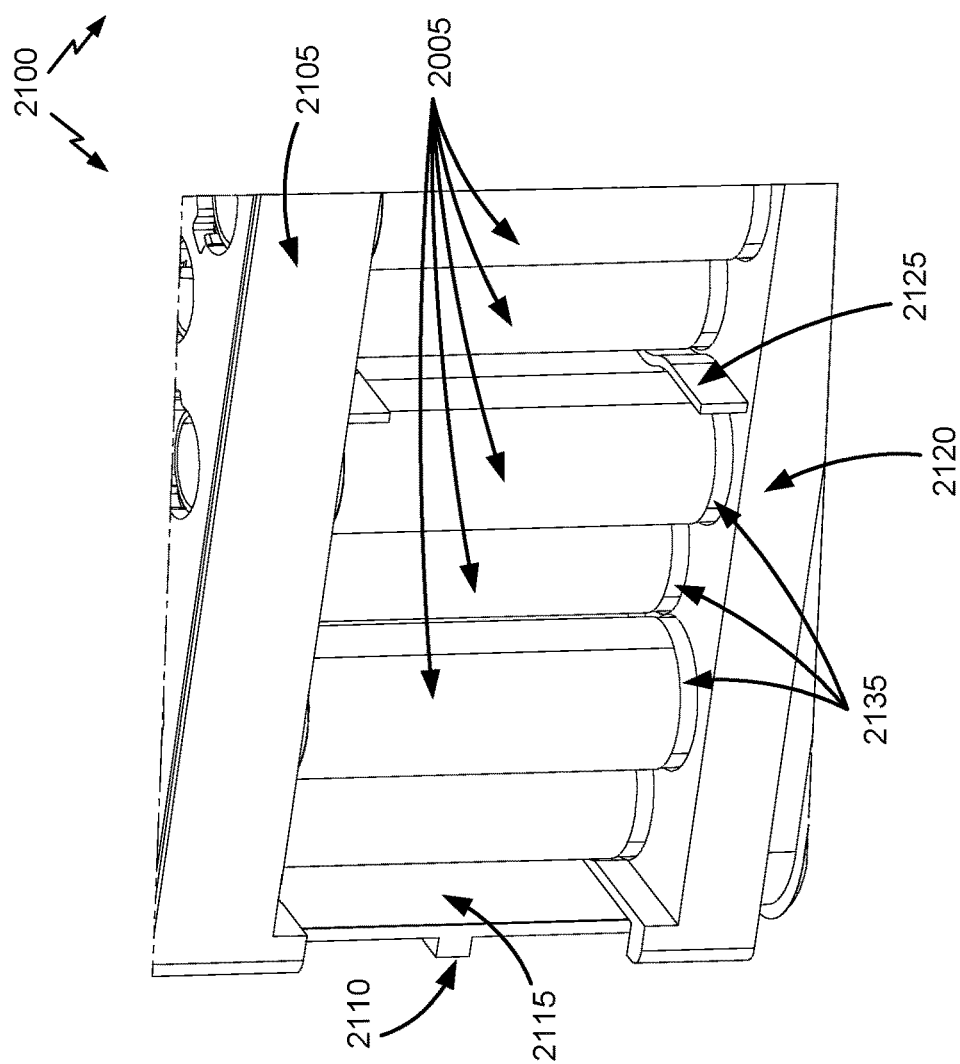

FIG. 21 illustrates a side-perspective and a top-perspective of a battery housing 2100 including a number of cylindrical battery cells 2005 as described above with respect to FIG. 20 inserted therein in accordance with an embodiment of the disclosure. The battery housing 2100 includes a housing top 2105, a fixation bar 2110, an insulation layer 2115 (e.g., insulation foil), a housing bottom 2120, and housing ribs 2125 which help to separate and electrically insulate battery cells in different P groups from each other.

By omitting the one or more extra layers of insulation specifically near the cell fixation areas of the battery cells, smaller tolerances may be provided and a more secure connection between the battery cells and their fixation points (e.g., holes through which the battery cells are secured into respective battery cell receptacles via screwing, adhesive, or magnetically) may be facilitated. On the other hand, including the one or more extra layers of insulation of the battery cells in the higher insulation areas 2005 of the cylindrical battery cells 2000 immersed in the battery housing 2100 may increase the creeping distance between adjacent battery cells in different P groups. Accordingly, the selective deployment of one or more extra layers of insulation of the battery cells specifically to a middle-section (or higher insulation area 2005) permits top-to-bottom insulation divider walls 2130 to be omitted, which facilitates smaller and more uniform distances between battery cells to increase the capacity of the battery module, protects other battery cells in the battery module from hazard propagation (e.g., overheating, fire, etc.) in the case of a thermal runaway, and reduces the inter-cell distance between battery cells (e.g., in particular, between battery cells in adjacent P groups that have different electrical potentials and thereby need some form of electrical insulation from each other).

Also shown in FIG. 21 are exposed portions 2135 of the lower insulation areas 2010-2015. In an example, the higher insulation area 2005 may be configured to be somewhat shorter than the housing top 2105 and the housing bottom 2120, leaving a small part of the lower insulation areas 2010-2015 exposed (at top and bottom). The housing ribs 2125 may be configured to electrically insulate adjacent P groups from other P groups (e.g., due to the different electrical potentials in the respective P groups) by covering the exposed portions 2135 between P groups. For example, the housing ribs 2125 (e.g., at both top and bottom of the battery housing 2100) may extend further than the exposed portions 2135 to insulate the exposed portions 2135 of one P group from the exposed portions 2135 in a neighboring P group. This functions to increase the creeping distance between the neighboring P groups. The housing ribs 2125 may be arranged at the top of the battery housing 2100 (e.g., to cover up a top exposed portion), at the bottom of the battery housing 2100 as shown in FIG. 21 (e.g., to cover up a bottom exposed portion), or a combination thereof.

While various embodiments of the disclosure are discussed separately above, a detailed example implementation for a battery module is described below with respect to FIGS. 22A-22H to provide greater clarity in terms of the inter-operability of the various embodiments. For the sake of convenience, certain assumptions are made in the description of FIGS. 22A-22H which will be appreciated to be strictly for purposes of example. In particular, the following non-limiting example assumptions are made for the battery module system depicted in FIGS. 22A-22H:

The battery module includes an integrated insertion-side cover;

Cooling tubes are integrated into the insertion-side cover;

The battery module is configured for side or lateral-insertion into a corresponding battery module compartment;

The HV connectors for the battery module are located on the same side of the battery module;

Cylindrical battery cells with top-facing positive and negative cell terminals are used in the battery module;

A hybrid contact plate arrangement is used in the battery module; and

A hybrid contact plate arrangement comprising multi-layer contact plates with a "sandwiched" middle layer that forms the bonding connectors is used in the battery module.

It will be appreciated that each of the aforementioned example assumptions is made in a non-limiting manner so as to promote clarity with respect to various embodiments of the disclosure.

Further, FIGS. 22A-22H depict a virtual 'construction' of a battery module that by starting with an empty shell of a battery module and then adding (from top to bottom) each of the various components that comprise the battery module.

Many of the successive FIGS. among FIGS. 22A-22H add components to the battery module relative to preceding FIGS. As components are added to the battery module in successive FIGS., components that were added in previous FIGS. are assumed to still be present unless stated otherwise. Also, the order in which the various components are added in FIGS. is for the sake of illustrative convenience, and does not necessarily mirror the order in which the various components are added during assembly of the actual battery module. When fully assembled, the battery module described with respect to FIGS. 22A-22H corresponds to the battery module described above with respect to FIGS. 1-2.

Figure 22A:
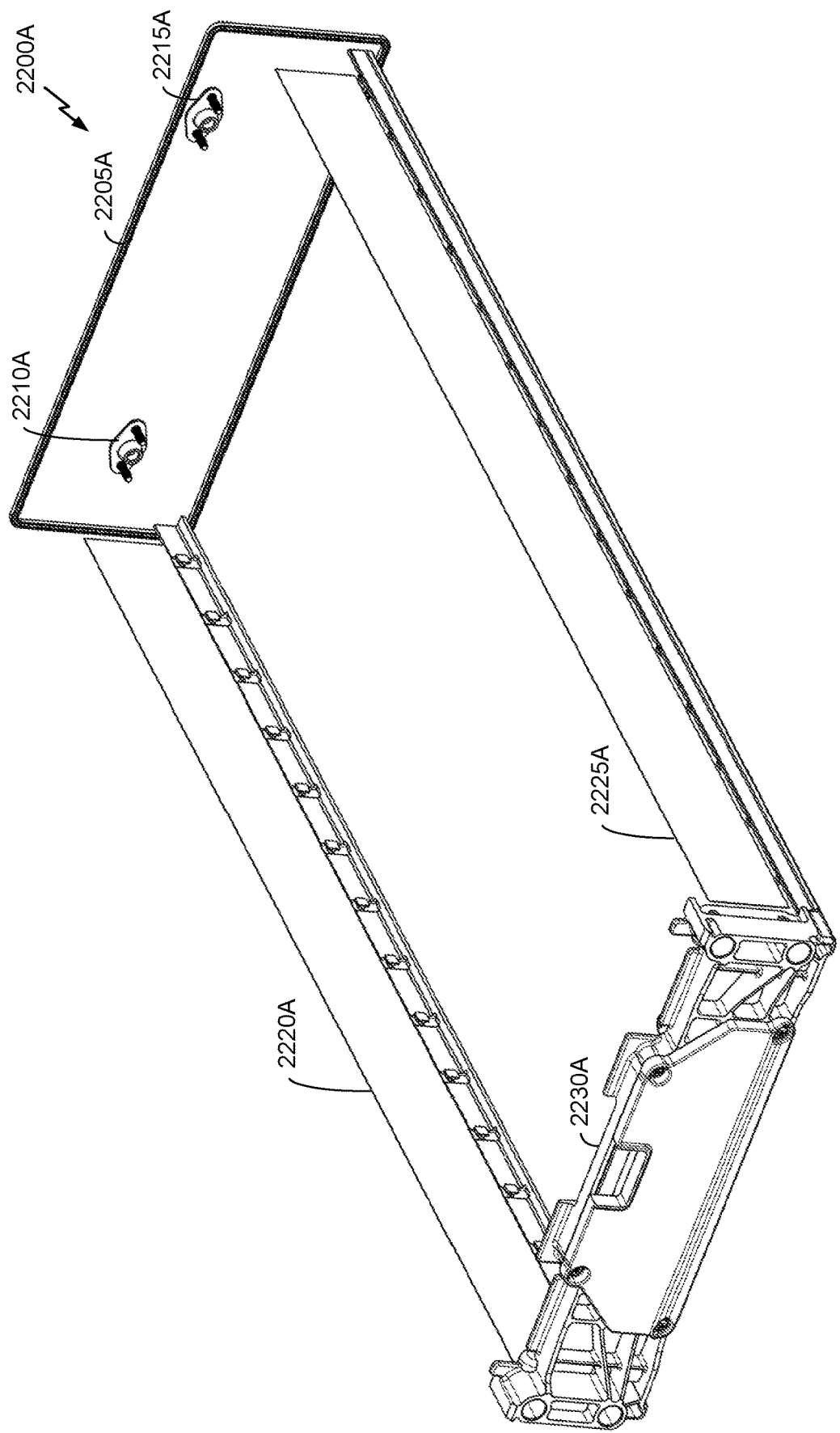
FIGS. 22A-22H each illustrate a different battery module perspective in accordance with an embodiment of the disclosure. More specifically, each successive FIG. among FIGS. 22A-22H adds additional components to the battery module and/or shows a different perspective of the battery module.

FIG. 22A illustrates a battery module perspective 2200A in accordance with an embodiment of the disclosure. In FIG. 22A, the battery module perspective 2200A depicts part of an exterior frame of the battery module with an open top (e.g., through which the various components of the battery module may be installed during assembly). In particular, the battery module perspective 2200A depicts an insertion-side cover 2205A (e.g., similar to insertion-side cover 110 of FIGS. 1-2) including cooling connections 2210A-2215A (e.g., similar to cooling connections 120 of FIGS. 1-2). Also depicted are sidewalls 2220A-2225A, and a backwall 2230A. While not shown expressly in the battery module perspective 2200A of FIG. 22A, the backwall 2230A includes fixation and positioning elements 200, the HV connectors 205, and the LV connector 210 depicted in FIG. 2.

Figure 22B:
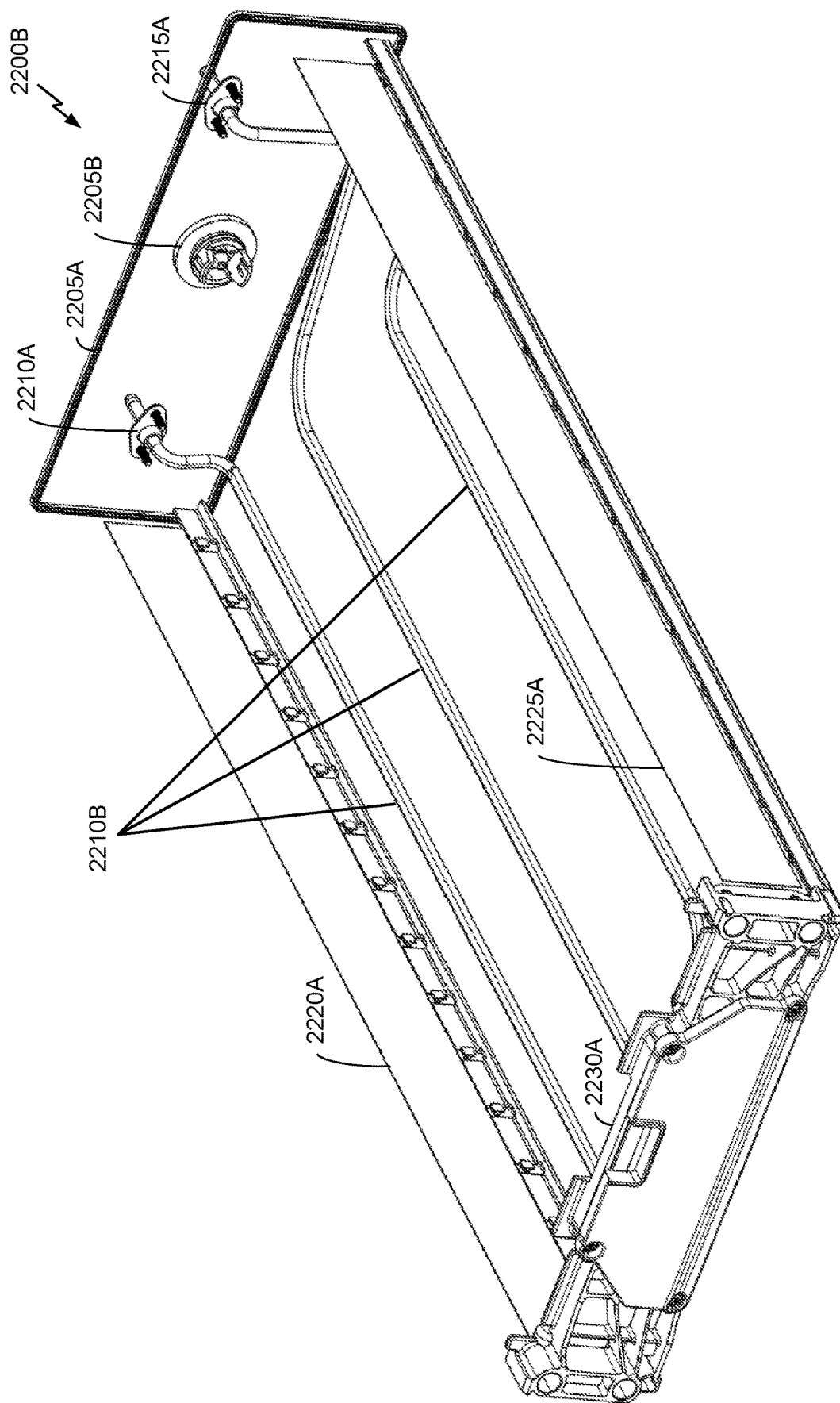

FIG. 22B illustrates a battery module perspective 2200B in accordance with an embodiment of the disclosure. In FIG. 22B, an overpressure valve 2205B (e.g., correspond to overpressure valve 125 in FIG. 1) is added to the insertion-side cover 2205A (e.g., corresponding to fixation points 115 in FIG. 1). The flanges and various fixation points of the insertion-side cover 2205A are omitted for convenience of illustration. Further added in FIG. 22B is cooling tube 2210B, which is connected to the cooling connectors 2210A-2215A and runs underneath the battery module. In particular, the cooling tube 2210B is coupled to a cooling plate (not shown in the battery module perspective 2200B of FIG. 22B) for cooling the battery module.

Figure 22C:
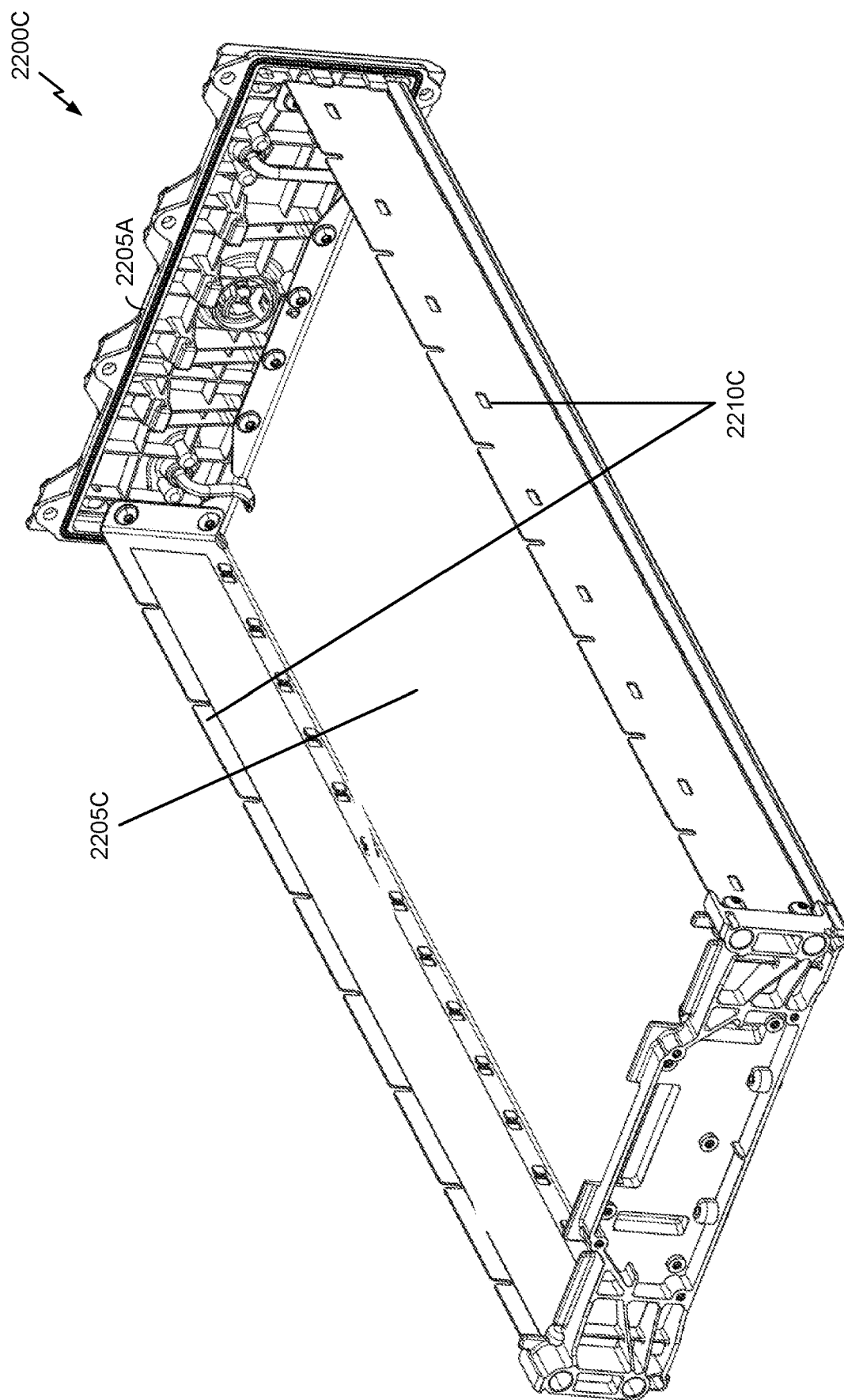

FIG. 22C illustrates a battery module perspective 2200C in accordance with an embodiment of the disclosure. In FIG. 22C, a cooling plate 2205C is added to the battery module perspective 2200B depicted in FIG. 22B, which covers the cooling tube 2210B depicted in FIG. 22B. The cooling plate 2205C may function as both a cooling plate and a floor of the battery module. Also depicted in FIG. 22C are guiding elements 2210C (e.g., corresponding to guiding elements 105 in FIGS. 1-2), which form part of the exterior frame of the battery module, and insertion-side cover 2205A is depicted with additional detail.

Figures 1, 22D:
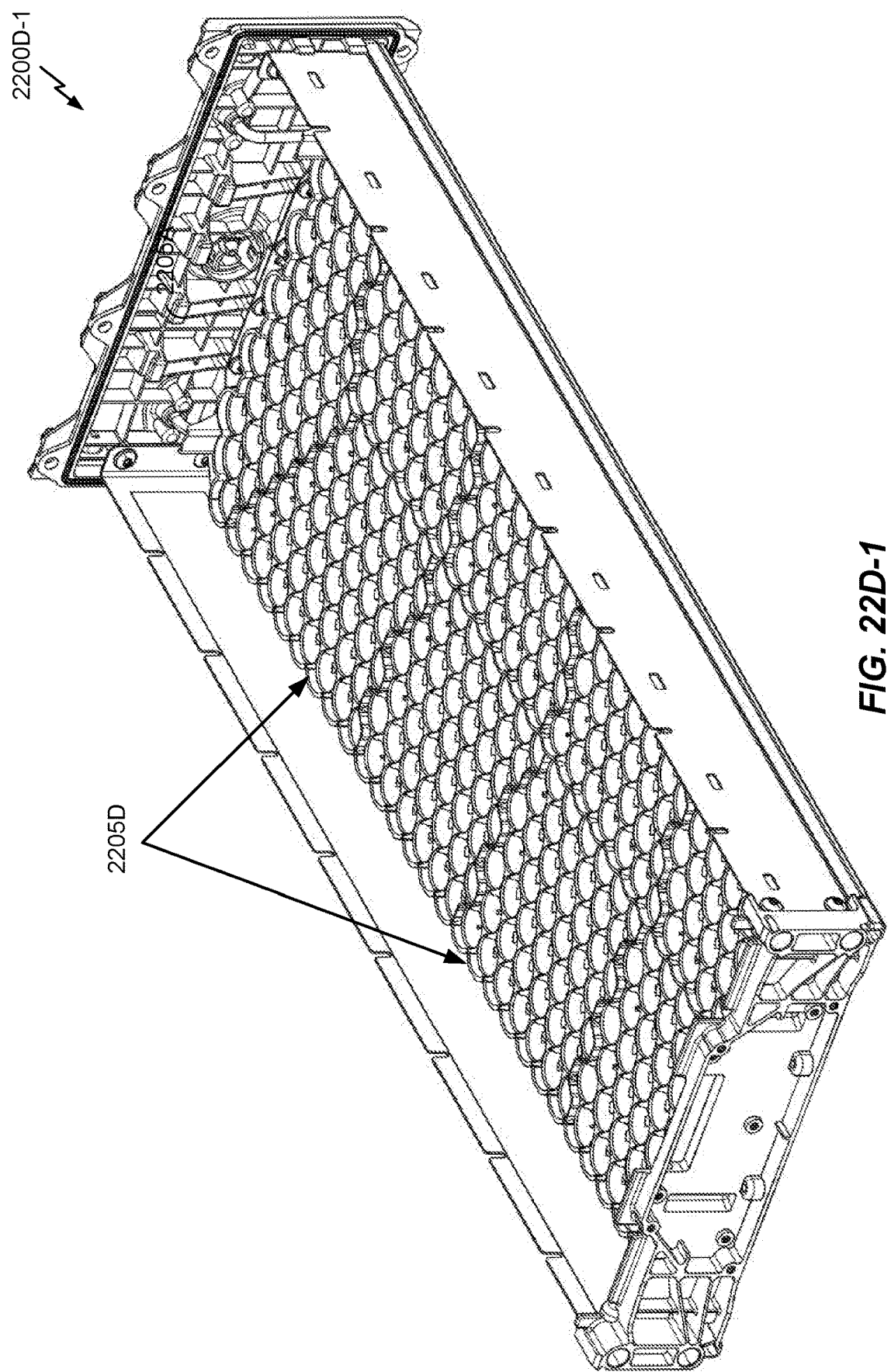
Figures 2, 22D:
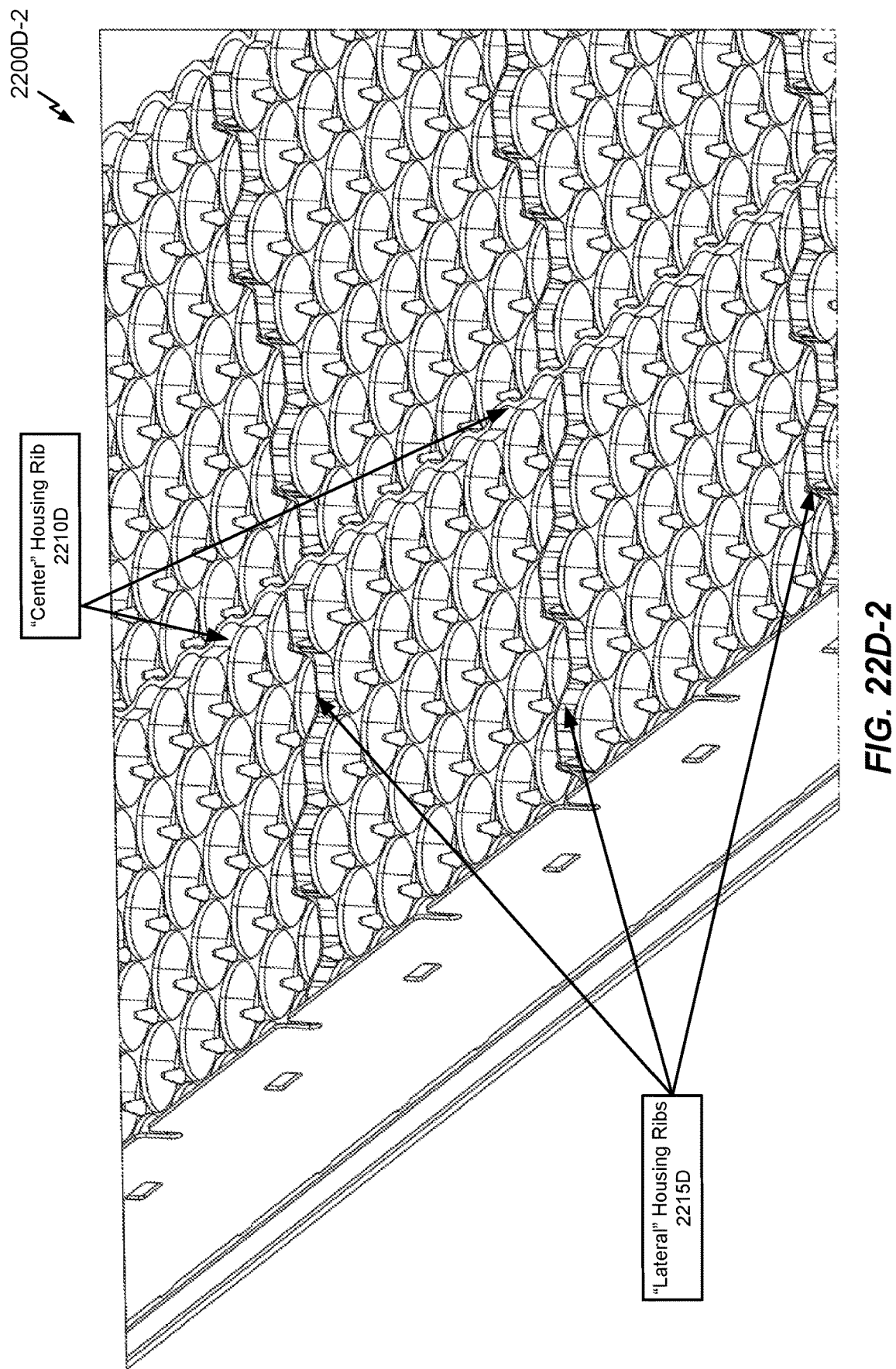

FIG. 22D-1 illustrates a battery module perspective 2205D-1 in accordance with an embodiment of the disclosure. In FIG. 22D, a housing bottom 2205D is added on top of the cooling plate 2205C depicted in the battery module perspective 2200C of FIG. 22C. In an example, the housing bottom 2205D may be made from plastic and may define battery receptacles into which cylindrical battery cells may be inserted, and may also include housing ribs configured to separate (and help to insulate) adjacent P groups of battery cells, as discussed above with respect to FIG. 21.

To help appreciate the housing bottom 2205D, an alternate viewpoint of the battery module perspective 2200D-1 is depicted in FIG. 22D-2. In the alternative battery module perspective 2200D-2, a portion of the housing bottom 2205D is shown. The battery module perspective 2200D-2 more clearly depicts that the housing bottom 2205D includes a "center" housing rib 2210D that runs lengthwise along the battery module, and several "lateral" housing ribs 2215D that run laterally (or widthwise) across the battery module. As noted above with respect to FIG. 21, the housing ribs (both center and lateral) are slightly raised sections of the housing bottom 2205D that can be used to help insulate adjacent P groups of battery cells from each other. So, in one example, the "center" and "lateral" housing ribs 2210D-2215D may define sections of the housing bottom 2205D allocated to different P groups of battery cells.

Figure 22E:
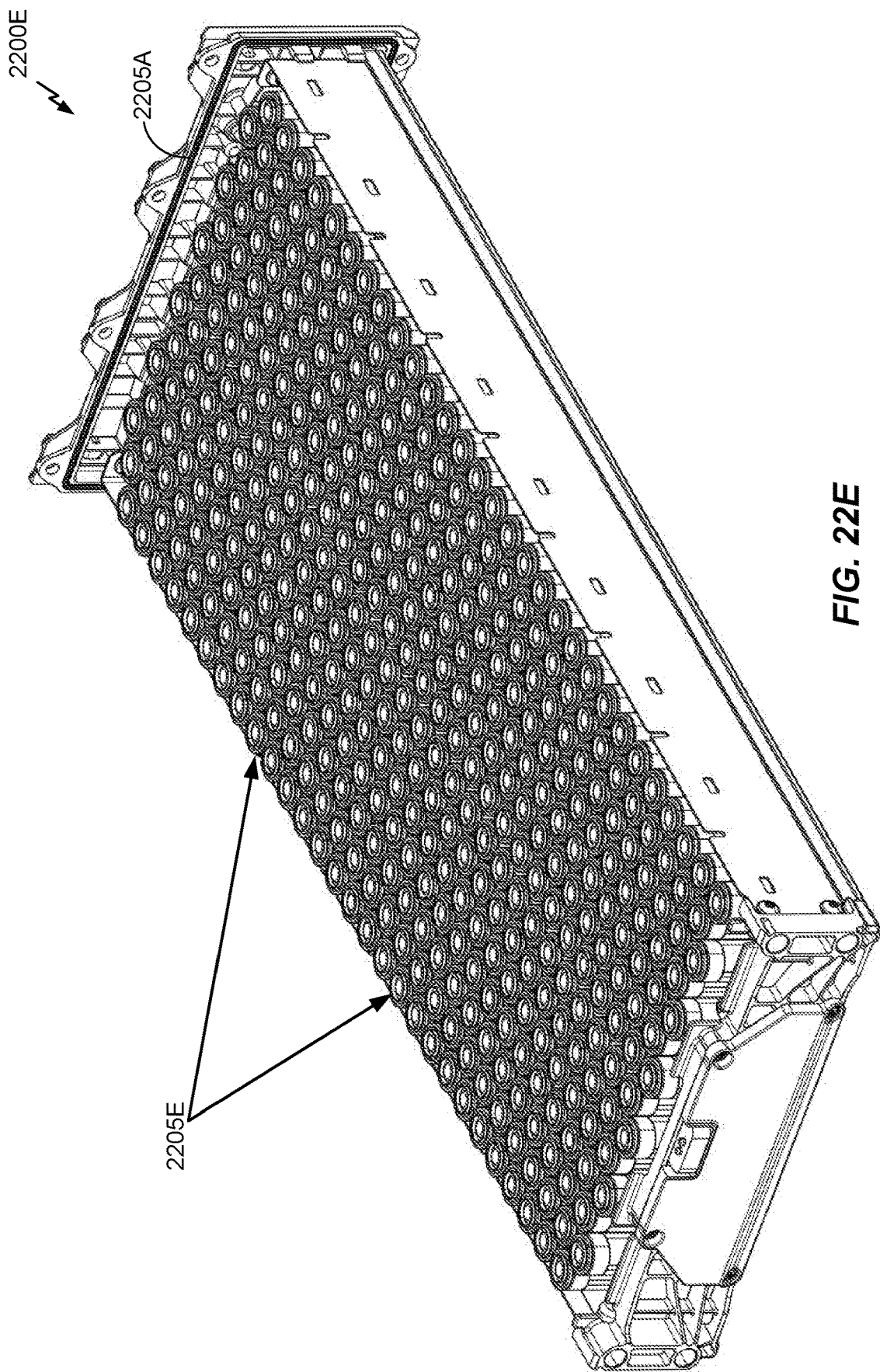

FIG. 22E illustrates a battery module perspective 2200E in accordance with an embodiment of the disclosure. In FIG. 22E, battery cells are inserted into the battery receptacles of the housing bottom 2105D depicted in FIGS. 22D-1 and 22D-2. In an example, the cylindrical battery cells shown as inserted into the battery module in FIG. 22E may correspond to the cylindrical battery cells described above with respect to FIGS. 18A-21 (e.g., with top-facing positive cell heads and negative cell rims, and insulated middle sections). Also depicted in FIG. 22E for the first time in this FIG. sequence are the flanges and fixation points 2205E on the insertion-side cover 2205A, so the relevant height of the battery cells and insertion-side cover can be appreciated. Once again, various features (e.g., individual bolts, screws, etc.), such as the flanges and fixation points of the insertion-side cover 2205A in the preceding FIGS., have been omitted to increase the overall clarity of this sequence of FIGS. by focusing on the more relevant features.

Figures 1, 22F:
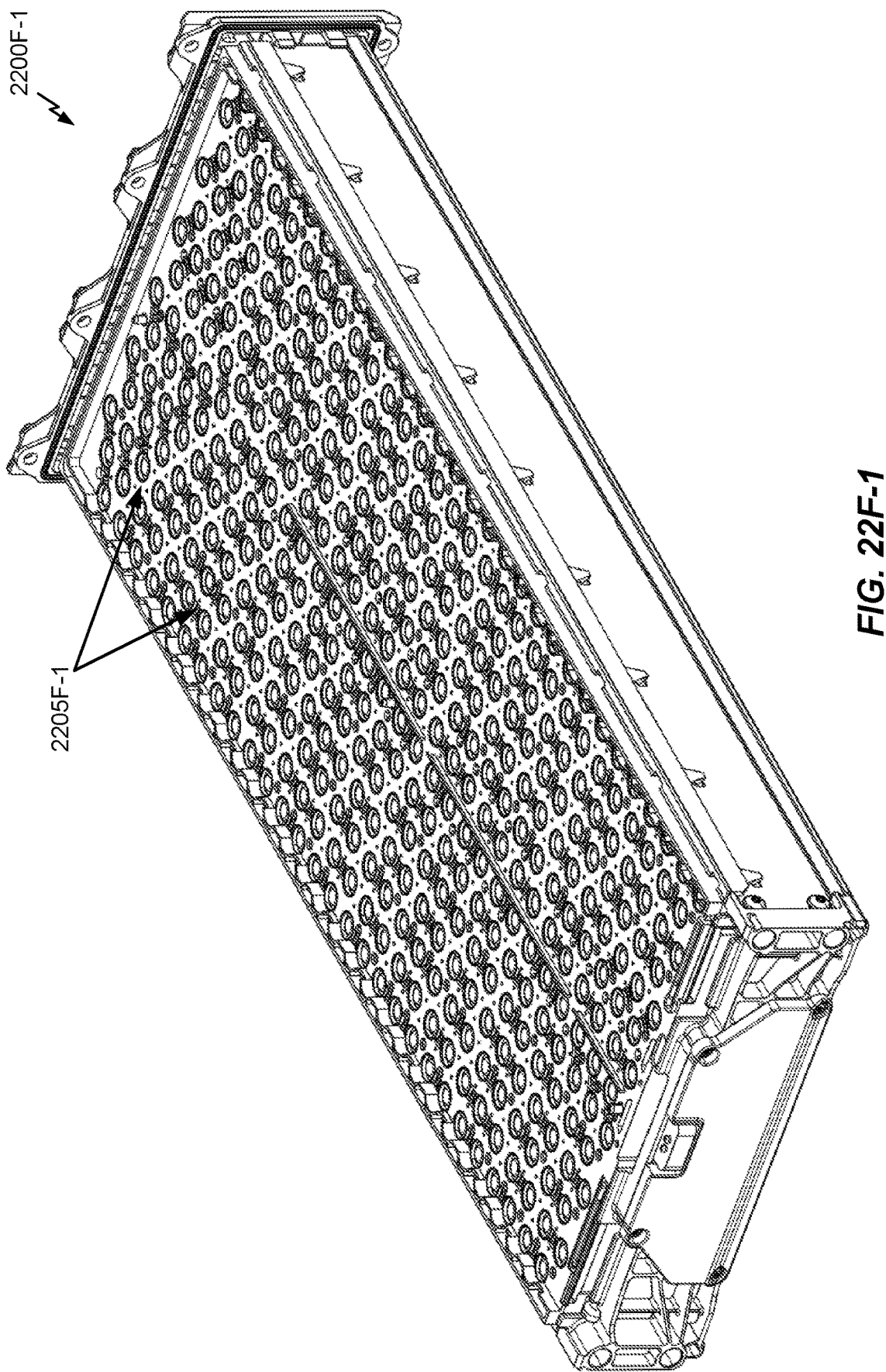
Figures 2, 22F:
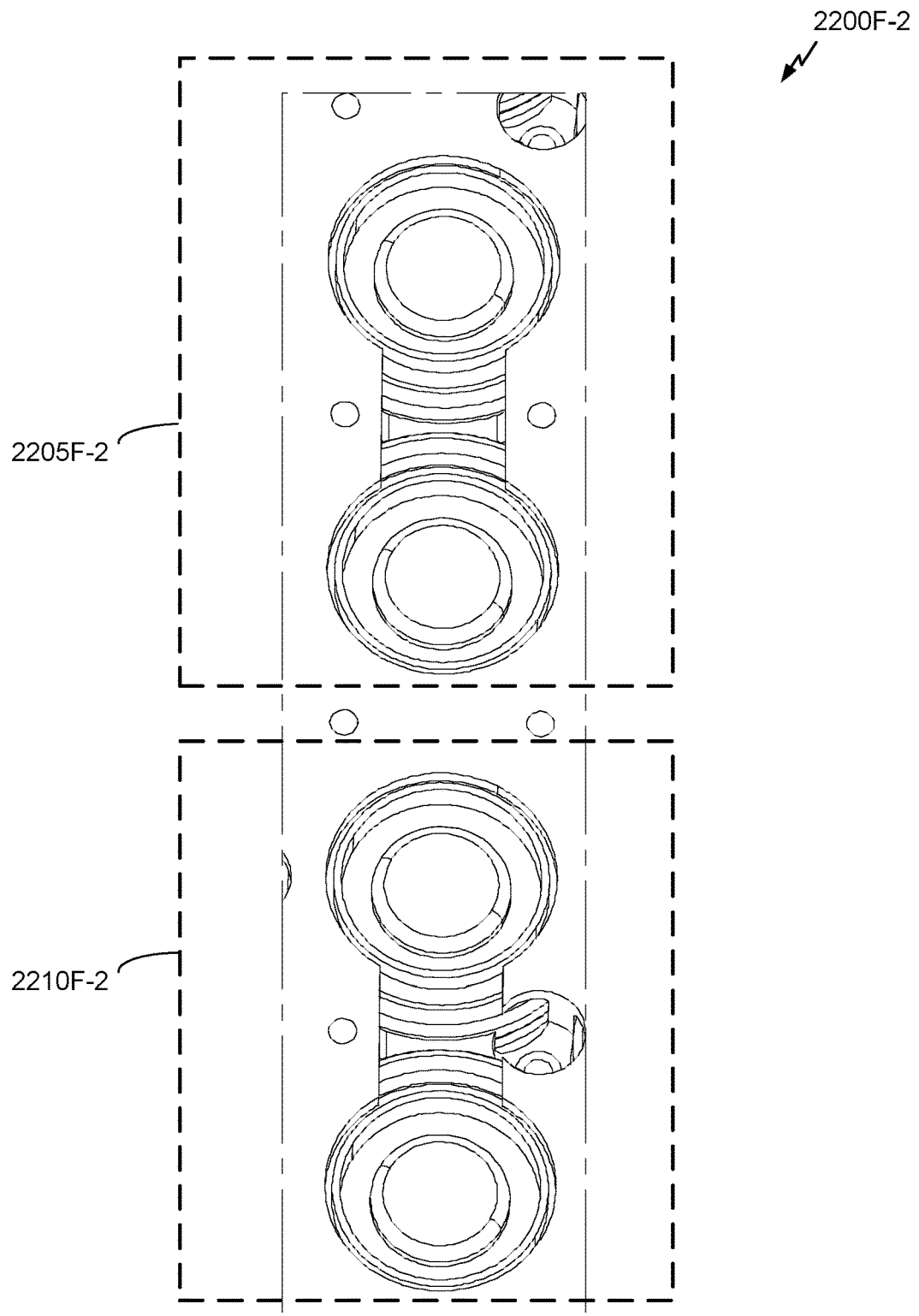

FIG. 22F-1 illustrates a battery module perspective 2200E-1 in accordance with an embodiment of the disclosure. In FIG. 22F-1, a housing top 2205F-1 is mounted onto the battery cells depicted in FIG. 22E. In an example, the housing top 2205F-1 may be made from plastic. Also, while not expressly shown in FIG. 22F-1, the housing top 2205F-1 may include downward-facing housing ribs that are aligned with the "center" and "lateral" housing ribs 2210D-2215D depicted in FIG. 22D-2. So, while the "center" and "lateral" housing ribs 2210D-2215D help to insulate battery cells in adjacent P groups from each other (e.g., by overlapping an exposed, non-insulated portion of respective battery cells), corresponding "center" and "lateral" housing ribs may likewise be implemented into the housing top 2205F-1 to provide a similar function (e.g., to overlap with exposed, non-insulated portions of respective battery cells and thereby help to insulate P groups from each other). The housing top 2205F-1 includes holes or openings that are aligned with the contact areas in the hybrid contact plate arrangement mounted therein, which will be described below in more detail. FIG. 22F-2 illustrates a particular zoomed-in section 2200E-2 of the battery module perspective 2200E-1 depicted in FIG. 22F-1, including a first contact area 2205F-2 for a first P group and a second contact area 2210E-2 for a second P group. The first and second P groups are connected in-series via a "center" multi-layer contact plate. The zoomed-in section 2200E-2 is used below to explain how the various layers of the hybrid contact plate arrangement are stacked onto the housing top 2205F-1.

Figures 1, 22G:
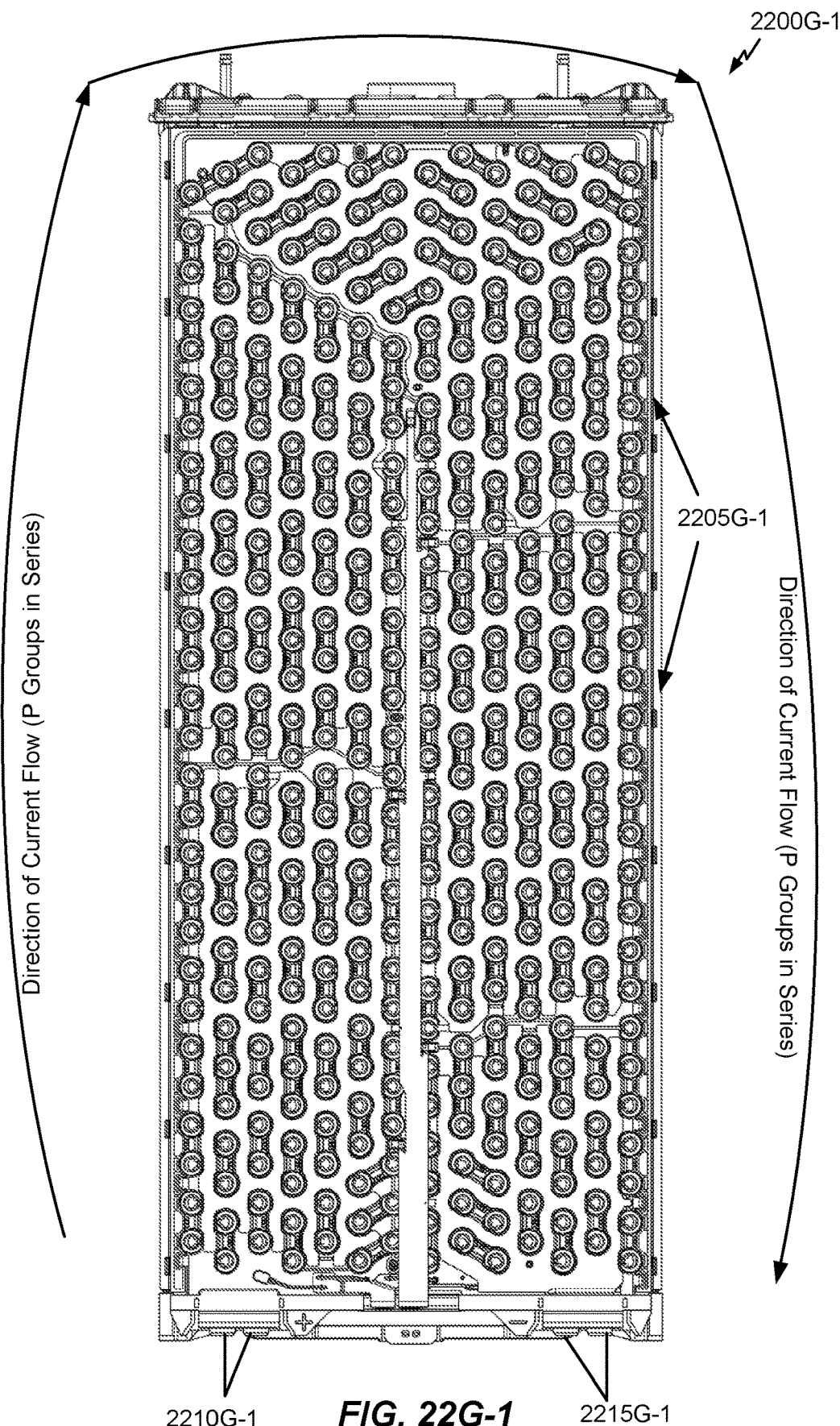
Figures 2, 22G:
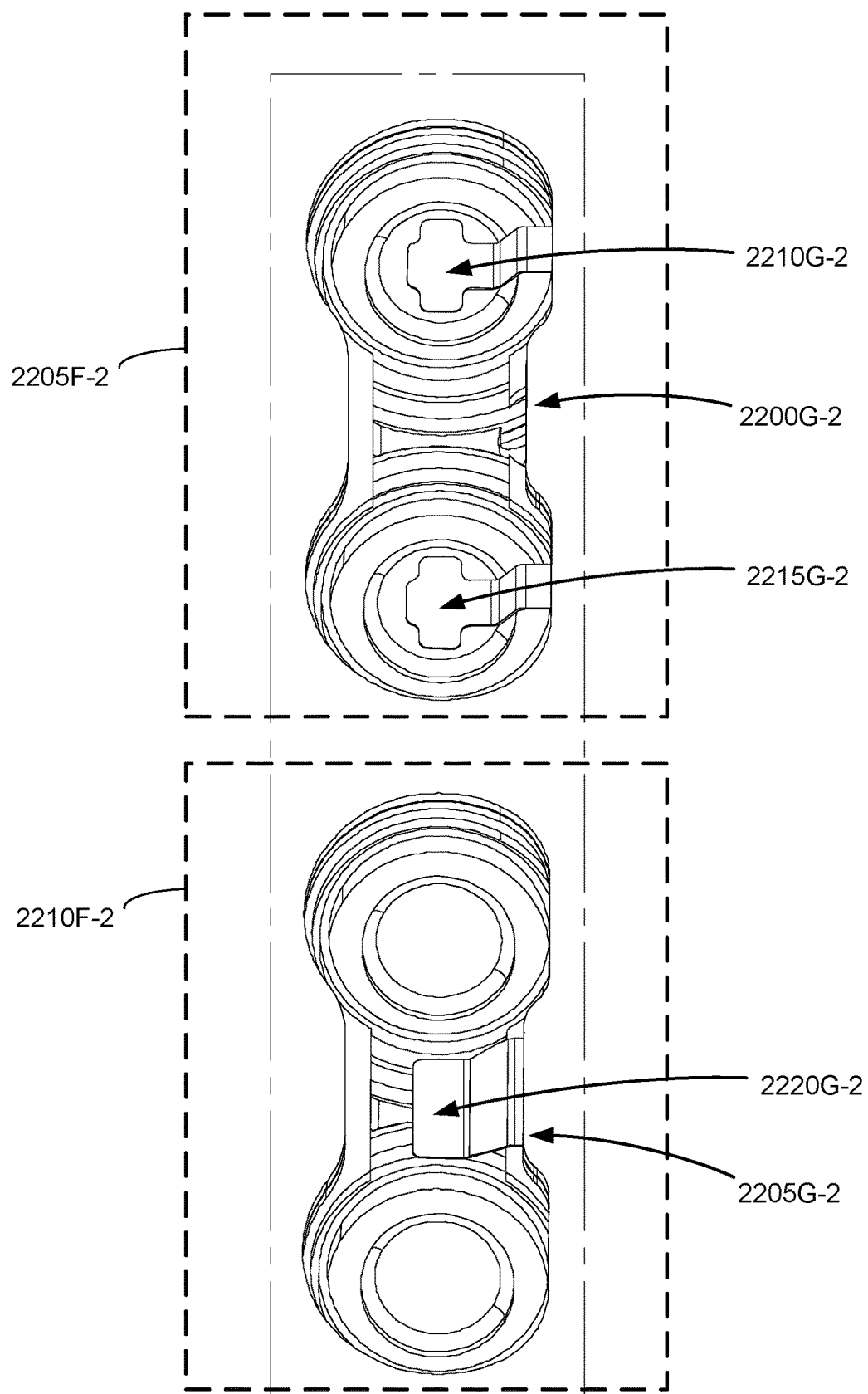
Figures 3, 22G:
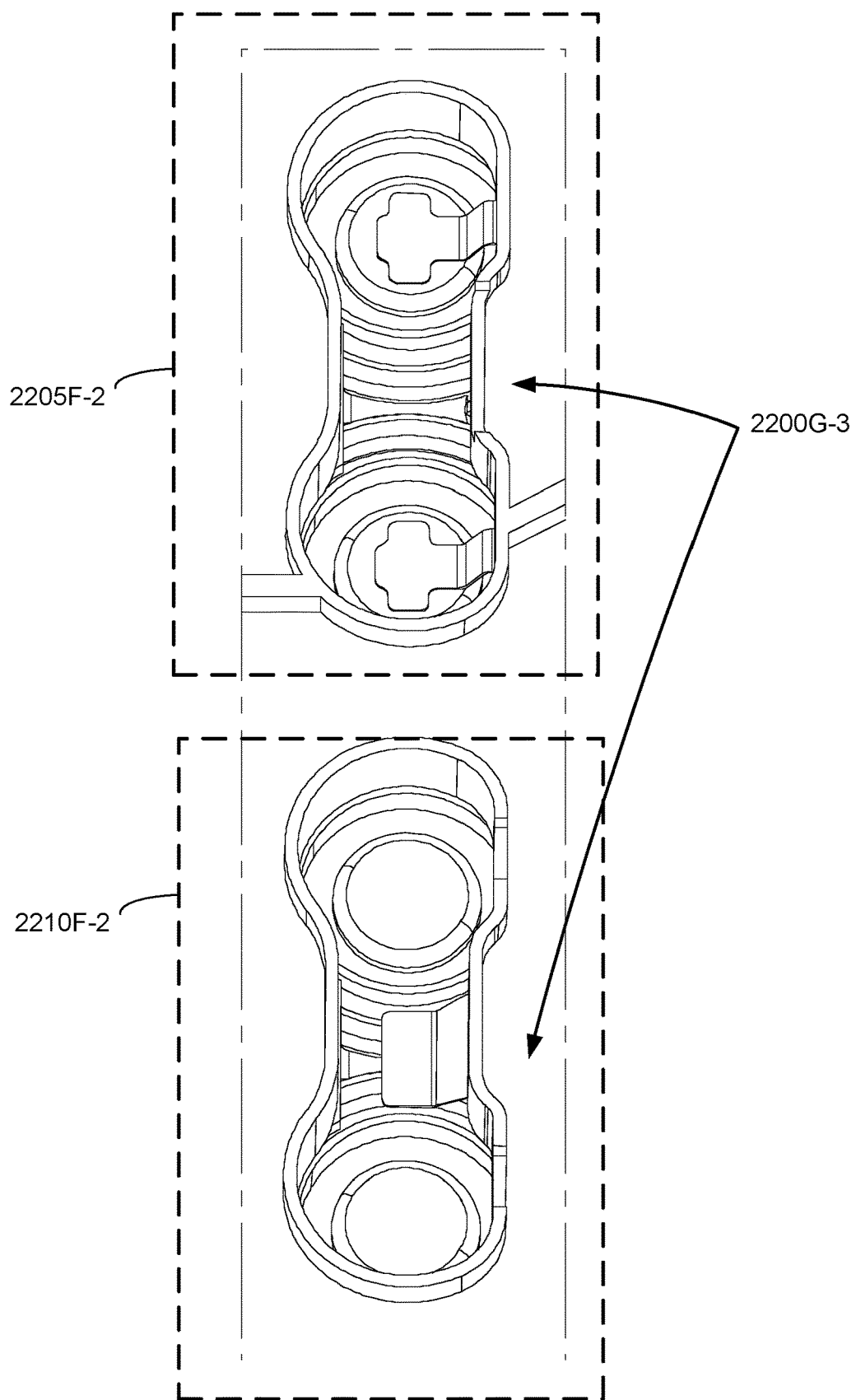
Figures 4, 22G:
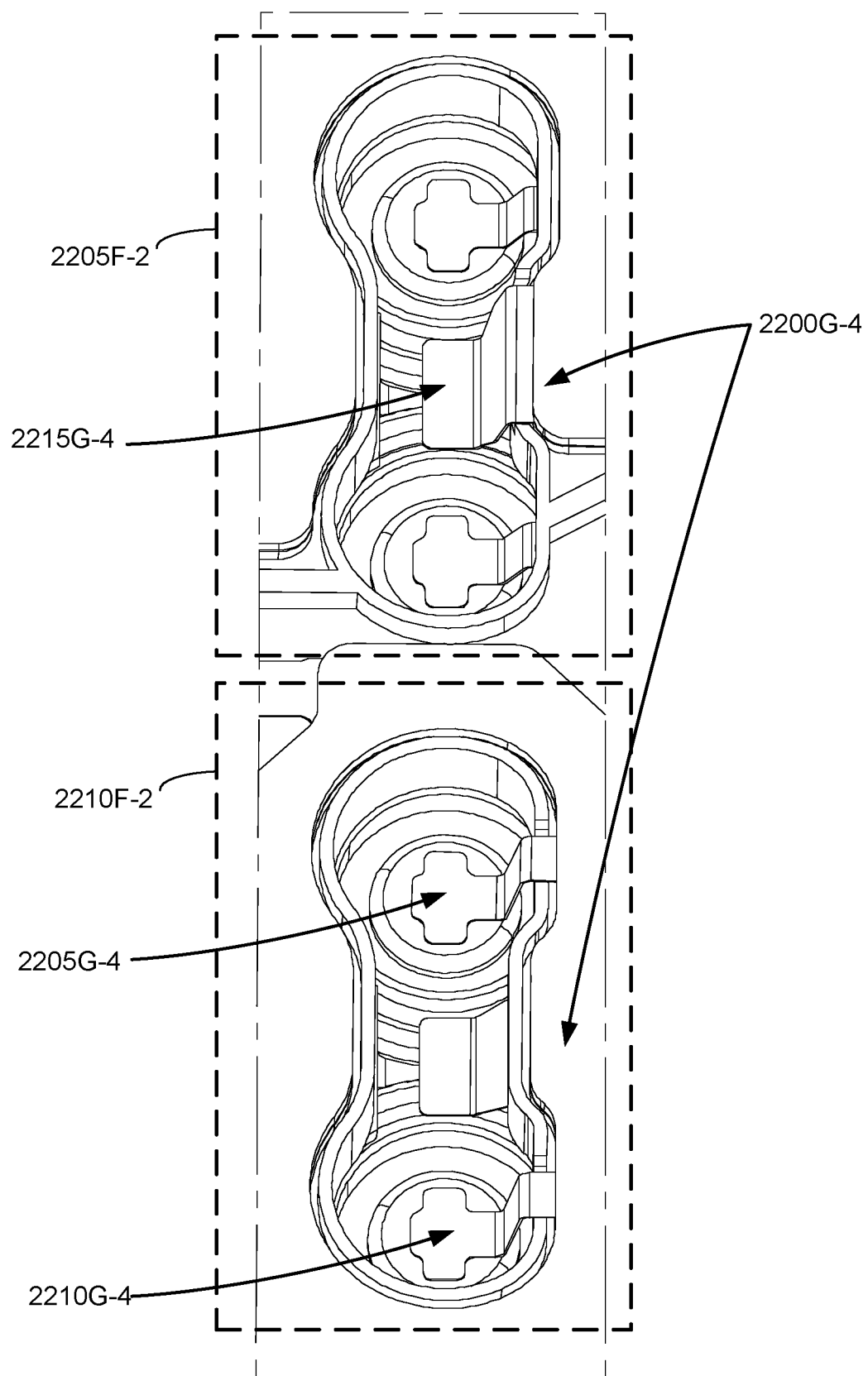

FIG. 22G-1 illustrates a battery module perspective 2200G-1 in accordance with an embodiment of the disclosure. In FIG. 22G-1, a hybrid contact plate arrangement 2205G-1 is mounted onto the battery cells depicted in FIG. 22E. The hybrid contact plate arrangement 2205G-1 includes an arrangement of contact areas, as described above. In this particular embodiment, the series-connected P groups of the hybrid contact plate arrangement 2205G-1 are arranged in an upside-down U-shaped pattern, starting with an HV connector 2210G-1 of the "negative pole" multi-layer contact plate, and ending back at an HV connector 2215G-1 of the "positive pole" multi-layer contact plate. Arrows in FIG. 22G-1 denote the direction of current flow, which in turn marks the arrangement of the series-connected P groups. Moreover, in FIG. 22G-1, the shape or orientation of the individual contact areas are aligned with the direction of the current flow, which may improve efficiency of the current distribution throughout the battery module in at least one embodiment. Due to the complexity of the hybrid contact plate arrangement 2205G-1, a layer-by-layer deconstruction of the hybrid contact plate arrangement 2205G-1 will now be described with respect to the zoomed-in section 2200E-2 from FIG. 22F-2.

Referring to FIG. 22G-2, multi-layer contact plates 2200G-2 and 2205G-2 of the hybrid contact plate arrangement 2205G-1 are shown on top of the zoomed-in section 2200E-2 from FIG. 22F-2. In particular, "positive" bonding connectors 2210G-2 and 2215G-2 of multi-layer contact plate 2200G-2 are connected to positive cell heads of two battery cells in a first P group, and a "negative" bonding connector 2220G-2 of multi-layer contact plate 2205G-2 is connected to negative cell rims of two battery cells in a second P group. The multi-layer contact plates 2200G-2 and 2205G-2 may be any type of multi-layer contact plate (e.g., "center", "negative pole" or "positive pole", depending on which section of the hybrid contact plate arrangement is being zoomed in upon).

Referring to FIG. 22G-3, an insulation layer 2200G-3 is added on top of the multi-layer contact plates 2200G-2 and 2205G-2 shown in FIG. 22G-2. Referring to FIG. 22G-4, a "center" multi-layer contact plate 2200G-4 is added on top of the insulation layer 2200G-3 shown in FIG. 22G-3. Unlike multi-layer contact plates 2200G-2 and 2205G-2, the "center" multi-layer contact plate 2200G-4 is configured to connect the first and second P groups in series, and thereby includes bonding connector connections to both P groups. In particular, "positive" bonding connectors 2205G-4 and 2210G-4 of "center" multi-layer contact plate 2200G-4 are connected to positive cell heads of two battery cells in the second P group, and a "negative" bonding connector 2215G-4 of "center" multi-layer contact plate 2200G-4 is connected to negative cell rims of two battery cells in the first P group. As will be appreciated, FIGS. 22G-2 through 22G-4 represent example layer-by-layer depictions of the hybrid contact plate arrangement 2205G-1 depicted in FIG. 22G-1. After the hybrid contact plate arrangement 2205G-1 is added and the various cell terminal connections are made (e.g., via welding), the battery module may be enclosed, resulting in the battery module depiction shown in FIGS. 1-2.

Figure 22H:
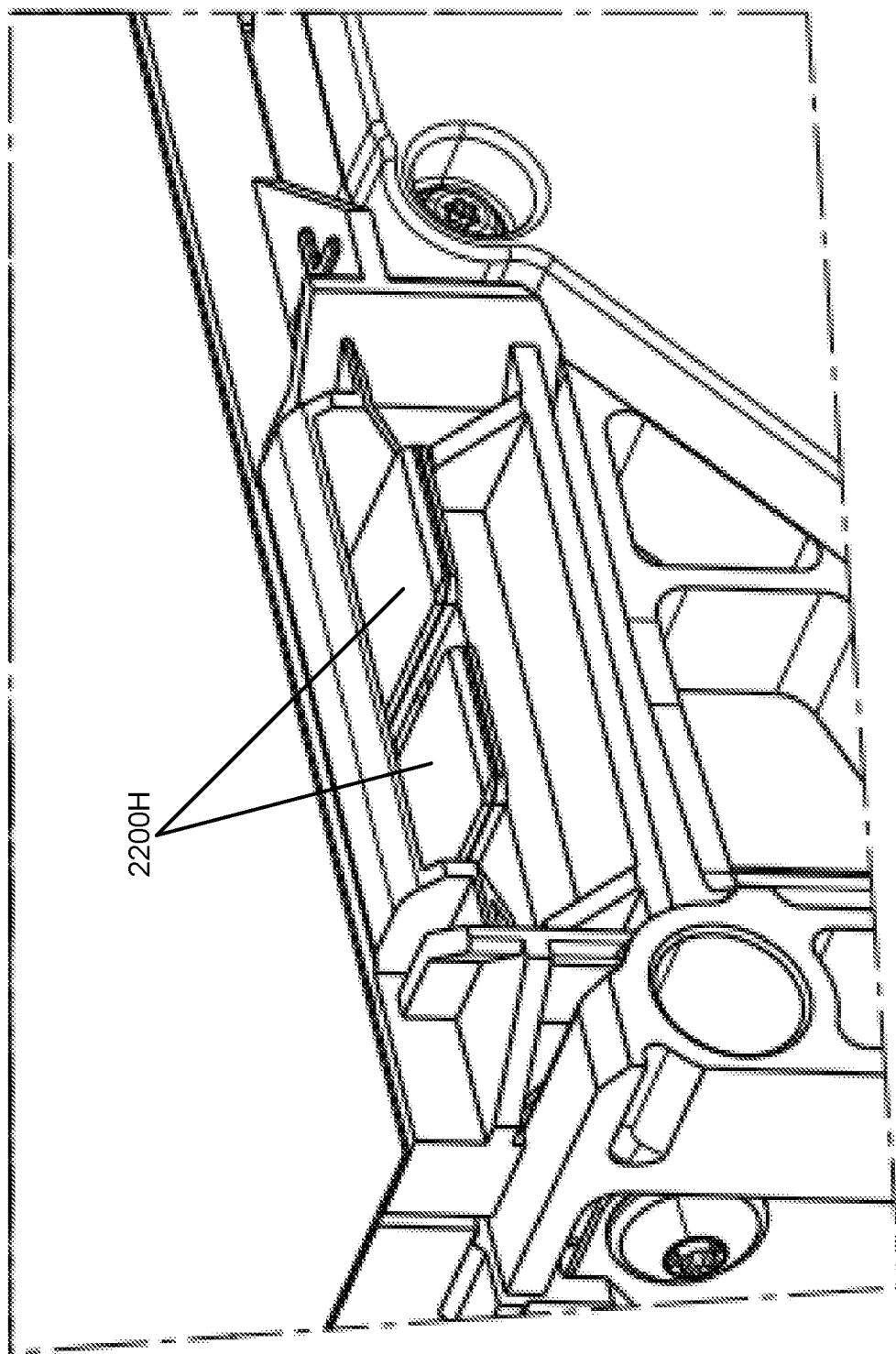

FIG. 22H illustrates an HV connector 2200H of the battery module in accordance with an embodiment of the disclosure. As noted above, the HV connector 2200H may be implemented as an integrated section of the "negative pole" or "positive pole" multi-layer contact plate that extends out of the battery module, or alternatively may be a separate component that is merely coupled to the "negative pole" or "positive pole" multi-layer contact plate. In either case, the HV connector 2200H is configured to connect to an external HV connector of some sort, such as an HV plug. For example, the battery module may be configured to slide into a battery module compartment, with the HV plug being aligned with the HV connector 2200H (e.g., as well as the other HV connector and the LV connector) so that an HV electrical connection is formed between the HV connector 2200H and the HV plug when the battery module slides into the battery module compartment.

While the embodiments described above provide various examples of materials that may be used for different components, it will be appreciated that comparable variants of any of the noted examples may also be deployed. Accordingly, references to material types such as Al, Cu and steel are intended to cover not only Al, Cu and steel, but also any known alloys thereof.

While the embodiments described above relate primarily to land-based electric vehicles (e.g., cars, trucks, etc.), it will be appreciated that other embodiments can deploy the various battery-related embodiments with respect to any type of electric vehicle (e.g., boats, submarines, airplanes, helicopters, drones, spaceships, space shuttles, rockets, etc.).

While the embodiments described above relate primarily to battery module compartments and associated battery modules and insertion-side covers for deployment as part of an energy storage system for an electric vehicle, it will be appreciated that other embodiments can deploy the various battery-related embodiments with respect to any type of energy storage system. For example, besides electric vehicles, the above-noted embodiments can be applied to energy storage systems such as home energy storage systems (e.g., providing power storage for a home power system), industrial or commercial energy storage systems (e.g., providing power storage for a commercial or industrial power system), a grid energy storage system (e.g., providing power storage for a public power system, or power grid) and so on.

As will be appreciated, the placement of the various battery module compartments in the above-noted embodiments is described as being integrated into a vehicle floor of an electric vehicle. However, it will be appreciated that the general closed compartment profile design may be extended to battery module mounting areas that can be installed in other locations within the electric vehicle (e.g., in a trunk of the electric vehicle, behind one or more car seats, under a front-hood of the electric vehicle, etc.).

The forgoing description is provided to enable any person skilled in the art to make or use embodiments of the invention. It will be appreciated, however, that the invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the embodiments of the invention.

What is claimed is:

1. A contact plate configured to establish electrical bonds between battery cells in a battery module, comprising:
    at least one primary conductive layer including a contact area that is aligned with two or more terminals of two or more battery cells in a parallel group of battery cells (P-Group); and
    a bonding connector configured to provide an electrical coupling between the contact plate and the two or more terminals of the two or more battery cells.

2. The contact plate of claim 1, wherein the at least one primary conductive layer includes a single-layer busbar.

3. The contact plate of claim 1, wherein the two or more terminals correspond to two or more negative terminals of the two or more battery cells.

4. The contact plate of claim 3,
    wherein the two or more battery cells are adjacent to each other, wherein the two or more negative terminals correspond to two or more negative cell rims of the two or more battery cells, and wherein the bonding connector is configured to be pressed down and welded onto a region that includes portions from each of the two or more negative cell rims to form the electrical coupling.

5. The contact plate of claim 1, wherein the bonding connector is welded directly to the two or more terminals.

6. The contact plate of claim 1, further comprising:

a cell terminal connection layer that is joined in part with the at least one primary conductive layer, wherein the bonding connector corresponds to a section of the cell terminal connection layer that is not joined with the at least one primary conductive layer.

7. The contact plate of claim 6, wherein the at least one primary conductive layer comprises two primary conductive layers that partially sandwich the cell terminal connection layer, and wherein the bonding connector corresponds to a non-sandwiched part of the cell terminal connection layer.

8. The contact plate of claim 1, wherein the at least one primary conductive layer includes a first material with a first conductivity, and wherein the bonding connector comprises a second material with a second conductivity that is less than the first conductivity.

9. The contact plate of claim 8, wherein the first material comprises aluminum or copper, and wherein the second material comprises steel or aluminum.

10. The contact plate of claim 1, wherein the contact area corresponds to a sidewall of the at least one primary conductive layer.

11. The contact plate of claim 10, wherein the sidewall is defined by a hole in the at least one primary conductive layer.

12. The contact plate of claim 1, wherein the contact area is on a top of the contact plate.

13. The contact plate of claim 12, wherein the at least one primary conductive layer includes a groove on the top of the contact plate into which the bonding connector is inserted.

14. The contact plate of claim 1, further comprising:

another bonding connector configured to provide an electrical coupling between the contact plate and at least one terminal of at least one battery cell of another P-Group that is connected in series with the P-Group.

15. The contact plate of claim 1, wherein the bonding connector is homogeneously configured with a single material.

16. The contact plate of claim 15, wherein the single material comprises steel or aluminum.

* * * * *